(12) United States Patent
Gubba et al.

(10) Patent No.: US 11,549,429 B2
(45) Date of Patent: Jan. 10, 2023

(54) ENGINE MIXING STRUCTURES

(71) Applicant: Transportation IP Holdings, LLC, Norwalk, CT (US)

(72) Inventors: Sreenivasa Rao Gubba, Bangalore (IN); Bhaskar Tamma, Bangalore (IN); Victor Manuel Salazar, Mechanicville, NY (US); Adam Edgar Klingbeil, Ballston Lake, NY (US); Thomas Michael Lavertu, Ballston Lake, NY (US); Roy James Primus, Niskayuna, NY (US); John Dowell, Grove City, PA (US); Kevin Bailey, Mercer, PA (US); Kevin McElhaney, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 16/800,992

(22) Filed: Feb. 25, 2020

(65) Prior Publication Data
US 2020/0191045 A1 Jun. 18, 2020

Related U.S. Application Data

(63) Continuation-in-part of application No. 16/059,730, filed on Aug. 9, 2018.
(Continued)

(51) Int. Cl.
*F02B 23/04* (2006.01)
*F02B 23/06* (2006.01)
(Continued)

(52) U.S. Cl.
CPC .......... *F02B 23/0651* (2013.01); *B01F 23/21* (2022.01); *B01F 25/421* (2022.01); *F02B 3/06* (2013.01); *F02B 23/0696* (2013.01)

(58) Field of Classification Search
CPC .. F02B 23/0651; F02B 19/14; F02B 19/1071; F02B 3/06; F02B 23/0696; F02M 69/08; F02M 69/047; B01F 3/04007
(Continued)

(56) References Cited

U.S. PATENT DOCUMENTS 1,136,818 A * 4/1915 Leissner ................. F02B 19/14
123/255
1,213,911 A * 1/1917 Schmid ............. F02B 2075/125
123/298
(Continued)

FOREIGN PATENT DOCUMENTS

WO 2007058103 A1 5/2007

OTHER PUBLICATIONS

Office Action dated Aug. 21, 2020 for corresponding DE Application No. 10 2018 133 036.7 (12 pages).
(Continued)

*Primary Examiner* — Phutthiwat Wongwian
*Assistant Examiner* — Joshua Campbell
(74) *Attorney, Agent, or Firm* — Christopher R. Carroll; The Small Patent Law Group LLC

(57) ABSTRACT

A fuel and gas mixing structure for an engine is provided. This mixing structure includes a body configured to be positioned between a fuel injector and a cylinder of an engine. The body defines an interior volume that is configured to receive gas (e.g., air) from outside the body and to receive one or more streams of fuel from the fuel injector in the interior volume. The body also includes one or more upper channels and one or more lower channels that are configured to provide a substantially similar amount of flow relative to each other to the interior volume The body also defines one or more mixture conduits configured to conduct plumes of the fuel and gas, while mixing, from the interior
(Continued)

volume to one or more exit ports and therethrough to the cylinder.

25 Claims, 21 Drawing Sheets

Related U.S. Application Data

(60) Provisional application No. 62/623,194, filed on Jan. 29, 2018, provisional application No. 62/616,702, filed on Jan. 12, 2018.

(51) Int. Cl.
*F02B 3/06* (2006.01)
*B01F 23/21* (2022.01)
*B01F 25/421* (2022.01)

(58) Field of Classification Search
USPC .................................................. 123/298
See application file for complete search history.

(56) References Cited

U.S. PATENT DOCUMENTS

| | | | |
|---|---|---|---|
| 1,260,408 A * | 3/1918 | Leissner | F02B 3/06 123/251 |
| 1,747,935 A | 2/1930 | Hemmingsen | |
| 1,948,557 A | 2/1934 | Baur | |
| 2,470,351 A | 5/1949 | Hartridge | |
| 2,631,577 A | 3/1953 | Carter | |
| 2,733,630 A | 2/1956 | Saives | |
| 3,683,873 A | 8/1972 | Tarter | |
| 3,785,628 A * | 1/1974 | Lang | F02M 29/06 261/65 |
| 4,112,906 A | 9/1978 | Spencer | |
| 4,177,948 A * | 12/1979 | Schaffitz | F02M 61/1806 239/533.3 |
| 4,566,634 A * | 1/1986 | Wiegand | F02M 57/00 123/585 |
| 4,620,516 A * | 11/1986 | Reum | F02B 19/165 123/275 |
| 5,024,193 A * | 6/1991 | Graze, Jr. | F02B 19/18 123/259 |
| 5,035,358 A | 7/1991 | Katsuno et al. | |
| 5,218,943 A | 6/1993 | Takeda | |
| 5,345,913 A | 9/1994 | Belshaw et al. | |
| 5,772,122 A | 6/1998 | Sugiura et al. | |
| 6,095,437 A * | 8/2000 | Nozawa | F02D 7/02 239/407 |
| 6,119,658 A | 9/2000 | Jehle et al. | |
| 7,028,918 B2 | 4/2006 | Bechanan et al. | |
| 7,383,818 B1 | 6/2008 | Beardmore | |
| 7,484,499 B2 | 2/2009 | Beardmore | |
| 8,960,156 B2 | 2/2015 | Martinsson et al. | |
| 9,429,127 B2 | 8/2016 | Hongo et al. | |
| 9,890,689 B2 | 2/2018 | Hampson et al. | |
| 10,012,196 B1 | 7/2018 | Qi et al. | |
| 10,036,355 B2 | 7/2018 | Franks et al. | |
| 10,041,440 B2 | 8/2018 | Di Pietro | |
| 10,072,606 B2 | 9/2018 | Brunner | |
| 10,451,014 B2 | 10/2019 | Ting et al. | |
| 10,711,752 B2 | 7/2020 | Martin et al. | |
| 10,808,601 B2 | 10/2020 | Hashizume | |
| 11,008,932 B2 | 5/2021 | Klingbeil et al. | |
| 2003/0155432 A1 | 8/2003 | Buchanan et al. | |
| 2003/0196634 A1 | 10/2003 | Lausch et al. | |
| 2010/0236533 A1 | 9/2010 | Meldolesi et al. | |
| 2011/0067653 A1 | 3/2011 | Clark et al. | |
| 2011/0068188 A1 * | 3/2011 | Laimboeck | F02B 23/0669 239/601 |
| 2014/0084085 A1 * | 3/2014 | Hongo | F02M 69/047 239/463 |
| 2015/0211410 A1 | 7/2015 | Saville et al. | |
| 2015/0211461 A1 | 7/2015 | Shirk et al. | |
| 2015/0219051 A1 | 8/2015 | Carpenter et al. | |
| 2016/0024994 A1 * | 1/2016 | Engineer | F02B 19/12 123/256 |
| 2016/0084411 A1 | 3/2016 | Laws | |
| 2016/0303672 A1 | 10/2016 | Onley et al. | |
| 2017/0114763 A1 * | 4/2017 | Mueller | F02P 23/02 |
| 2018/0149125 A1 | 5/2018 | Ting et al. | |
| 2018/0202403 A1 | 7/2018 | Huff | |
| 2019/0017464 A1 | 1/2019 | Schlee | |
| 2019/0063391 A1 | 2/2019 | Martin et al. | |
| 2019/0218959 A1 | 7/2019 | Klingbeil et al. | |
| 2020/0040857 A1 | 2/2020 | Kurtz et al. | |
| 2020/0191045 A1 | 6/2020 | Gubba et al. | |

OTHER PUBLICATIONS

First Examination Report dated Mar. 3, 2022 for corresponding Australian Patent Application No. 2021201025 (4 pages).
Camillo "Best Practices for Press-Fit Assembly" AssemblyMag.com; Sep. 14, 2017 (4 pages).

* cited by examiner

ENGINE MIXING STRUCTURES

CROSS-REFERENCE TO RELATED APPLICATIONS

This application is a continuation-in-part of U.S. patent application Ser. No. 16/059,730, which claims priority to U.S. Provisional Application No. 62/616,702, filed 12 Jan. 2018, and U.S. Provisional Application No. 62/623,194, filed 29 Jan. 2018, the entire disclosures of all of which are incorporated herein by reference.

FIELD

The subject matter described herein relates to structures and assemblies that reduce the formation of soot in engines.

BACKGROUND

In a compression ignition engine, fuel may be directly injected into compressed hot gases, such as air or a mixture of air and recycled exhaust gas. The fuel mixes with these in-cylinder gases near the site of injection of the fuel into the cylinders of the engine. As the relatively cool fuel mixes with the higher temperature gases, the resulting mixture reaches a temperature sufficient for ignition. This may be a dynamic event and fuel may be ignited and may burn at the head of a fuel spray plume while fuel continues to be injected into the other end of the spray plume.

As the temperature of the gases entrained into the injected fuel remains high, the delay between injection of the fuel and ignition of the fuel-and-air mixture in a cylinder may be reduced. This may cause the fuel spray plume to have a sub-optimal fuel-and-air mix ratio before initial ignition, which may produce soot. The production and consequential build-up of soot may degrade performance of the engine and eventually require cleaning or other repair of the engine. Additionally, certain regulations or laws may restrict how much particulate matter or other emissions can be generated by engines.

BRIEF DESCRIPTION

In one embodiment, a mixing structure includes a body that defines an axis and extends from an injector side toward an opposite piston side along the axis. The body has an inward facing surface proximate to the axis that defines a central volume and an outward facing surface distal from the axis. The injector side of the body is configured to face a fuel injector of a cylinder of an engine while the piston side of the body is configured to face a piston head of the engine cylinder. The body includes one or more conduit surfaces that define one or more fuel-and-air mixture conduits extending through the body from the central volume. The body also includes one or more upper air channels extending through the body from the central volume. The one or more upper air channels are disposed more closely to the injector side than the one or more fuel-and-air mixture conduits proximate the central volume. The body also includes one or more lower air channels extending through the body from the central volume. The one or more lower air channels are disposed more closely to the piston side than the one or more fuel-and-air mixture conduits proximate the central volume. The central volume is configured to receive one or more streams of fuel from the fuel injector, and to receive one or more streams of air from the one or more upper air channels and one or more streams of air from the one or more lower air channels. The one or more upper air channels and the one or more lower air channels are configured to provide a substantially similar amount of flow relative to each other to the central volume. During operation, at least one of the streams of the fuel mixes with the one or more streams of air from the one or more upper air channels and the one or more streams of air from the one or more lower air channels to form a fuel-and-air mixture at a designated ratio of fuel to air. The fuel-and-air mixture conduits are configured to direct the fuel-and-air mixture out of the body and into a combustion chamber of the engine cylinder.

In one embodiment, a mixing structure includes a body defining an axis and extending from an injector side toward an opposite piston side along the axis. The body has an inward facing surface proximate to the axis that defines a central volume and an outward facing surface distal from the axis. The injector side of the body is configured to face a fuel injector of a cylinder of an engine while the piston side of the body is configured to face a piston head of the engine cylinder. The body includes conduit surfaces that define a series of fuel-and-air mixture conduits disposed about a circumference of the body and extending through the body from the central volume. Each conduit extends from the outward facing surface to the central volume. The body includes a series of upper channels extending from the outward facing surface to the central volume, with each upper channel having a corresponding upper opening, and with the upper openings arranged in an alternating fashion with the conduits along the circumference of the body. The upper air channels are disposed more closely to the injector side than the fuel-and-air mixture conduits proximate the central volume. Also, the body includes a series of lower channels extending from the outward facing surface to the central volume, with each lower channel having a corresponding lower opening, and with the lower openings arranged in an alternating fashion with the conduits along the circumference of the body. The lower air channels are disposed more closely to the piston side than the fuel-and-air mixture conduits proximate the central volume. The central volume is configured to receive one or more streams of fuel from the fuel injector, and to receive one or more streams of air from the upper air channels and one or more streams of air from the lower air channels. During operation, at least one of the streams of the fuel mixes with the one or more streams of air from the upper air channels and the one or more streams of air from the lower air channels to form a fuel-and-air mixture at a designated ratio of fuel to air. The fuel-and-air mixture conduits are configured to direct the fuel-and-air mixture out of the body and into a combustion chamber of the engine cylinder.

In one embodiment, a mixing structure includes a body defining an axis and extending from an injector side toward an opposite piston side along the axis. The body has an inward facing surface proximate to the axis that defines a central volume and an outward facing surface distal from the axis. The injector side of the body is configured to face a fuel injector of a cylinder of an engine while the piston side of the body is configured to face a piston head of the engine cylinder. The body includes one or more conduit surfaces that define a series of fuel-and-air mixture conduits disposed about a circumference of the body and extending from the outward facing surface to the central volume. Also, the body includes a series of upper channels extending from the outward facing surface to the central volume, with each upper channel having a corresponding upper opening, and with the upper openings arranged in an alternating fashion with the conduits along the circumference of the body. The one or more upper air channels are disposed more closely to the injector side than the one or more fuel-and-air mixture conduits proximate the central volume. Also, the body includes a single lower air channel comprising an opening extending through the piston side to the central volume. The central volume is configured to receive one or more streams of fuel from the fuel injector, and also to receive one or more streams of air from the upper air channels and one or more streams of air from the lower air channel, with the upper air channels combined and the lower air channel configured to provide a substantially similar amount of flow relative to each other to the central volume. During operation, at least one of the streams of the fuel mixes with the one or more streams of air from the upper air channels and the one or more streams of air from the lower air channel to form a fuel-and-air mixture at a designated ratio of fuel to air. The fuel-and-air mixture conduits are configured to direct the fuel-and-air mixture out of the body and into a combustion chamber of the engine cylinder.

BRIEF DESCRIPTION OF THE DRAWINGS

The present inventive subject matter may be understood from reading the following description of non-limiting embodiments, with reference to the attached drawings, wherein below.

DETAILED DESCRIPTION

One or more embodiments of the inventive subject matter described herein provide mixing structures or assemblies. The mixing structures or assemblies may be mechanical structures disposed at or near fuel injectors of cylinders in an engine. The mixing structures may affect and/or control an ignition delay of the fuel (e.g., by delaying the ignition relative to the time of injection). Ignition control may allow for a different (e.g., leaner) fuel-and-air mixture to be achieved prior to the mixture arriving at a region of combustion to ignite or combust. Several concepts are described herein that facilitate this modification of the fuel combustion event. Although tubes and ducts may be used in some assemblies, other mixing structures and assemblies define channels, flow paths, conduits, and the like and do not include a tube structure nor include a duct structure within the combustion chamber of a cylinder. Some assemblies having tubes or ducts have been shown to suffer from catastrophic failures, such as explosions occurring within the tubes.

With reference to some of such concepts, the mixing structures or assemblies may be placed in cylinder heads between the fuel injectors and the pistons or may be disposed on top of the pistons. Such assemblies may control (e.g., reduce) an amount of hot gas that is entrained into an injected fuel stream. A fuel injector may inject the fuel and may have a nozzle that forms a plurality of fuel streams.

By adding in these mixing structures, the fuel and air may have more time to mix prior to igniting. The ratio of fuel to gas/air may be controlled. The mixing process of the fuel and gas/air may be controlled. It may be the case that controlling the mixing of fuel and gas/air may reduce or eliminate the production of certain exhaust products (e.g., soot, NOx) during the combustion process.

By adding in these mixing structures, the structure may contact the hot gas and air to act as a heat sink. In this way, it may locally cool the previously hot gas/air as it is incorporated into, entrained, and/or swept along with a fuel stream plume. The mixing structure may cool the gases that may be entrained into fuel streams injected into the cylinder. A cooler mixture may delay ignition and thereby reduce an amount of soot generated or prevent generation of soot altogether. Various embodiments of the mixing structure may be referred to as a soot reduction assembly or an engine assembly. As used herein, the terms gas or gases are inclusive of air, a combination of air and recycled exhaust gas (EGR), a combination of air and other diluents (e.g., water vapor, CO2, and/or N2, etc.), air modified to change the oxygen concentration, and a combination of any of the foregoing with aspirated natural gas.

Figure 1:
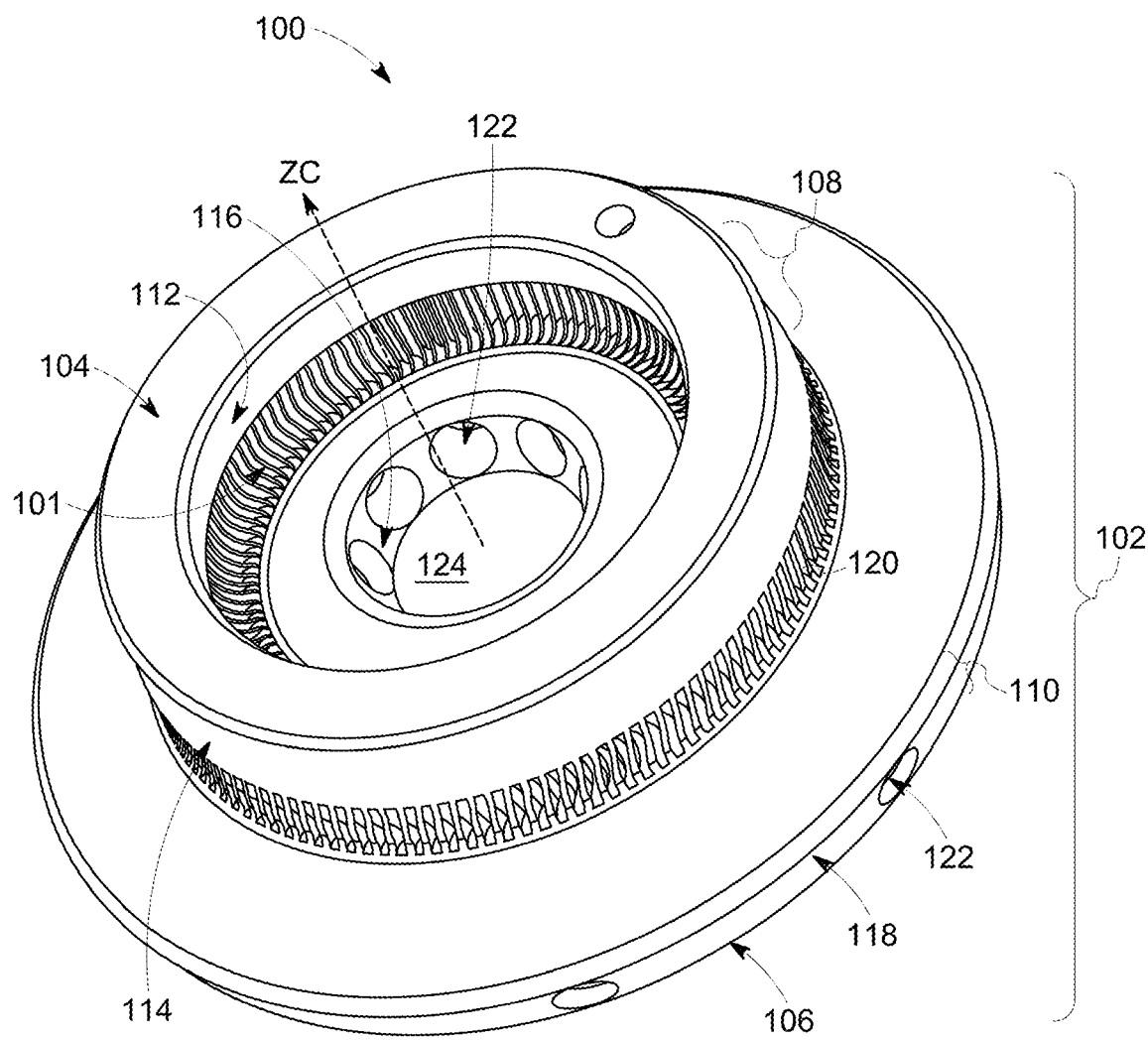
FIG. 1 is a perspective view of one embodiment of a mixing structure for a cylinder of an engine.
Figure 2:
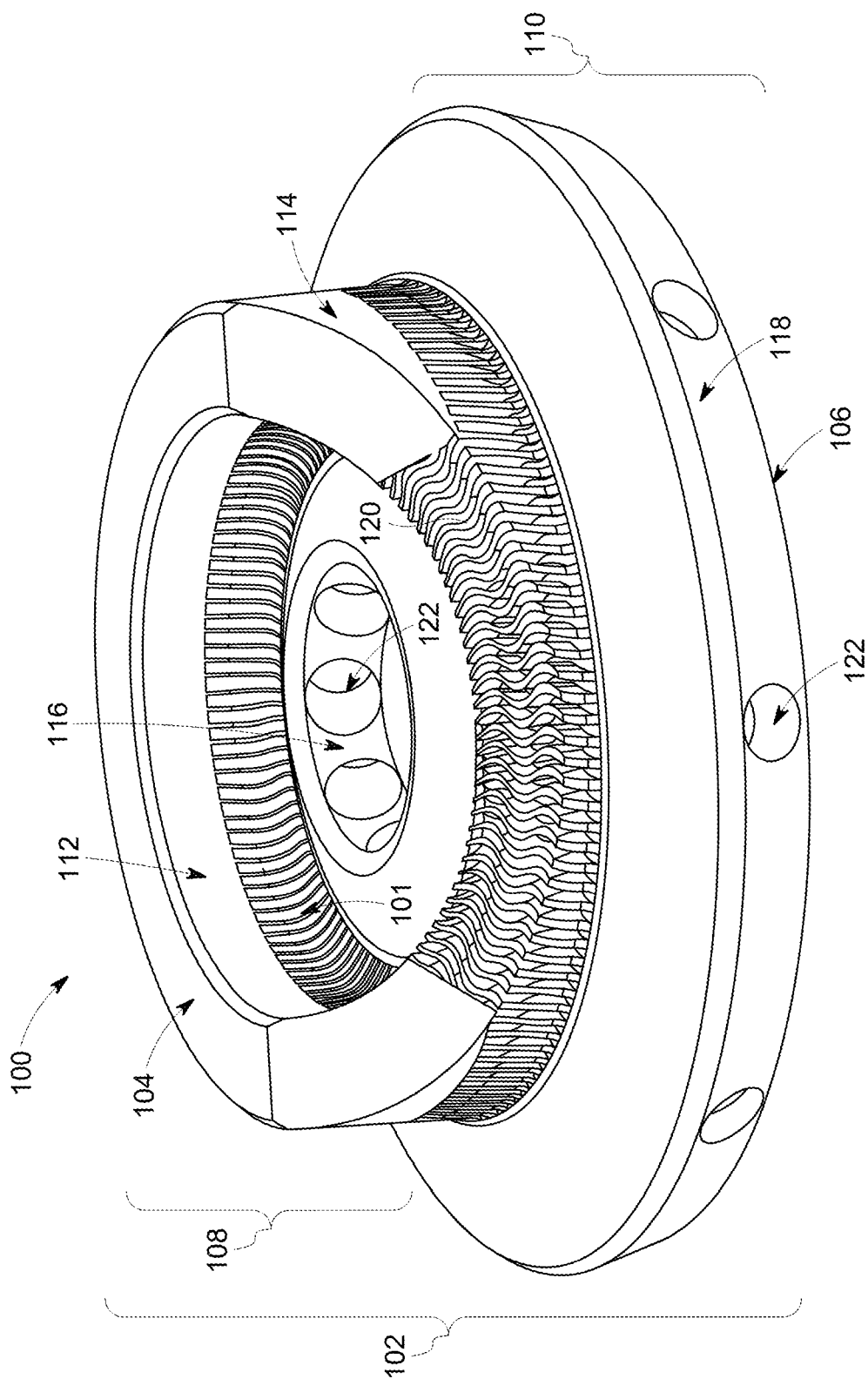
FIG. 2 is partial cross-sectional view of the mixing structure shown in FIG. 1.

FIG. 1 is a perspective view of one embodiment of a mixing structure 100 configured for use in a cylinder of an engine. FIG. 2 is a partial cross-sectional view of the mixing structure shown in FIG. 1. The mixing structure may be formed from a body 102 having one or more interior or central disposed volumes 124 that encircle a center axis ZC. The body extends along the center axis ZC from a fuel injector side 104 to an opposite piston side 106. The fuel injector side can face a fuel injector when in an installed and operational condition so that it injects fuel into the cylinder in coordination with the insert assembly. The piston side can face the crown or piston head of this same cylinder.

The mixing structure may attach or couple to the piston crown or cylinder head. The body may attach or couple to a cylinder head and remain stationary while a piston in the cylinder moves relative to the mixing structure, the fuel injector, and the cylinder head. In one embodiment, the body may be attached to the crown of the piston (e.g., the end of the piston that may be closest to the fuel injector) and may move toward and away from the fuel injector and cylinder head during operation of the piston.

In one embodiment, the body may include a step portion 108 and a second portion 110 extending in directions along the center axis ZC. In the illustrated embodiment, the upper step has a smaller outer circumference than the outer circumference of the lower portion. The step may radially extend (relative to the center axis ZC) from an inner surface 112 to an opposite distal outer surface 114 and the second portion may define an annulus and radially extend (relative to the center axis ZC) from an inner surface 116 to an opposite distal outer surface 118. The outer surface of the second portion may be located farther from the center axis ZC than the outer surface of the upper step. In other embodiments, the upper step and/or second portion has an outer surface that may be located a different distance from the center axis ZC; or, the inner surface of the second portion may be located farther from the center axis ZC than the inner surface of the upper step. The transition between the step portion and the second portion may be smooth or may have a texture or surface profile; and, it may be at about a 90-degree angle relative to at least one of the step portion or the second portion, or may have a linear profile and be angle at about 45 degrees towards or away from the outer periphery; and, the transition may have a nonlinear profile and bow or undulate in a convex or concave manner. In one embodiment, at least one segment of the surface of the step portion may be configured to direct exhaust gas from inside the cylinder to a proximate exhaust valve. In one embodiment, at least one other segment of the surface of the step portion may be configured to affect or control a flow of intake gas (or intake gas and natural gas for a multi-fuel capable engine) into the cylinder. The configuration of these, and other aspects of the topology, have varying levels of impact on a host of performance factors. As such, the selection and combination of configuration factors may be selected with reference to the engine type, fuel type, cylinder/piston size, duty cycle of the engine, regulation for emissions, fuel consumption rates, EGR levels, the use of multi-fuel systems, and the like. While some specific combinations of features are set forth herein for examples, other combinations may be used in conjunction with features external to the inventive device to achieve desired outcomes in specific applications.

The step portion and second portion may be connected by one or more gas channels 101. In the illustrated embodiment, the gas channels may be integrally formed from, or defined by, surfaces of one or more cooling fins 120. The fins may be spaced apart from each other in circumferential directions that encircle the center axis ZC. The fins radially extend from the inner surface of the upper step to the outer surface of the upper step. In the illustrated embodiment, the fins each have an undulating or wavy shape or configuration. This shape may increase the surface area of the fins (e.g., relative to flat or non-undulating fins) and create more interaction between hot gases and the surfaces of the fins for more thermal transfer of the gases, as described herein.

In another embodiment, other fins may have a different shape, size or thickness. For example, some other fins may have a generally flat shape with a smooth finish. A smooth finish may help reduce pressure drop across the length of the fin. In other embodiments, the fin surface may define a plurality of protuberances that extend away from the surfaces of the fins into the gas channels, and/or may define dimples or grooves that inwardly extend into the surfaces of the fins away from the gas channels. The shape of the fins; the number, spacing, arrangement size and profile of the protuberances and/or dimples and/or grooves; and the angle, finish and surface characteristics of each fin may affect the behavior and flow paths of gas received into the center volume of the mixing structure through the gas channels from outside of the mixing structure.

The second portion of the body may include several fuel-and-gas mixture conduits 122. These mixture conduits extend from the inner surface of the second portion to the outer surface of the second portion. The mixture conduits may be oriented at transverse angles with respect to the center axis ZC. For example, the center axes of the mixture conduits may be oriented at an acute angle that may be more than zero degrees and less than ninety degrees relative to the center axis ZC, with the mixture conduits angled away from the upper step. In one embodiment, the center axes of other mixture conduits may be oriented at another angle, such as a ninety degree or obtuse angle relative to the center axis ZC. There are several mixture conduits shown in FIGS. 1 and 2 (although only two are be labeled). The mixture conduits may be symmetrically distributed or arranged around the center axis ZC. In other embodiments, a different number of the mixture conduits is provided, for example a single mixture conduit may be used. The mixture conduits shown have a cylindrical shape, but alternative suitable shapes may include a fan shape, a conical shape, a polygon shape, a square cross-sectional shape, a rectangular cross-sectional shape, another polygon cross-sectional shape, an oval cross-sectional shape, and the like.

In any of the embodiments herein, the gas channels and/or the fuel-and-gas mixture conduits may be radially symmetrically distributed around and relative to the center axis ZC, such that there is an even amount of radial spacing between each adjacent pair of channels or conduits (that is, the radial spacing between one channel or conduit and its nearest two neighboring channels or conduits on either side is the same as the radial spacing between all other channels or conduits and their respective nearest two neighboring channels or conduits on either side). Further, in any of the embodiments, a total number of the channels may be same as, or different from, a total number of a conduits. Also, the radial spacing between adjacent channels may be the same as, or different from, the radial spacing between adjacent conduits. In one embodiment, there is a larger total number of gas channels than fuel-and-gas mixture conduits, and the gas channels are spaced radially closer to one another than the fuel-and-gas mixture conduits.

In one embodiment, the body may include the step portion and thereby to increase the distance between the mixture conduits and the fuel injector, while avoiding contact between the body and one or more valves of the fuel injector. Without the step portion the circumferential size of the body nearest the fuel injector would be much larger. This might cause the insert to contact or interfere with operation of the valves of the cylinder head.

In one embodiment, the mixing structure may be created using additive manufacturing. For example, at least the fins of the cooling assembly may be formed using a three-dimensional printing system. In one embodiment, the mixing structure may be cut from a larger body or machined in another way. Suitable materials for the mixing structure may be a thermally conductive material. In one embodiment, the mixing structure may be formed from a metal or metal alloy. In different embodiments, the mixing structure may be a ceramic or a cermet (e.g., a mixture of one or more ceramics and one or more metals), or a ceramic matric composite. The mixing structure may not be a homogeneous material. In one embodiment, the surface material differs from the internal material. This can be done during the manufacture process or may be done by coating or treating the surface of the mixing structure. Coatings may include wear resistant materials (such as diamond-like coatings, DLC) or may be active (such as catalysts) to affect the combustion event itself.

Figure 3:
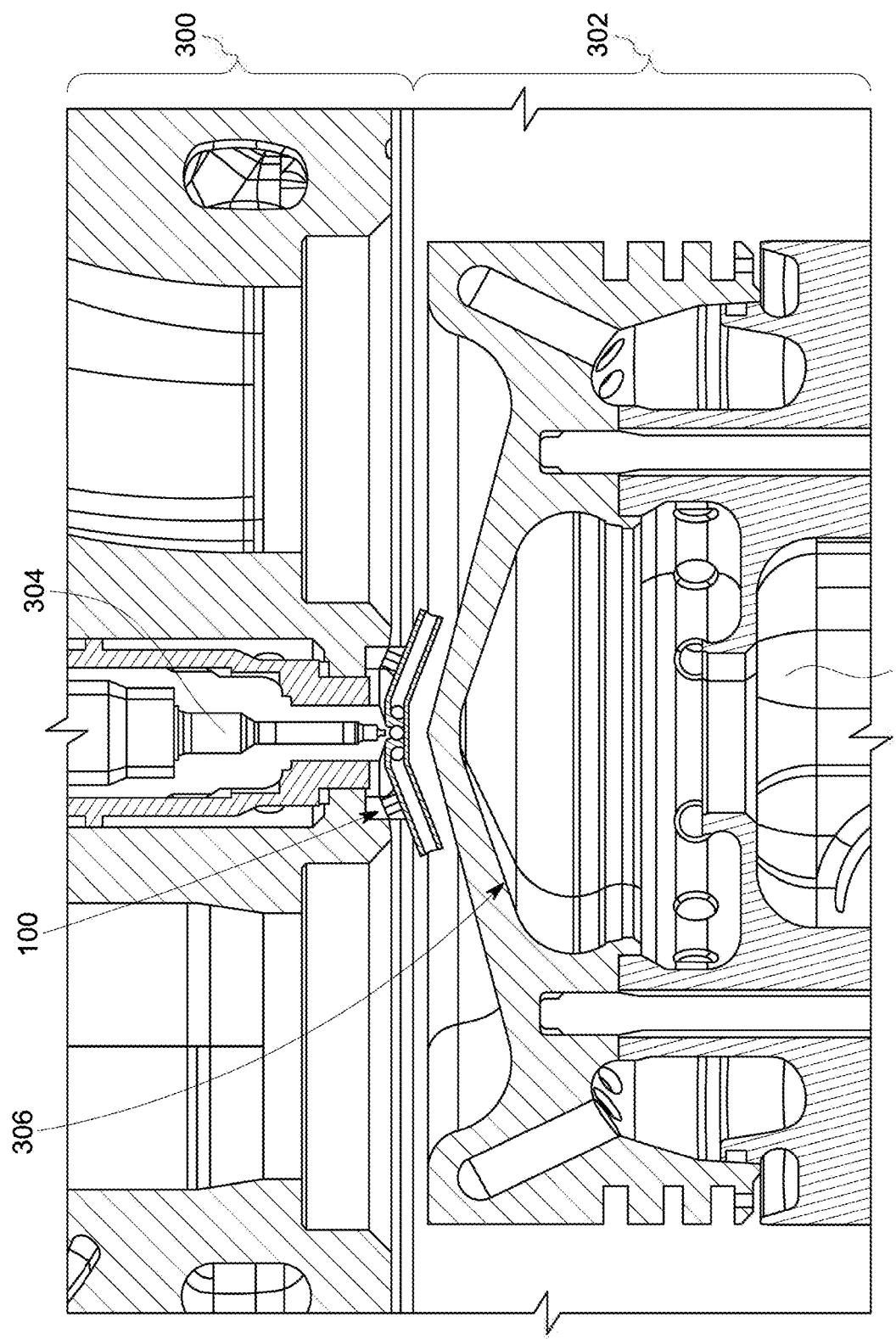
FIG. 3 illustrates a cross-sectional view of the mixing structure shown in FIGS. 1 and 2 coupled to a cylinder head of an engine cylinder in an engine according to one embodiment.
Figure 4:
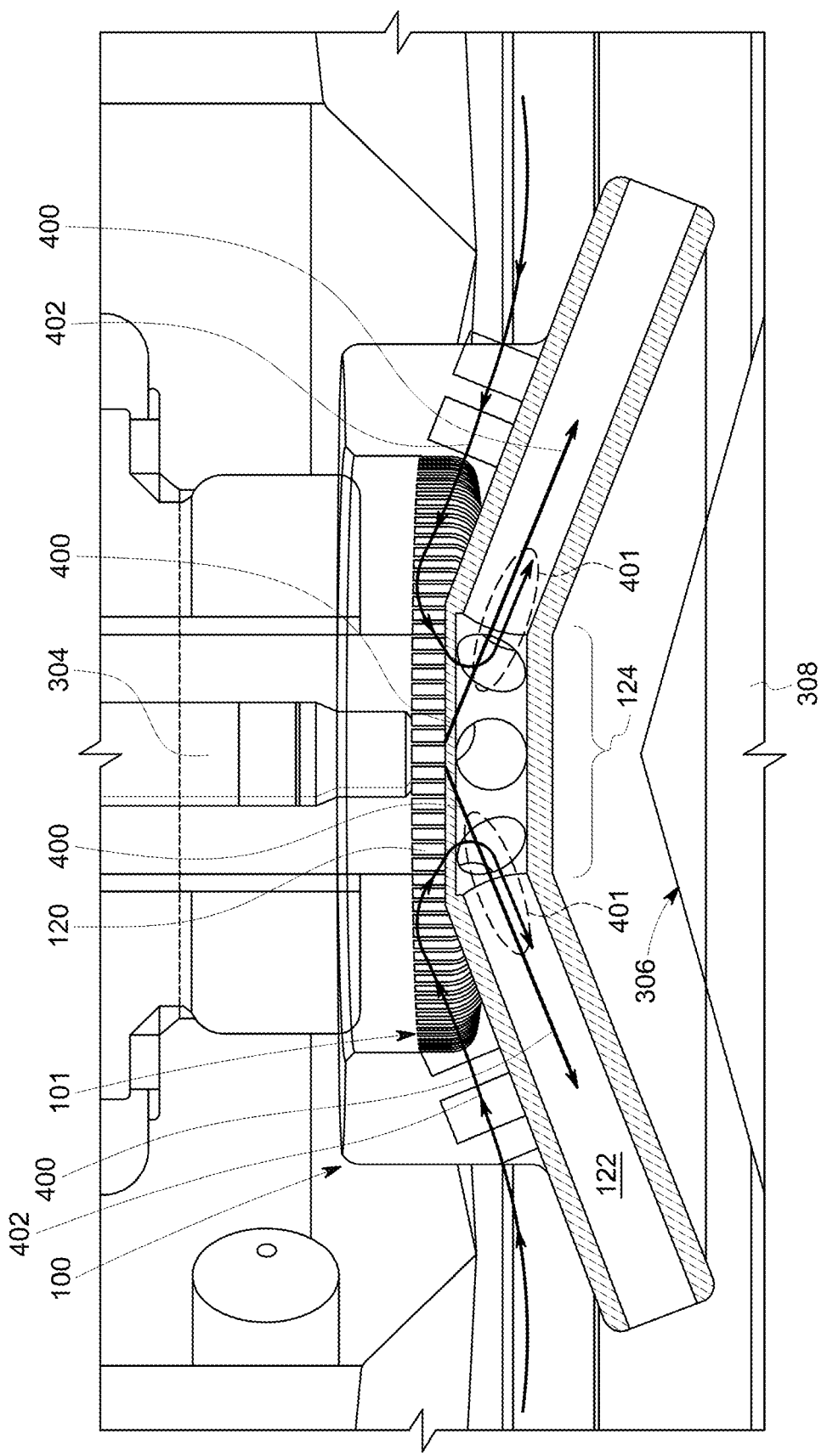
FIG. 4 illustrates another cross-sectional view of the mixing structure shown in FIGS. 1 and 2 coupled to the cylinder head of the cylinder shown in FIG. 3 according to one embodiment.

FIG. 3 illustrates a cross-sectional view of the mixing structure shown in FIGS. 1 and 2 coupled to a cylinder head 300 of an engine cylinder 302 in an engine according to one embodiment of the inventive subject matter. FIG. 4 illustrates another cross-sectional view of the mixing structure shown in FIGS. 1 and 2 coupled to the cylinder head of the cylinder shown in FIG. 3 according to one embodiment of the inventive subject matter.

The mixing structure may be affixed to the cylinder head in a location between a fuel injector 304 and a crown 306 of a piston 308 in the cylinder. The piston moves toward and away from the fuel injector during operation of the engine, or up and down in the perspective of FIGS. 3 and 4. In the illustrated embodiment, the mixing structure may be stationary as the mixing structure may be mounted or otherwise affixed to the cylinder head. The piston moves toward and away from both the fuel injector and the stationary mixing structure. In one embodiment, the mixing structure, or cooling assembly, may be affixed or otherwise coupled to, or incorporated into the crown of the piston such that the mixing structure moves with the piston toward and away from the fuel injector.

In operation, the fuel injector injects one or more streams of fuel 400 into the central volume of the mixing structure body. During operation, the fuel streams flow from the fuel injector through the central volume (shown in FIG. 1) of the mixing structure. The pressure supplied to the fuel injector may cause all or substantially all (e.g., at least 90%) of the fuel to pass through the mixture conduits (after mixing with gases, as described herein).

As the fuel flows into the internal volume of the body, the moving fuel draws gases 402 through the mixing structure. The gases, which may be relatively hot, may be pulled through the gas channels between the fins such that the hot gases move inward from outside the mixing structure, through (e.g., between) the fins, and into the center volume of the mixing structure. The fins allow the hot gases to pass from outside the body of the mixing structure to inside the step portion and second portion (e.g., along radial directions toward the center axis ZC). In one embodiment, all or substantially all the gases drawn into the interval volume of the body pass through the gas channels between the fins, with no or little to no (e.g., no more than 10%) gases being drawn into the center volume through the piston side or injector side of the mixing structure.

Each fin may operate as a heat sink to transfer thermal energy. In one embodiment, the thermal energy may transfer out of the hot gases. The at least partially cooled gases then become entrained in the flow of fuel in the center volume to form a fuel-and-gas mixture 401 inside the center volume of the body. This fuel-and-gas mixture may be formed before the fuel or gas enters the combustion chamber of the cylinder. The fuel and gas mixes to form the fuel-and-gas mixture, which flows out of the mixing structure via one or more of the mixture conduits. The fuel-and-gas mixture then flows into the combustion chamber of the cylinder. This fuel-and-gas mixture may be cooler than fuel-and-gas mixtures that do not flow through or mix within the mixing structure, which may delay ignition inside the chamber of the cylinder and prevent or reduce soot formation, as described herein.

Optionally, the mixture conduits may be oriented to direct the fuel-and-gas mixture farther into the combustion chamber of the cylinder such that the fuel-and-gas mixture penetrates further into the combustion chamber (e.g., compared to directing the fuel and gas into the combustion chamber without mixing the fuel and gas using the mixing structure. For example, mixing the fuel and gas in the body and then directing the fuel-and-gas mixture into the combustion chamber using the conduits may change the combination of mass and velocity of the mixture jet relative to the mass and velocity that the fuel and gas jet would separately have without pre-mixing the fuel and gas in the mixing structure. For example, the jet with the mixing structure may be more confined (e.g., narrower) than the jet would be without the mixing structure. Additionally, the jet may have lower initial mass entrainment but higher velocity relative to the jet without the mixing structure. Without mixing structure, the jet could entrain more gases earlier in the flow path, which would have a high mass within the domain of the spray and spreading the spray resulting in a lower velocity and lower penetration into the cylinder. The more concentrated, higher velocity of the mixture by the structure causes the mixture to enter farther into the combustion chamber to locations that may be farther from the structure (relative to not using the structure). As the penetration of the mixture into the combustion chamber increases, soot oxidation within the combustion chamber may be enhanced, which may eliminate or reduce the amount of soot in the engine cylinder.

The conduits may be shown as passageways having continuous walls that may be only open at the opposite ends of the conduits. In one embodiment, one or more (or all) of the conduits may include perforations, holes or slits distributed along the length of the conduits. These perforations or holes may be radially distributed along the lengths of the conduits, such that the perforations or holes may be at different radial distances from the axis ZC. The holes or perforations may allow additional gas to be drawn into the conduits, mixed with the fuel, and cooled before being directed into the cylinder. The arrangement, placing, size, and angle of the holes or perforations may affect the fuel-to-gas ratio of the mixture via the gas volume added, and the level of homogeneity of the mixture via the mixing effect caused by the impact of the inflowing gas streams, and the orientation of the mixture relative to the conduit inner walls by creating a buffer layer along the wall (i.e., the mixture stream can be concentrically moved through the conduit without contacting the sides). A laminar flow of gases may flow alongside the mixture stream and urge the mixture stream towards the center of the conduit.

In one embodiment, the mixture conduits may be defined by one or more exposed inner surfaces extending through the body. These inner surfaces may be cylindrical surfaces in FIGS. 1 and 2, but in other embodiments may have another shape. The shape may be selected based, at least in part, on application specific parameters. For example, these surfaces may have a conical shape such that the sizes of the openings of the conduits on the outer surface may be larger than the sizes of the openings of the conduits on the inner surface. As another suitable configuration example, the surfaces may have a conical shape with the sizes of the openings of the conduits on the outer surface being smaller than the sizes of the openings of the conduits on the inner surface. In various embodiments, the surfaces may be smooth surfaces or may have protuberances or dimples. The protuberances or dimples may change the flow paths of fuel-and-gas mixtures through the conduits to control features of the flow, such as how far the fuel-and-gas mixtures penetrate the combustion chamber of the engine cylinder or the degree of turbulence and/or mixing. This may change the degree to which there is turbulent flow rather than laminar or plug flow of the mixture. Optionally, the dimples or protuberances can facilitate mixing of the gases and fuel by causing a more turbulent flow of the gases and/or fuel that increases the degree to which the gases and fuel are more evenly mixed in the mixtures.

Suitable conduits also may have linear cylindrical shapes. For example, each conduit may be centered around or along a linear axis. In one embodiment, one or more of the conduits may have a curved shape. For example, the conduits may have curved shapes such that the conduits may be centered around curved axes having the same or different radii of curvature.

The shape of the conduits, size of the conduits, linear or curved paths of the conduits, presence of protuberances and/or dimples in the conduits, and/or perforations or holes extending to the conduits may impact the momentum and/or direction and/or angular momentum in which the fuel-and-gas mixture exits from the mixing structure. One or more of these parameters may be varied or change for mixing structures used for different types of fuels, for different temperatures of gas, for different engines, for different cylinders, or the like, to control how far the fuel-and-gas mixture penetrates the combustion chambers of the engine cylinders.

Figure 5:
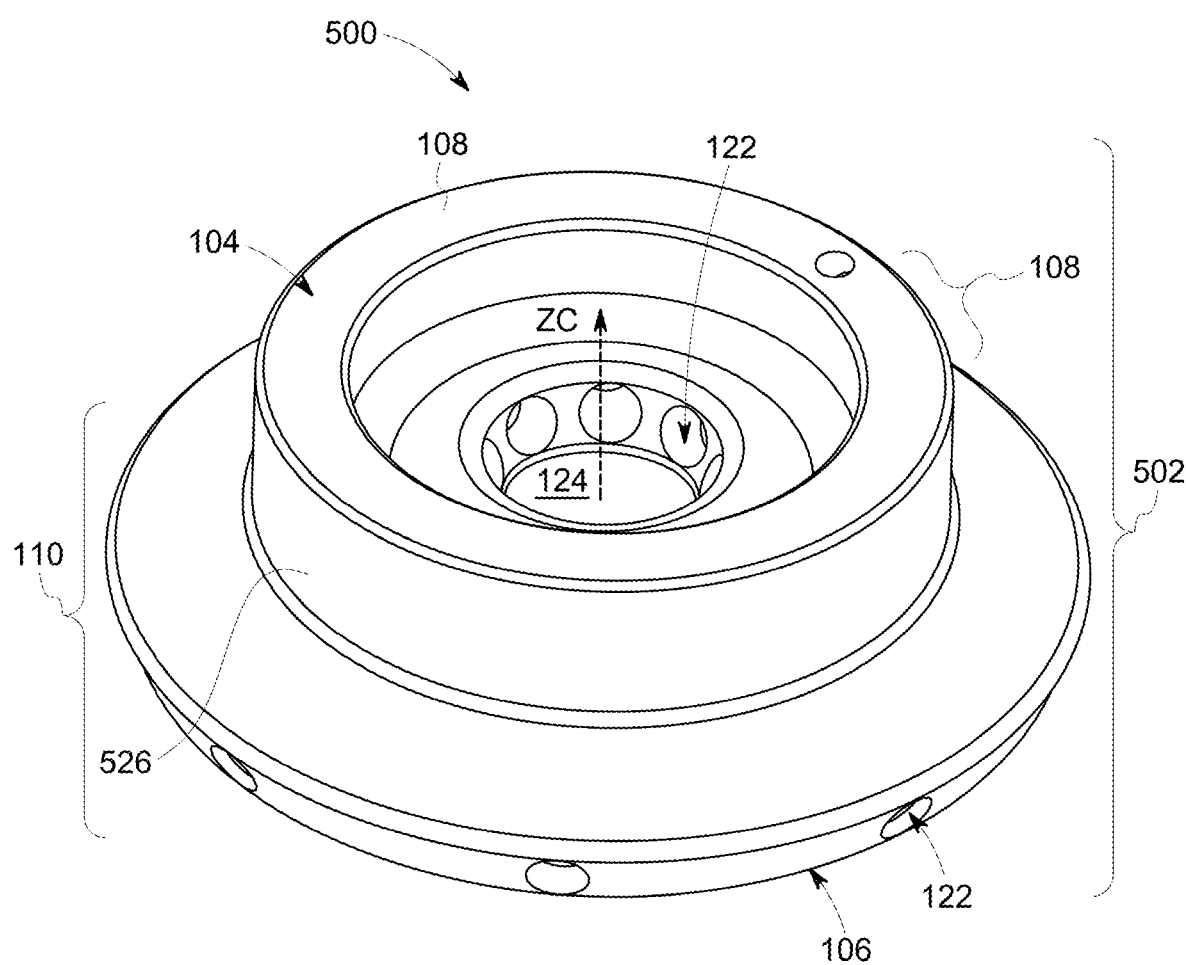
FIG. 5 is a perspective view of another embodiment of a mixing structure for a cylinder of an engine.

FIG. 5 is a perspective view of another embodiment of a mixing structure 500 for a cylinder of an engine. The mixing structure optionally may be referred to as a soot reduction assembly because the mixing structure cools the gases that may be entrained into fuel injected into the cylinder, thereby delaying ignition and reducing the amount of soot generated or preventing generation of soot. Additionally, the mixing structure may direct the fuel-and-gas mixture farther into the combustion chamber of an engine cylinder. This may oxidize more soot.

The mixing structure shown in FIG. 5 has some features similar or identical to the mixing structure shown in FIGS. 1 and 2. The mixing structure may be formed from a body 502 having a shape that extends around a center axis ZC in the center or central volume. While various mixing structures may be shown as having a single center volume, in one embodiment, the mixing structures may include one or more interior walls that divide the central volumes into two or more smaller central volumes.

The body extends along the center axis ZC from the fuel injector side 104 to the opposite piston side described above. The body of the mixing structure may be attached to a cylinder head or may be attached to the crown of the piston and may move toward and away from the fuel injector and cylinder head during operation of the piston.

The body may include the upper step and the second portion. In contrast to the mixing structure, the body of the mixing structure does not include any fins between the step portion and portion or any air passages radially extending through the step portion. Instead, the upper step portion and second portion may be connected by a solid wall 526. As described above, the second portion may include one or more mixture conduits.

During operation, the fuel injector injects the fuel into the central volume of the mixing structure. The moving fuel draws the hot gases through the mixing structure. The hot gases may be pulled into the center volume and mix with the fuel inside the center volume to form the fuel-and-gas mixture. This mixture may be directed out of the mixing structure and into the combustion chamber of the cylinder through the mixture conduits. The body of the mixing structure may operate as a heat sink to draw thermal energy out of the hot gases and cool the gases before, during, and/or after the gases mix with the fuel inside the center volume. The at-least-partially-cooled gases then become entrained in the flow of fuel in the center volume, and flow as the fuel-and-gas mixture out of the mixing structure via one or more of the conduits. The fuel-and-gas mixture then flows into the combustion chamber of the cylinder. This fuel-and-gas mixture may be cooler than fuel-and-gas mixtures that do not flow through or mix within the mixing structure, which may delay ignition inside the chamber of the cylinder. Delayed ignition may prevent or reduce soot formation, as described herein.

Figure 6:
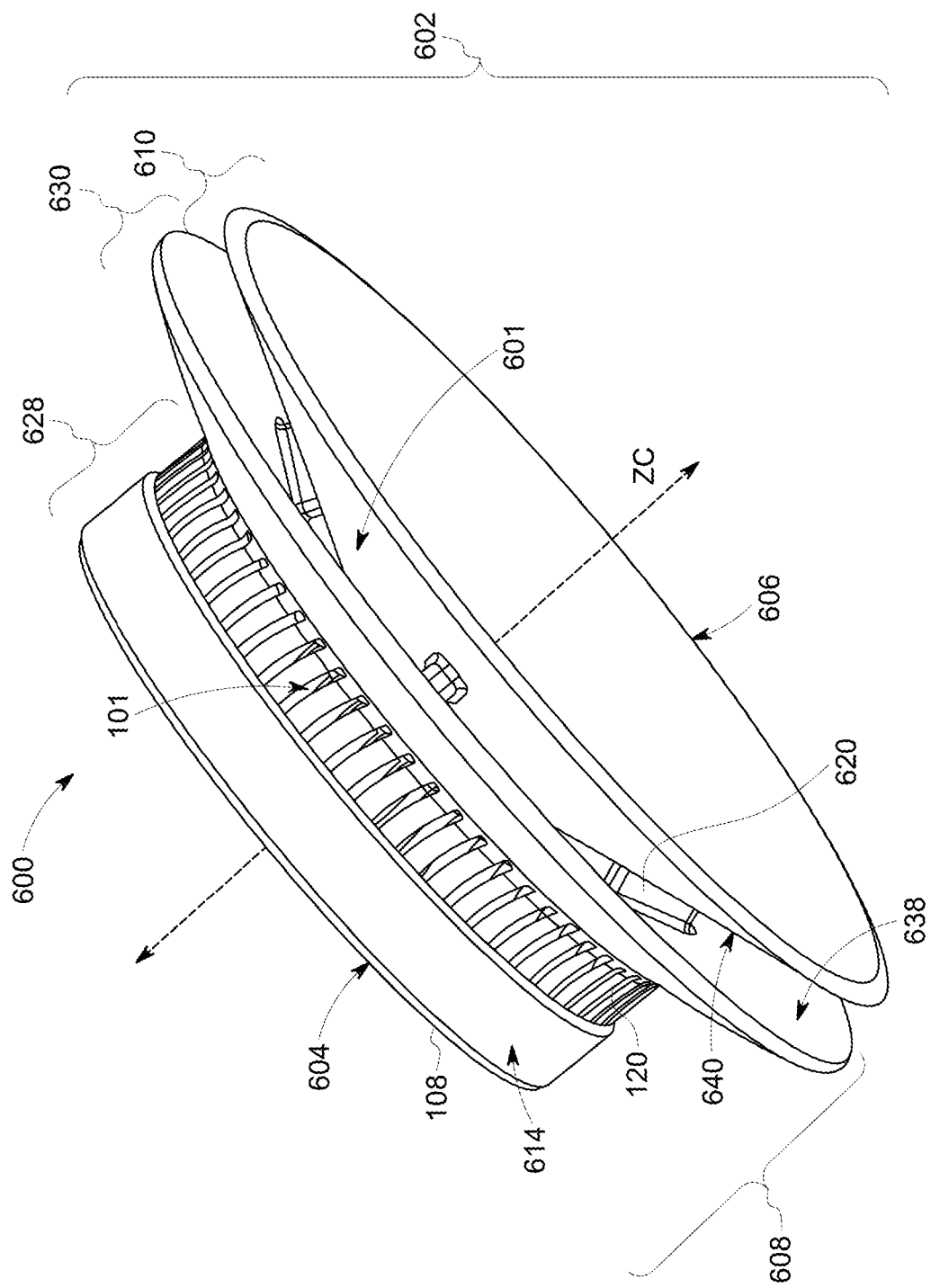
FIG. 6 is a perspective view of another embodiment of a mixing structure for a cylinder of an engine.

FIG. 6 is a perspective view of another embodiment of a mixing structure 600 for a cylinder of an engine. As noted herein, embodiments of the mixing structure optionally may be referred to as a soot reduction assembly. In such embodiments the mixing structure may cool the gases that may be entrained into fuel injected into the cylinder, thereby delaying ignition and reducing the amount of soot generated or preventing generation of soot. Additionally, the mixing structure may direct the fuel-and-gas mixture farther into the combustion chamber of an engine cylinder to oxidize more soot.

The mixing structure may be formed from a body 602 having a shape that extends around a center axis ZC in one or more central volumes (not visible in FIG. 6, but shaped identical or similar to the central volume). The body extends along the center axis ZC from a fuel injector side 604 to an opposite piston side 606. The fuel injector side faces a fuel injector that injects fuel into the cylinder with which the mixing structure may be associated. The piston side faces the crown of the piston in this same cylinder.

The body may be a single piece body, such as a body that may be printed as a single, continuous body. For example, the body may be a monolithic body formed from a single body of material and not formed from two or more pieces that are joined together. The single piece body may not have any seams or interfaces that would exist if the body were formed by two or more pieces joined together, with the seams or interfaces present at the locations where the pieces are joined together. Alternatively, the body may be formed from two or more separate pieces.

The body of the mixing structure may be attached to a cylinder head (with the fuel injector also attached to the cylinder head) and remain stationary while a piston in the cylinder moves relative to the mixing structure, the fuel injector, and the cylinder head. In one embodiment, the body may be attached to the crown of the piston (e.g., the end of the piston that may be closest to the fuel injector) and may move toward and away from the fuel injector and cylinder head during operation of the piston. In an alternative embodiment, the body may be formed from two or more separate (e.g., not coupled) parts, with one part being coupled with the top of the piston and another part coupled with the cylinder head.

The body may include an upper portion 608 (having the step) and a second portion 610 spaced apart from each other along the center axis ZC. The upper portion may include a cylindrical stage or portion 628 (e.g., the step) and a conical stage or portion 630. The cylindrical stage has an outer surface 614 that may be at or approximately at (e.g., within manufacturing or printing tolerances) the same radial distance away from the center axis ZC. The conical stage has a cone shape that extends farther away from the center axis ZC in locations that may be farther from the cylindrical stage. The conical stage flares out or away from the center axis ZC. For example, the outer surface of the body at the end of the conical stage that intersects the cylindrical stage may be closer to the center axis ZC than the opposite end of the conical stage.

The second portion also has a conical shape that flares away from the center axis ZC. The conical stage of the upper portion and the conical portion form concentric cones or portions of cones that may be centered on or along the center axis ZC. The portions may be connected by one or more spacers 620. In the illustrated embodiment, the spacers may be columns that extend from a bottom surface 638 of the conical stage of the upper portion to an opposing upper surface 640 of the conical portion.

The cylindrical stage of the upper portion may include several of the fins that may be spaced apart from each other in circumferential directions that encircle the center axis ZC to form the gas passages or channels. The fins radially extend from the inner surface of the cylindrical stage of the upper portion to the opposite outer surface of the cylindrical stage of the upper portion.

In operation, the fuel injector injects the fuel into the internal volume of the mixing structure. The moving fuel draws the hot gases through gas channels and into the mixing structure. All or substantially all gases drawn into the central volume may be pulled through the gas channels in one embodiment. The hot gases may be pulled into the center volume through the gas channels between the fins by the flow of fuel.

The fins operate as heat sinks to draw thermal energy out of the hot gases and cool the gases, similar to as described above in connection with the embodiment of the mixing structure shown in FIGS. 1 through 4. The at least partially cooled gases then become entrained in the flow of fuel in the center opening to form the fuel-and-gas mixture inside the central volume of the mixing structure. This mixture then flows out of the mixing structure via a space 601 between the bottom surface of the conical stage of the upper portion and the upper surface of the conical portion. In one embodiment, some of the mixture may flow out of a center aperture 603 (shown in FIG. 8) that may be fluidly coupled with the central volume and around which the conical portions encircle. Alternatively, some of the gas flowing into the center aperture that is entrained with the fuel to form the fuel-and-gas mixture can enter the center aperture from outside of the mixing structure through the center aperture.

The fuel-and-gas mixture then flows into the combustion chamber of the cylinder. This fuel-and-gas mixture may be cooler than fuel-and-gas mixtures that do not flow through or mix within the mixing structure, which may delay ignition inside the chamber of the cylinder and prevent or reduce soot formation, as described herein.

In one embodiment, the mixing structure may have an outlet through which the fuel-and-gas mixture leaves the body of the mixing structure, which may be a continuous or nearly continuous circle. By way of contrast, some other of embodiments have the fuel-and-gas mixture exit the mixing structures through separate and spaced apart conduits and, as a result, several plumes of the fuel-and-gas mixture come out of the mixing structures at discrete locations along the outer perimeter or circumference of the second portion of the structures. The concentric cones in the body of the mixing structure direct the fuel-and-gas mixture to leave the body along all or substantially all (e.g., at least 90%) of the outer perimeter or circumference of the conical portion. The spacers 620 may disrupt or partially block the flow of the fuel-and-gas mixture out from the body in corresponding locations. But, the fuel-and-gas mixture may flow over the remainder of the outer perimeter or circumference of the conical portion. This may spread the fuel-and-gas mixture over a larger volume prior to entering the combustion chamber of the engine cylinder, which may further cool the fuel-and-gas mixture for the reduction or elimination of soot generation.

In one embodiment, the upper portion and the lower (e.g., conical) portion may be separate bodies. For example, the spacers, columns, or connectors may be fixed with one of the upper portion or the conical portion, but not both. Instead, the spacers may be fixed to the upper portion or the conical portion, but not the other of the conical portion or the upper portion. The upper portion may be coupled with the cylinder head, while the conical portion may be coupled with the crown of the piston. The portions 608, 610 may be brought into contact, or close proximity, with each other when the piston moves toward the fuel injector (and the fuel injector injects fuel into the mixing structure). The portions 608, 606 may be separated from each other when the piston moves away from the fuel injector.

Figure 7:
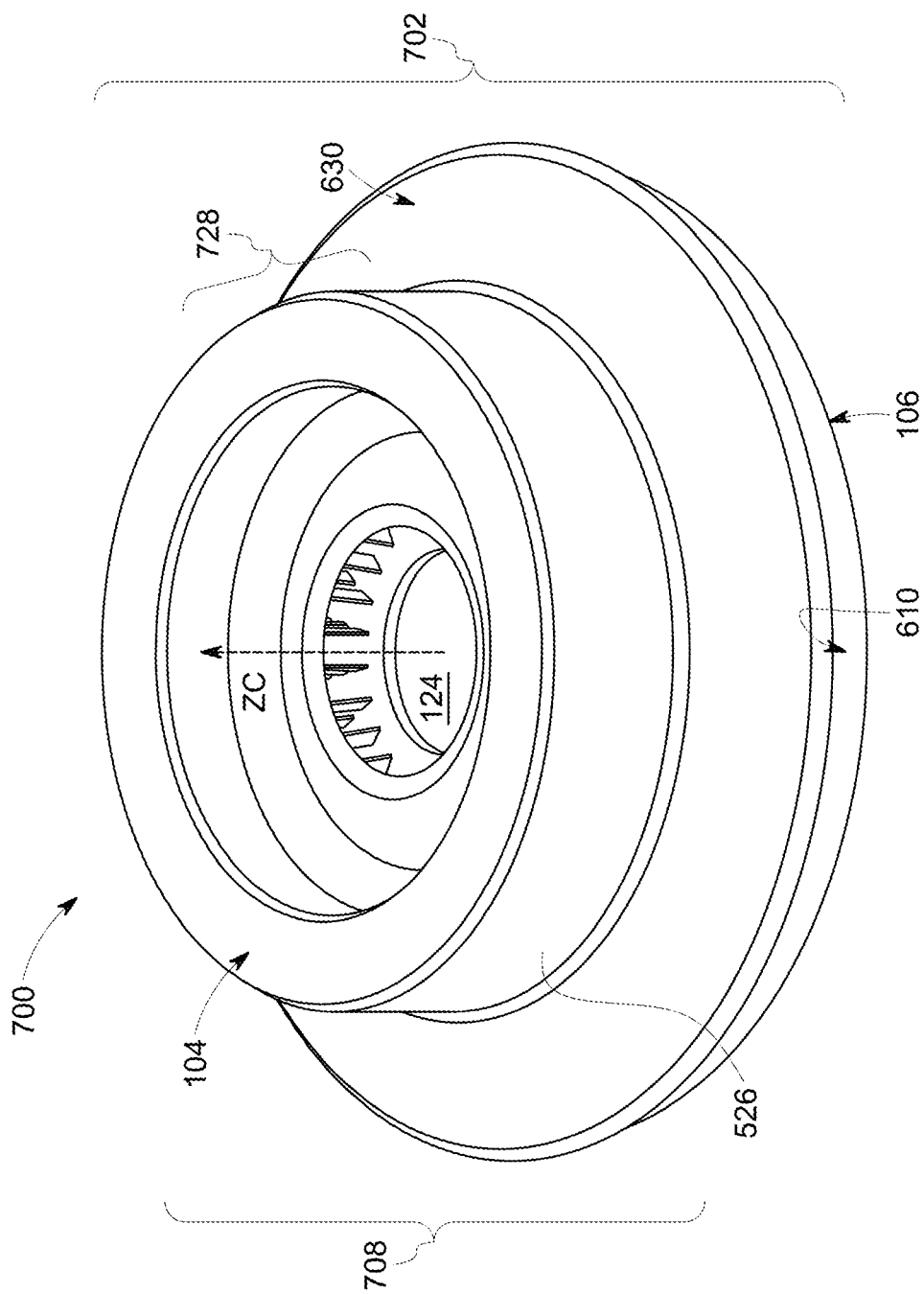
FIG. 7 is a perspective view of another embodiment of a mixing structure for a cylinder of an engine.

FIG. 7 is a perspective view of another embodiment of a mixing structure 700 for a cylinder of an engine. This mixing structure may be referred to as a soot reduction assembly because the mixing structure cools the gases that may be entrained into fuel injected into the cylinder, thereby delaying ignition and reducing the amount of soot generated or preventing generation of soot. Additionally, the mixing structure may direct the fuel-and-gas mixture farther into the combustion chamber of an engine cylinder to oxidize more soot.

The mixing structure may be formed from a body 702 having a shape that extends around a center axis ZC in the central volume. The body extends along the center axis ZC from the fuel injector side to the opposite piston side described above in connection with the mixing structure. The fuel injector side faces a fuel injector that injects fuel into the cylinder with which the mixing structure may be associated. The piston side faces the crown of the piston in this same cylinder.

The body of the mixing structure may be attached to a cylinder head (with the fuel injector also attached to the cylinder head) and remain stationary while a piston in the cylinder moves relative to the mixing structure, the fuel injector, and the cylinder head. In one embodiment, the body may be attached to the crown of the piston (e.g., the end of the piston that may be closest to the fuel injector) and may move toward and away from the fuel injector and cylinder head during operation of the piston.

The body may include an upper portion 708 that may be based on a combination of the upper step of the mixing structure shown in FIG. 5 and the upper portion of the mixing structure shown in FIG. 6. The upper portion may include a solid ring portion or stage 728 (e.g., similar to the upper part of the upper step of the mixing structure that may include the solid wall 526) and a conical stage.

The body may include several of the components described herein in connection with other embodiments. For example, the body may include a solid wall (instead of the air channels and fins) that is described above in connection with the mixing structure shown in FIG. 5, the conical stage that may be coupled with the wall (and that forms part of the upper portion with the wall), and the lower conical portion.

One difference between the body of the mixing structure and the body of the mixing structure shown in FIG. 6 may be the number and arrangement of spacers in the body. The body may include several thin columns that form the spacers. The spacers may differ in number, size, thickness, length, profile and material from embodiment to embodiment. An increased number and thinner shape of the spacers may assist with mixing the fuel-and-gas mixture as this mixture flows in the space between the conical stage and the conical portion, and also may increase the surface area that contacts the fuel-and-gas mixture. That is, the spacers may operate as heat sinks and may dissipate thermal energy from the fuel-and-gas mixture in a manner similar to the fins described herein.

In operation, the fuel injector injects the fuel into the central volume of the mixing structure. The moving fuel draws the hot gases through the mixing structure. The hot gases may be pulled into the central volume between the fuel injector side of the body and the fuel injector, similar to how the hot gases may be drawn into the body of the mixing structure.

The gases then become entrained in the flow of fuel in the central volume, and flow as the fuel-and-gas mixture out of the mixing structure via the space between the conical stage 630 of the upper portion and the conical portion. The fuel-and-gas mixture may flow between the spacers, and the spacers may operate as heat sinks to cool the fuel-and-gas mixture. The fuel-and-gas mixture then flows into the combustion chamber of the cylinder. This fuel-and-gas mixture may be cooler than fuel-and-gas mixtures that do not flow through or mix within the mixing structure, which may delay ignition inside the chamber of the cylinder and prevent or reduce soot formation, as described herein.

Similar to the mixing structure, the outlet through which the fuel-and-gas mixture leaves the body of the mixing structure may be a continuous or substantially continuous circle. The concentric cones in the body of the mixing structure direct the fuel-and-gas mixture to leave the body along all or substantially all (e.g., at least 90%) of the outer perimeter or circumference of the conical stage 630. The spacers may disrupt or partially block the flow of the fuel-and-gas mixture out from the body in corresponding locations. But, the fuel-and-gas mixture may flow over the remainder of the outer perimeter or circumference of the conical portion. This may spread the fuel-and-gas mixture over a larger volume, which may further cool the fuel-and-gas mixture for the reduction or elimination of soot generation.

Figure 8:
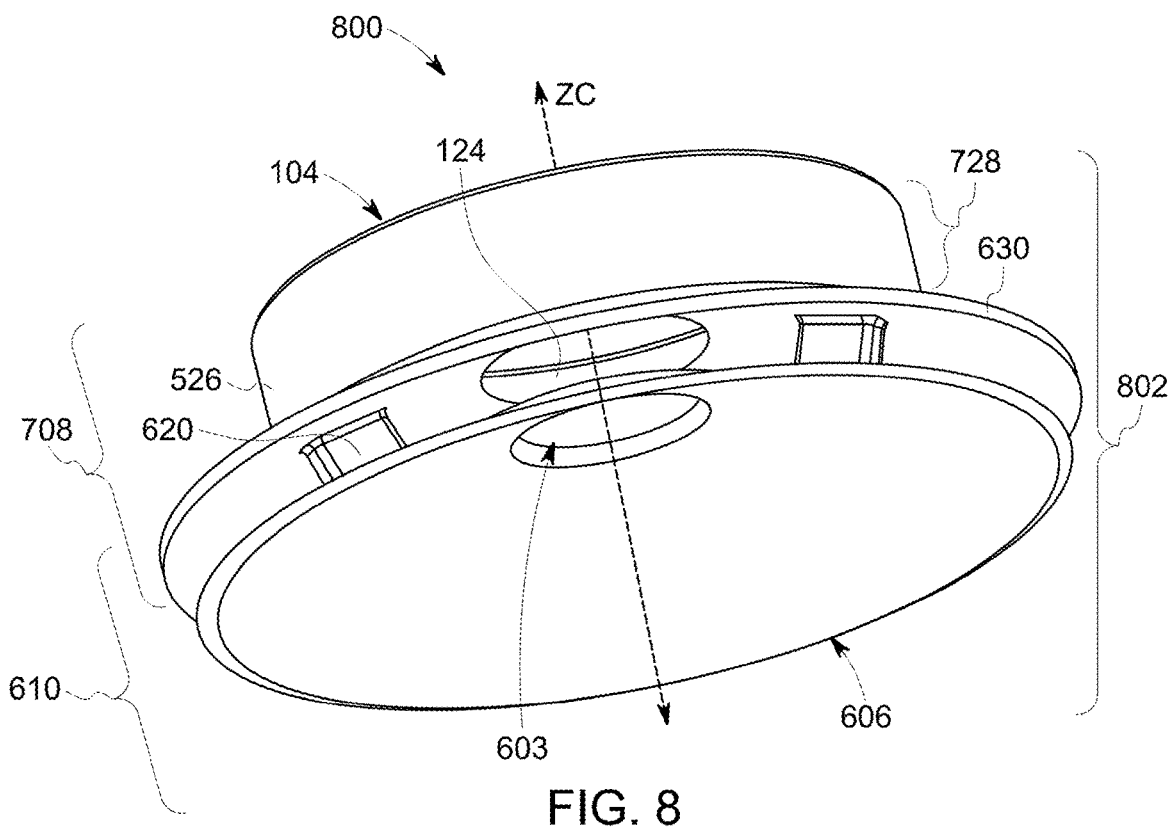
FIG. 8 is a perspective view of another embodiment of a mixing structure for a cylinder of an engine.

FIG. 8 is a perspective view of another embodiment of a mixing structure 800 for a cylinder of an engine. The mixing structure optionally may be referred to as a soot reduction assembly because the mixing structure cools the gases that may be entrained into fuel injected into the cylinder, thereby delaying ignition and reducing the amount of soot generated or preventing generation of soot. Additionally, the mixing structure may direct the fuel-and-air mixture farther into the combustion chamber of an engine cylinder to oxidize more soot.

The mixing structure may be formed from a body 802 having a shape that extends around a center axis ZC in the central volume. This body extends along the center axis ZC from the fuel injector side to the opposite piston side described above in connection with other cooling assemblies. The fuel injector side faces a fuel injector that injects fuel into the cylinder with which the mixing structure may be associated. The cylinder side faces the crown of the piston in this same cylinder.

The body of the mixing structure may be attached to a cylinder head (with the fuel injector also attached to the cylinder head) and remain stationary while a piston in the cylinder moves relative to the mixing structure, the fuel injector, and the cylinder head. In one embodiment, the body may be attached to the crown of the piston (e.g., the end of the piston that may be closest to the fuel injector) and may move toward and away from the fuel injector and cylinder head during operation of the piston.

The body may include several of the components described herein in connection with other embodiments. The body may include the upper portion that may be based on a combination of the upper step of the mixing structure shown in FIG. 5 and the upper portion of the mixing structure shown in FIG. 6, and that may be described above in connection with the mixing structure shown in FIG. 7. The upper portion may include the solid ring portion or stage and the conical stage. The body may include a solid wall described above, the conical stage that may be coupled with a wall, and the lower conical portion. The body also may include one or more spacers that connect the conical stage and the conical portion.

In operation, the fuel injector injects the fuel into the central volume of the body. The moving fuel draws the hot gases through the mixing structure. The hot gases may be pulled into the center opening between the fuel injector side and the fuel injector.

The gases become entrained in the flow of fuel in the central volume, and flow as the fuel-and-gas mixture out of the mixing structure via the space between the conical stage of the upper portion and the conical portion. Some of the mixture may exit the structure via the aperture. The fuel-and-gas mixture may contact the body within this space and transfer thermal energy to the body to cool the fuel-and-gas mixture. The fuel-and-gas mixture then flows into the combustion chamber of the cylinder. This fuel-and-gas mixture may be cooler than fuel-and-gas mixtures that do not flow through or mix within the mixing structure, which may delay ignition inside the chamber of the cylinder and prevent or reduce soot formation, as described herein.

Additionally, the outlet through which the fuel-and-gas mixture leaves the body of the mixing structure may be a continuous or substantially continuous circle, as described above. The fuel-and-gas mixture may be spread out over a larger volume, which may further cool the fuel-and-gas mixture for the reduction or elimination of soot generation.

The cooling assemblies described herein may be a single piece body with all parts and components secured with each other and with a common other component (e.g., the entire body of the mixing structure may be fixed to the cylinder head or the piston, but not both). In one embodiment, one or more of the cooling assemblies may be formed from a multi-piece body, with one part of the body (e.g., the upper portion or step) being coupled with the cylinder head and another part of the body (e.g., the lower portion) being coupled with the crown of the piston. These parts may be brought into contact or close proximity with each other as the piston moves toward the fuel injector (and fuel may be injected into the body by the fuel injector) and may move apart as the piston moves away from the fuel injector.

In one embodiment, a mixing structure for a cylinder in an engine may be provided. The mixing structure may include an annular body encircling a center opening and a center axis. The annular body may be shaped to be placed between a fuel injector of the cylinder and a piston in a combustion chamber of the cylinder. The annular body may be shaped to receive fuel from the fuel injector into the center opening of the annular body along the center axis. The annular body also may be shaped to draw hot gas into the center opening to become entrained with the fuel flowing in the center opening from the fuel injector. The annular body may be shaped to direct a mixture of the hot gas and the fuel that may be injected across the annular body to reduce a temperature of the mixture of the hot gas and the fuel prior to directing the mixture of the hot gas and the fuel into the combustion chamber of the cylinder.

Optionally, the annular body may include an upper annulus and a lower annulus coupled with each other; the upper annulus has an outer circumference that may be closer to the center axis than an outer circumference of the lower annulus; the lower annulus flares outward away from the upper annulus and the center axis; the upper annulus may be located closer to the fuel injector than the lower annulus while the annular body may be placed between the fuel injector of the cylinder and the piston in the combustion chamber of the cylinder; the upper annulus may include several fins oriented along radial directions toward the center axis and spaced apart from each other in directions that may be parallel to an outer circumference of the upper annulus; the fins may be positioned in the upper annulus such that the hot gas may be drawn into the center opening between the fins by the flow of the fuel in the center opening. The fins may cool the hot gas as the hot gas flows between the fins; the upper annulus of the annular body may include a conical stage that flares away from the center axis; the lower annulus of the annular body has a conical shape that flares away from the center axis; the upper annulus of the annular body may include a conical stage that flares away from the center axis. The lower annulus of the annular body may have a conical shape that flares away from the center axis; the conical stage of the upper annulus and the lower annulus may be spaced apart from each other in directions that may be parallel to the center axis; the annular body may be shaped such that the mixture of the hot gas and the fuel flows out of the annular body through a volume between the conical stage of the upper annulus and the lower annulus; the assembly also may include spacer columns that may be coupled to and connect the conical stage of the upper annulus and the lower annulus; the annular body may include several conduits that fluidly couple the center opening with locations outside of the annular body; the conduits may be elongated in directions that may be transverse to the center axis; the conduits may be elongated in directions that direct the mixture of the hot gas and fuel away from the center axis; the annular body extends in directions parallel to the center axis from a fuel injector side that may be positioned to face the fuel injector to an opposite cylinder side that may be positioned to face the piston in the combustion chamber of the cylinder; the annular body may be shaped to draw the hot gas into the center opening between the fuel injector side of the body and the fuel injector; the annular body may be configured to be coupled with a cylinder head of the cylinder; the annular body may be configured to be coupled to a top side of the piston; the annular body has an opening that faces the fuel injector and into which the fuel may be injected from the fuel injector into the annular body; the annular body may be formed from a first annulus and a second annulus. The first annulus may be configured to be coupled with a cylinder head of the cylinder that also may be coupled with or may include the fuel injector. The second annulus may be coupled with the piston.

Figure 9:
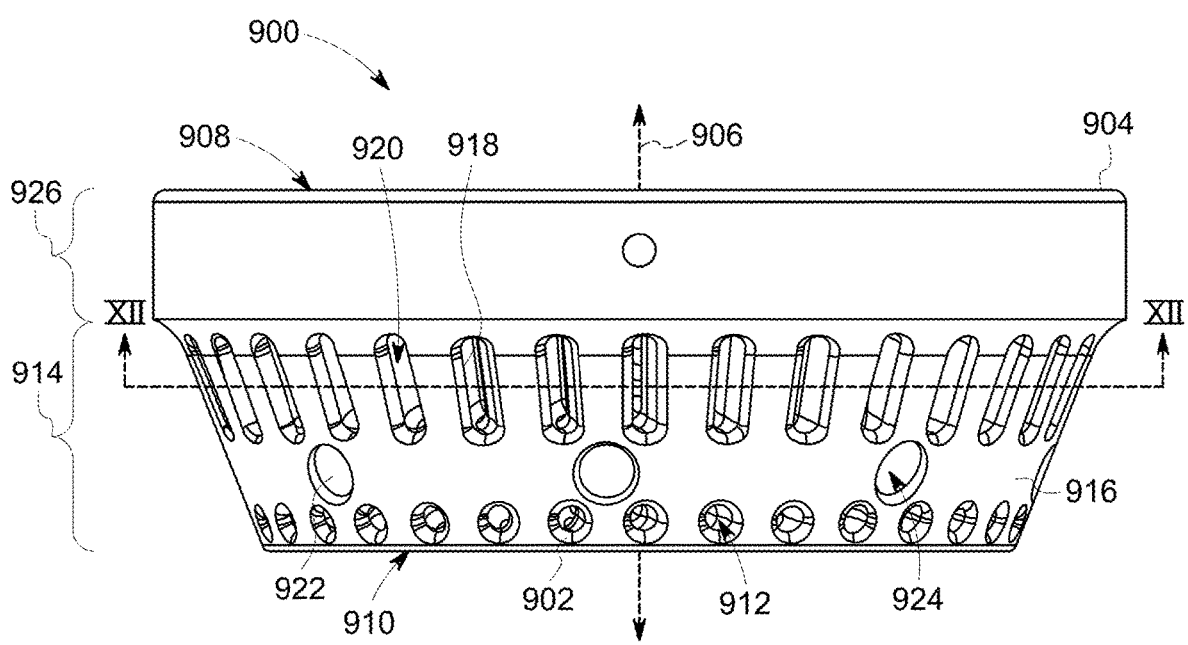
FIG. 9 illustrates a side view of another embodiment of a mixing structure.
Figure 10:
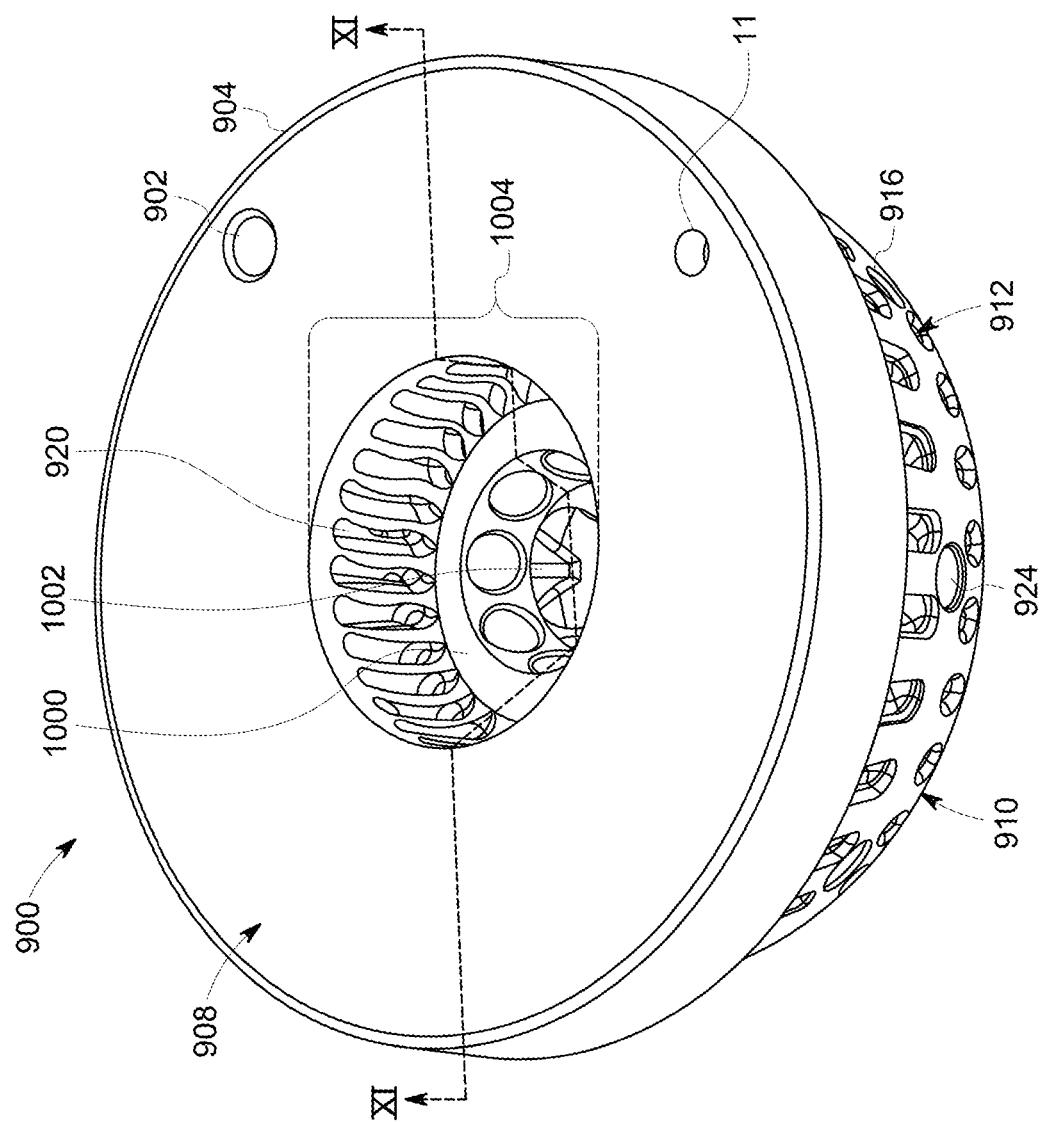
FIG. 10 illustrates a perspective view of an injector side of the mixing structure shown in FIG. 9.
Figure 11:
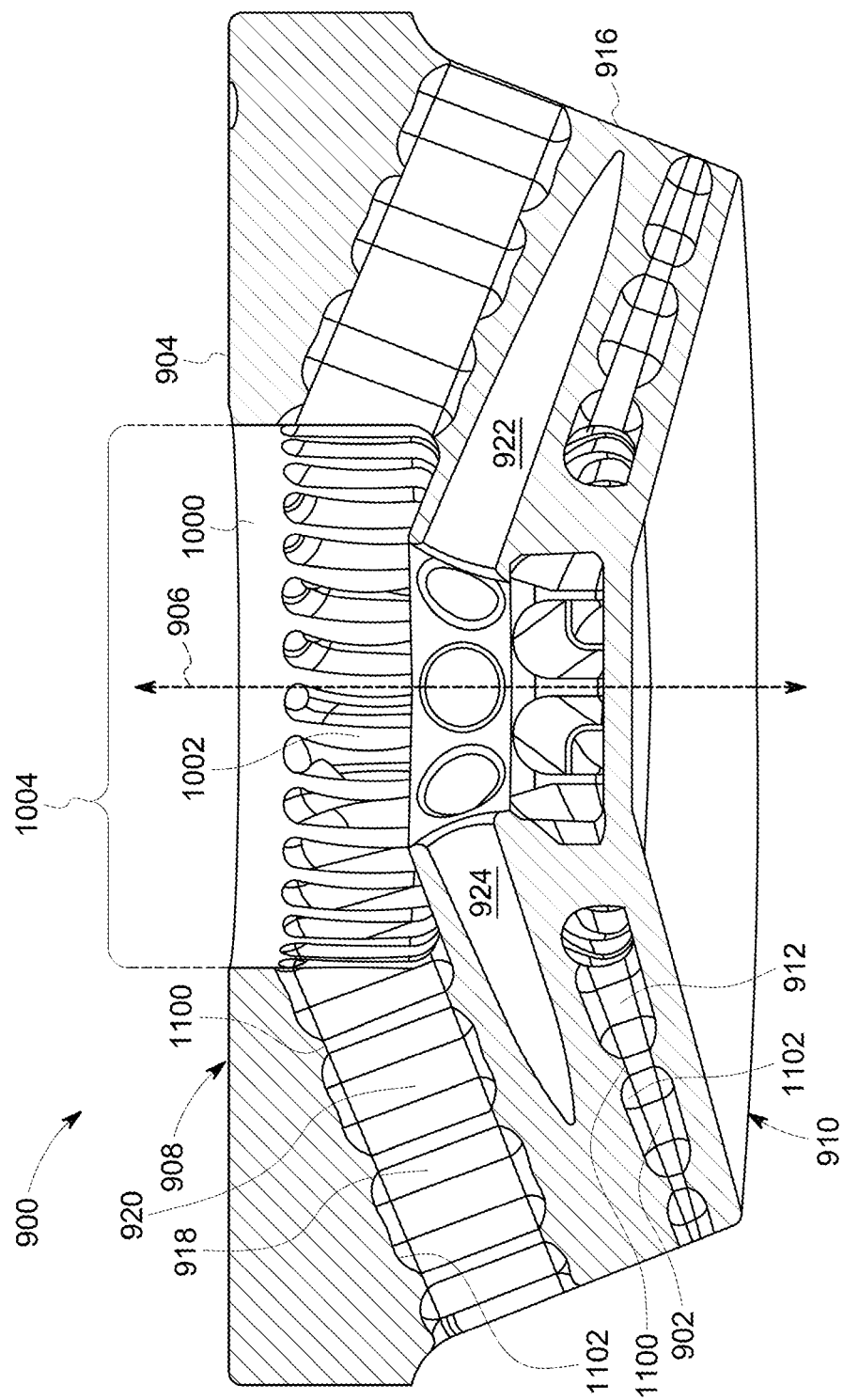
FIG. 11 illustrates a cross-sectional view of the mixing structure along line 11-11 shown in FIG. 9.
Figure 12:
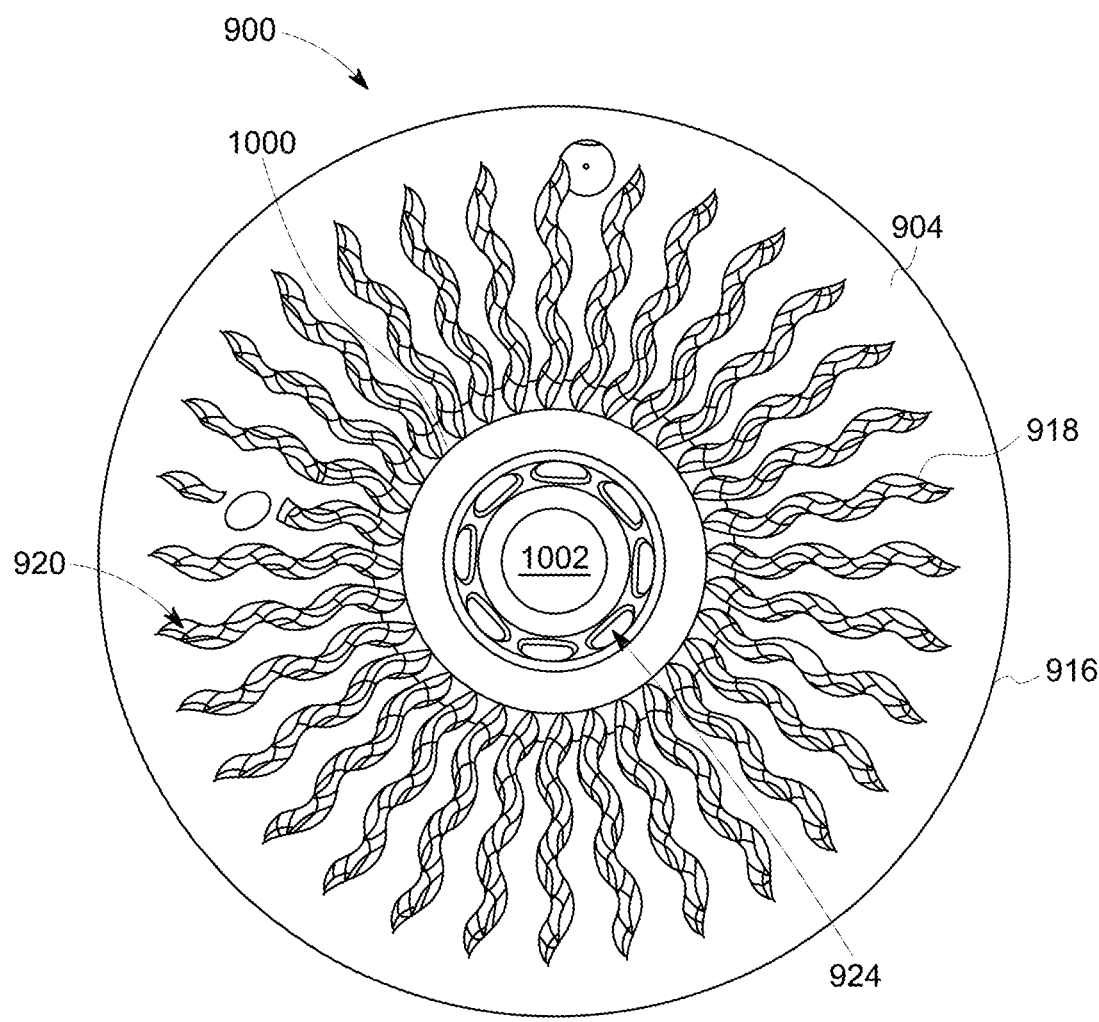
FIG. 12 illustrates another cross-sectional view of the mixing structure along line 12-12 in FIG. 9.

FIG. 9 illustrates a side view of another embodiment of a mixing structure 900. FIG. 10 illustrates a perspective view of an injector side 908 of the mixing structure shown in FIG. 9. FIG. 11 illustrates a cross-sectional view of the mixing structure along line 11-11 shown in FIG. 10. FIG. 12 illustrates another cross-sectional view of the mixing structure along line 12-12 in FIG. 9. The mixing structures described herein optionally may be referred to as engine assemblies.

The mixing structure may include a body 904 that defines an axis 906 and that extends from an injector side 908 toward an opposite piston side 910 along the axis. The body may include a cylinder head interface structure or portion 926 and a thermal management structure 914. The cylinder head interface structure couples with a cylinder head, while the thermal management structure faces a crown of a piston. The interface structure of the body is shrink fit into place. For example, the body may be formed from one or more materials that shrink in size after installation and/or use. The body can be formed to have dimensions that, after the body shrinks, the dimensions match or fit the component(s) to which the body is to be joined. In other embodiments, structures may be press fit, welded, bolted to, threaded onto (e.g., screwed onto), or formed as part of a cylinder head of an engine cylinder in various other embodiments.

In one embodiment, the axis may be a center axis that the body symmetrically extends around or encircles. In one embodiment, the axis may not extend along the center of the body and/or the body may not be symmetric around or about the axis. The injector side of the body faces a fuel injector of an engine cylinder while the piston side of the body faces a piston head of the engine cylinder.

The body has an opposite inward facing surface 1000 proximate to the axis. This inward facing surface defines one or more central volumes 1002 inside the body. While only a single central volume 1002 may be shown in FIGS. 10 and 11, in one embodiment, the body may include one or more internal walls or other structures that divide the single central volume into two or more smaller volumes. The volume may be referred to as an injection chamber. The injection chamber may have a shape that decreases in cross-sectional size in locations that may be farther from the injector side of the body. For example, the injection chamber may be staged in diameter such that different locations of the injection chamber that may be closer to the piston side along the axis may have smaller diameters than locations that may be closer to the injection side along the axis. Optionally, the injection chamber may be cylindrical such that the cross-sectional size remains the same at different locations along the axis. In other embodiments, the injection chamber may be conical or fluted such that different locations of the injection chamber that may be closer to the piston side along the axis may have smaller diameters than locations that may be closer to the injection side along the axis.

The body also may include an outward facing surface 916 that may be distal from the axis. For example, the inward facing surface may be proximal to the axis and the outward facing surface may be distal to the axis in that the inward facing surface may be closer to the axis than the outward facing surface.

The body has plural channel surfaces 918 that may define two or more gas channels 912, 920 located between the injector side and the piston side of the body. The gas channels may extend through the body from the outward facing surface through the inward facing surface. In various embodiments, some channel surfaces form linear slots through the body as gas channels, while some other channel surfaces form circular channels through the body as the gas channels. The slots may be elongated in directions extending from one side, or toward an opposite side. In other embodiments, the slots may be elongated in other directions and/or may have another shape. For example, the slots may be curved, may be arched, may be formed from two or more differently oriented linear portions, or the like. In one embodiment, the channel surfaces and/or gas channels may have another size and/or shape. As shown in FIG. 12, for example, surfaces may be undulating surfaces. The channels do not appear to extend to the outward facing surface of the body in FIG. 12 due to the channels extending along directions that may be angled downward in FIG. 11. The selection of the direction and shape may be based on the desired end use, the type of engine and fuel(s), and other application specific In the illustrated embodiment, mixture conduits 922 may be defined by, or disposed between, the gas channels. The mixture conduits 922 are include interior channel surfaces 924 inside the body of the assembly 900. The gas channels 920 may be disposed between the mixture conduits 922 and the injector surface 908, and the gas channels 912 may be disposed between the mixture conduits 922 and the piston surface 910.

In some embodiments, the one or more of the surfaces may have a catalytic coating, wear resistance coating, or carbon buildup resistant coating. Additionally, or alternatively, the surface may be treated. Suitable treatments may include plasma treatment, heat treatment, laser cladding, nitriding, carbonizing, and the like.

Each of the conduits or channels extends from an entry port or opening to an opposite exit port or opening. The entry ports for the gas conduits or channels may be located along the outward facing surface of the body as the gases may be received into the conduits or channels through the ports in the outward facing surface. The exit ports for the gas conduits or channels may be located along the inward facing surface of the body as the gases exit from the conduits or channels through the ports in the inward facing surface. The entry ports for the mixture conduits may be located along the inward facing surface of the body as the mixture may be received into the conduits through the ports in the inward facing surface. The exit ports for the conduits may be located along the outward facing surface of the body as the mixture exits from the conduits through the ports in the outward facing surface.

The entry and/or exit ports of the inlets and/or outlets of the channels and/or conduits may have rounded shapes along edges of the channels or conduits defined by the interfaces between the definitional surfaces and the outward facing surface, for example as shown in FIGS. 9 and 11. In one embodiment, these edges may have a non-rounded shape, such as a ninety-degree interface between the definitional surfaces and the outward facing surface. The rounded edges may allow for more gases to flow into the channels and/or may provide for increased surface interaction (and therefore more heat transfer) between the body and the gases. Optionally, the entry and/or exit ports of the channels may have conical shapes that decrease in cross-sectional area in locations in the channels that may be farther from the outward facing surface. Optionally, the entry and/or exit ports of the channels may have fluted shapes that increase in cross-sectional area in locations in the channels that may be farther from the outward facing surface. In one embodiment, the exit port is configured to anchor a flame front at a determined location. As an example, a flame holder may be disposed at the exit port. The flame holder may anchor the flame front in a determined location during combustion.

The channels optionally may include one or more structures or features that change the flow of gases in the channels. For example, the channel surfaces may be undulating surfaces that define one or more protuberances and/or dimples that extend out of or into the body inside the air channels. In one embodiment, the channel surfaces may be smooth or flat surfaces that do not include protuberances or dimples. The undulating shape of the surfaces create non-linear (e.g., undulating) pathways as the channels for the gases to flow into the injection chamber of the body. Non-linear pathways may be curved, have a sawtooth or zig-zag shape, or the like. The non-linear pathways in which the gases flow into the interior chamber may increase the surface area of the body that contacts the gases and/or may increase the dwell time that the gases may be in contact with the body inside the channels. This may increase the transfer of heat from the gases to the body (relative to linear pathway channels). The body has conduit surfaces that define fuel-and-gas mixture conduits extending through the body. These conduit surfaces may be elongated in directions that form acute angles with the center axis, as shown in FIG. 11. For example, one or more of the channels may have a turbulator, turbulator vane, or guide vane at one or more of the entry ports to change the flow of the gases into the channels. These structures may be used to achieve a desired flow distribution into the channels. Features such as protuberances and dimples may also be incorporated inside the flow channels to increase mixing and/or enhance heat transfer.

In the illustrated embodiment, each of the conduits or channels may be elongated in a direction that may be non-orthogonally angled with respect to the axis. For example, the inlets or entry ports of the gas channels may be located closer to the piston side of the body than the injector side of the body, and the exit ports of the gas channels may be located closer to the injector side of the body than the piston side of the body. The entry ports of the mixture conduits may be located closer to the injector side of the body than the piston side of the body, and the exit ports of the mixture conduits may be located closer to the piston side of the body than the injector side of the body. The channels may be aligned with the central axis of the fuel that is being injected.

In operation, one or more streams of fuel may be injected into the central volume by fuel injector(s) via an upper aperture or opening 1004. The flow of the fuel into the central volume draws gases into the central volume via the gas channels. The gases flow into the central volume and mix with the fuel in the central volume to form the fuel-and-gas mixture at a defined ratio (of fuel to air). In one embodiment, all or substantially all the gases that mix with the fuel to form the fuel-and-gas mixture flows into the central volume via the channels, and not through the upper aperture of the central volume. The fuel-and-gas mixture then flows out of the central volume through the conduits and into the combustion chamber of the engine cylinder.

The angles at which the conduits may be oriented relative to the center axis may be changed in different bodies to control how far the mixture penetrates into the combustion chamber of the engine cylinder. For example, if the mixture spray flowing through a conduit is directed to impinge on one or more surfaces of the channels, there may be a momentum exchange between the mixing structure and the mixture spray. This can decrease the momentum of the mixture spray and decrease how far the mixture penetrates the combustion chamber of the engine cylinder. In one embodiment, the conduits may be elongated along directions that coincide with (e.g., may be linearly aligned with) the directions in which the fuel streams may be directed into the central volume by the fuel injector. For example, the exit or outlet ports of the conduits may be aligned with apertures of a fuel injector through which streams of fuel may be directed. This may provide for maintaining more of the momentum of the fuel streams (e.g., the fuel) into and through the conduits (as the mixture), and into the combustion chamber. Additionally, this may provide for streams of the mixture to flow through the conduits in locations that may be more centered along central axes of the conduits (compared to the conduits not being aligned with the fuel injector apertures). Optionally, the entry ports of the conduits may include a restricting structure, such as a lip, ring, or the like, that reduces the cross-sectional area of the entry port of a conduit relative to the cross-sectional area of the same conduit in other locations. This restricting structure may assist with centering the flow of the mixture in the conduit.

Centering the streams of the mixture in the conduits may provide for maintaining more of the momentum of the mixture exiting the conduits (compared to the conduits not being aligned with the fuel injector apertures). In one embodiment, the conduits may be elongated in directions that may be angled (e.g., not parallel to) the directions in which the streams of fuel may be injected into the central volume. This may decrease the momentum of the fuel into the conduits and/or decrease the momentum of the mixture out of the conduits. Because the momentum of the mixture heading out of the conduits may control or impact how much soot may be oxidized in the combustion chamber, changing the angles of the conduits in different bodies may control how much soot may be oxidized.

Various aspects of the conduits and/or the exit ports of the conduits may be modified relative to the embodiment shown in FIGS. 9 through 11. For example, the cross-sectional shape or size of the conduits may differ at different locations along the length of the conduits. For example, the conduits may have conical shapes (instead of the illustrated cylindrical shapes) that decrease in cross-sectional area in locations that may be farther from the inward facing surface of the body. The exit ports of the conduits may have turbulator vanes or other structures to change the flow of the mixture exiting the conduits. This may help focus or direct the mixture farther into the combustion chamber of the engine cylinder. The exit ports of the conduits may have a restriction structure (e.g., a lip) that urges or focuses the streams of fuel-and-gas mixtures closer together. Optionally, the exit ports of the conduits may have dimples to change the flow of the mixture out of the conduits and/or to decrease the likelihood of the conduits becoming plugged at the exit ports. For example, the dimples may provide volumes that may become filled with soot or the like prior to clogging the exit ports. This may extend the useful life of the conduits.

In one embodiment, the surfaces of the mixture conduits may be smooth and do not have protuberances or dimples. This may allow for the fuel-and-gas mixture that exits out of the body via the mixture conduits to have faster flow and/or greater momentum upon exiting the body (compared to mixture conduits that may be not smooth or have undulations). The mixing structure directs the fuel-and-gas mixtures to desired locations within the combustion chamber to facilitate the oxidation of soot.

Non-smooth surfaces of the gas channels may cause the flow of the gases to change and become more turbulent. A turbulent flow may increase the homogeneity of the mixture flowing therethrough. For example, the undulating surfaces may create spin, swirl, and/or turbulence in the flow of gases, which also may create spin, swirl, and/or turbulence in the flow of the mixture in the central volume. The gases and/or mixtures can spin when the gases and/or mixtures predominantly move around a center axis or direction, such as when the majority of mass and/or flow of the gases and/or mixtures are spinning around the same axis or direction. The gases and/or mixtures can swirl when the gases and/or mixtures predominantly (e.g., a majority of the mass and/or flow) move in a spiral pattern around the axis or direction. The movement gases and/or mixtures can have turbulence when the gases and/or mixtures do not predominantly move in the same direction, whether that direction be a swirling, spinning, or linear movement. The gases flow into the central volume and mix with the fuel in the central volume to form the fuel-and-gas mixture at a defined ratio (of fuel to gas). The non-uniform flow of the gases may assist with the mixing of the fuel relative to having smooth surfaces around the gas channels.

Optionally, the undulating shape of the surfaces increase the surface area of the body to which the incoming gases contact as the gases flow into the central volume. Increasing the surface area that contacts the gases may increase how much thermal energy may be drawn or transferred from the gases to the body relative to flat or smooth surfaces. As a result, the gases may be cooled by a greater amount. The inward facing surface of the body may define undulating surfaces, protuberances, and/or dimples to create spin in the flow of gases, fuel, and/or the mixture in the central volume.

For a given engine cylinder at a given operating condition, the sizes (e.g., diameters or surface areas) of the conduits, and/or central volume, the shapes of the conduits, and/or central volume, the lengths of the conduits, the presence or absence of undulations in surfaces, the number of the conduits, and/or the angles at which the conduits may be oriented relative to the axis may be modified to change the ratio of fuel to gas in the mixture or the degree of homogeneity and dispersion of fuel to gas that may be output from the mixing structure. Changing one or more of these parameters may change how much fuel may be in the mixture, how much gas may be in the mixture, how quickly the mixture leaves the mixing structure, how far the mixture penetrates into the combustion chamber of the cylinder, the direction or angle of the departing flow, and the like.

The injector surface of the body may include one or more alignment holes or keying features 902 to align the mixture conduits with directions in which the fuel streams may be directed into the central volume of the body. These keying features may be holes or other receptacles that receive complementary keying features (e.g., pins) connected with the cylinder head. Placing the pins into the holes may ensure that the fuel streams coming from the fuel injector may be directed into the mixture conduits. In particular, the alignment of the nozzles of the injector with the center of the corresponding mixing conduit may be ensured.

Optionally, the inward facing surface of the body may include one or more textured or undulating surfaces, protuberances, and/or dimples. These undulating or textured surfaces, protuberances, and/or dimples may assist with changing the direction in which fuel and/or gases flow and mix the fuel and gas to a defined mixing level and/or ratio. The inward facing surface may have a conical or fluted shape to assist with mixing the fuel with the gases in the central volume. For example, the cross-sectional area of the volume in planes that may be perpendicular to the axis may be larger near the injector side and smaller near the piston side. This decreasing cross-sectional area of the volume may mix and concentrate the fuel in the mixture prior to the mixture flowing out of the volume via the conduits.

In one embodiment, one or more of the structures forming the body may include cooling conduits extending through the interior portions of the structures. These cooling conduits may be fluidly coupled with a source of a cooling or working fluid, such as cooled air, a liquid coolant, or the like. Suitable coolants may include air, water, oil, and the like. These cooling conduits may not be fluidly coupled with the gas channels or mixture conduits to prevent contamination of the fuel, gases, and/or mixture. The mixing structure can be liquid cooled using coolant from the cylinder head or piston, depending on where the mixing structure is mounted. Optionally, the mixing structure can be cooled through conduction to the component that the mixing structure is mounted to. The cooling or working fluid may flow through the cooling conduits to help cool the body and increase the thermal transfer between the gases and the body.

Figure 13:
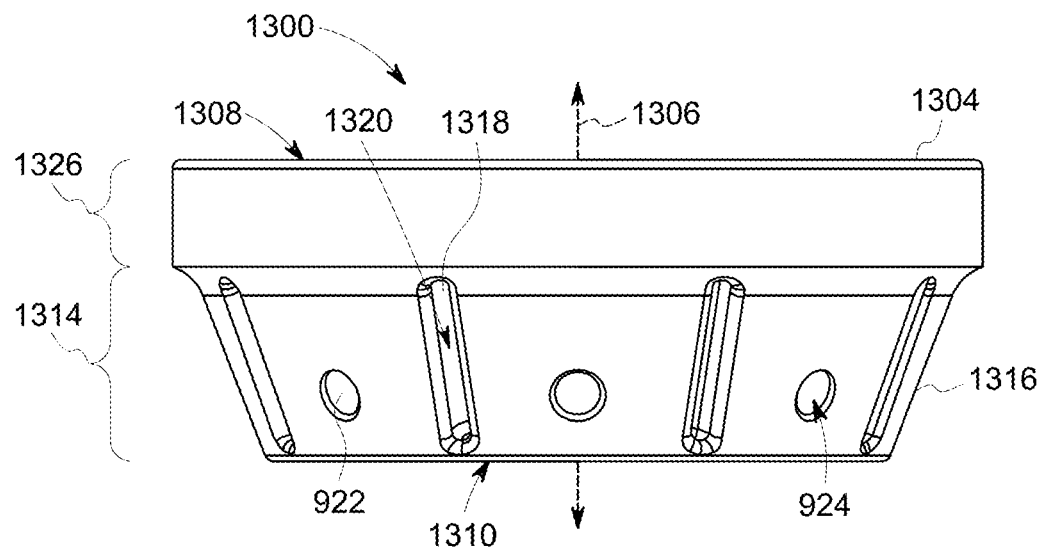
FIG. 13 illustrates a side view of another embodiment of a mixing structure.
Figure 14:
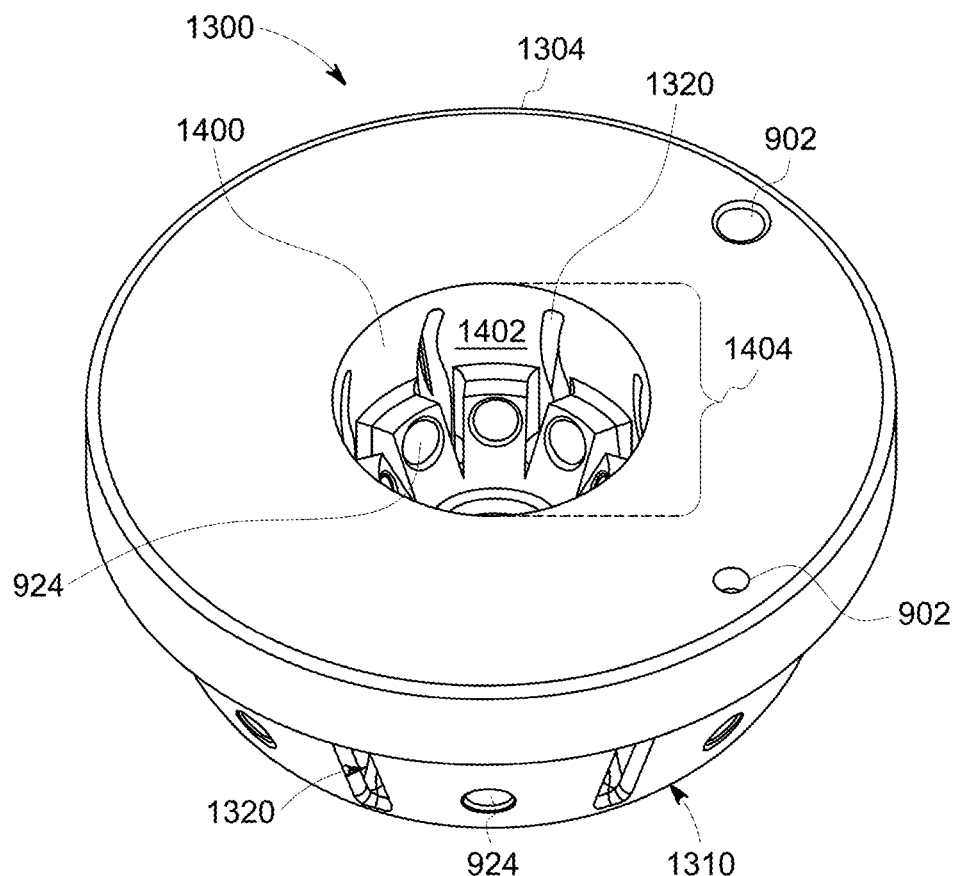
FIG. 14 illustrates a perspective view of an injector side of the mixing structure shown in FIG. 13.

FIG. 13 illustrates a side view of another embodiment of a mixing structure 1300. The mixing structure may include a body 1304 that defines an axis 1306 and that extends from an injector side 1308 toward an opposite piston side 1310 along the axis. The body may include a cylinder head interface structure or portion 1326 and a thermal management structure 1314. The cylinder head interface structure couples with a cylinder head, while the thermal management structure faces a crown of a piston. The interface structure of the body is press fit into place into a receiving cavity of the cylinder head. Other suitable coupling methods may include having the insert welded, bolted to, or formed as part of a cylinder head of an engine cylinder. FIG. 14 illustrates a perspective view of an injector side of the mixing structure shown in FIG. 13.

In one embodiment, the body symmetrically extends around or encircles the center axis. In another embodiment, the axis may not extend along the center of the body and/or the body may not be symmetric around or about the axis. The injector side of the body faces a fuel injector of an engine cylinder while the piston side of the body faces a piston head of the engine cylinder.

The body has an inward facing surface 1400 proximate to the center axis. This inward facing surface defines one or more central volumes 1402 inside the body. While only a single central volume may be shown in FIGS. 13 and 14, in one embodiment, the body may include one or more internal walls or other structures that divide the single central volume into two or more smaller volumes. The volume may be referred to as an injection chamber. The injection chamber volume may have a shape that decreases in cross-sectional size in locations that may be farther from the injector side of the body. Optionally, the injection chamber volume may be cylindrical such that the cross-sectional size remains the same at different locations along the central axis or may be conical or fluted.

The body also may include an outward facing surface 1316 that may be distal from the central axis. The body has channel surfaces 1318 that define gas channels 1320 located between the injector side and the piston side of the body. The gas channels extend through the body from the outward facing surface through the inward facing surface. In the illustrated embodiment, the gas channel surfaces form linear slots through the body as the gas channels. The slots may be elongated in directions extending from one side or toward the opposite side. In other embodiments, the slot may be elongated in other directions and/or may have another shape. For example, the slots may be curved, may be arched, may be formed from two or more differently oriented linear portions, or the like. The surfaces may be undulating surfaces, flat surfaces, other curved surfaces, or the like.

In the illustrated embodiment, the mixture conduits may be disposed between the gas channels. For example, the gas channels may be interspersed within the mixture conduits such that there may be one gas channel between neighboring pairs of the mixture conduits.

The body has conduit surfaces that define fuel-and-gas mixture conduits extending through the body. These conduit surfaces may be elongated in directions that form acute angles with a center axis. The conduit surfaces may be smooth surfaces that do not include undulations, protuberances, or dimples. In another embodiment, the conduit surfaces may have undulations, protuberances, and/or dimples.

Each of the conduits or channels extends from an entry port or opening to an opposite exit port or opening, as described above in connection with the mixing structure. The entry and/or exit ports of the channels may have rounded shapes along edges of the channels. In one embodiment, these edges may have a non-rounded shape. The rounded edges may allow for more gases to flow into the channels and/or may provide for increased surface interaction (and therefore more heat transfer) between the body and the gases. Optionally, the entry and/or exit ports of the channels may have conical shapes or fluted shapes.

In the illustrated embodiment, each of the conduits or channels may be elongated in a direction that may be non-orthogonally angled with respect to a central axis. For example, the entry or entry ports of the gas channels may be located closer to the piston side of the body than the injector side of the body, and the exit ports of the gas channels may be located closer to the injector side of the body than the piston side of the body. The entry ports of the mixture conduits may be located closer to the injector side of the body than the piston side of the body, and the exit ports of the mixture conduits may be located closer to the piston side of the body than the injector side of the body.

In operation, one or more streams of fuel may be injected into the central volume by fuel injector(s) via an upper aperture or opening 1404. The flow of the fuel into the central volume draws gases into the central volume via the gas channels. The gases flow into the central volume and mix with the fuel in the central volume to form the fuel-and-gas mixture at a defined ratio. In one embodiment, all or substantially all the gases that mix with the fuel to form the fuel-and-gas mixture flows into the central volume via the channels, and not through the upper aperture of the central volume. The fuel-and-gas mixture flows out of the central volume through the conduits and into the combustion chamber of the engine cylinder.

The angles at which the conduits may be oriented relative to the center axis may be changed in different bodies to control how far the mixture penetrates into the combustion chamber of the engine cylinder, as described above. In one embodiment, the conduits may be elongated along directions that coincide with the directions in which the fuel streams may be directed into the central volume by the fuel injector. Optionally, the entry ports of the conduits may include a restricting structure that reduces the cross-sectional area of the entry port of a conduit relative to the cross-sectional area of the same conduit in other locations, as described above.

In one embodiment, the conduits may be elongated in directions that may be angled (e.g., not parallel to) the directions in which the streams of fuel may be injected into the central volume. This may decrease the momentum of the fuel into the conduits as the mixture and/or decrease the momentum of the mixture out of the conduits.

Various aspects of the conduits and/or the exit ports of the conduits may be modified from the illustrated embodiments. For example, the cross-sectional shape or size of the conduits may differ at different locations along the length of the conduits. For example, the conduits may have conical shapes (instead of the illustrated cylindrical shapes) that decrease in cross-sectional area in locations that may be farther from the inward facing surface of the body. This may help direct the mixture into desired location within the combustion chamber of the engine cylinder. The exit ports of the conduits may have a restriction structure (e.g., a lip) that urges or blends the streams of mixtures closer together. Optionally, other conduit exit ports may have dimples, grooves or textures that may change the flow of the mixture out of the conduits and/or to decrease the likelihood of the conduits becoming plugged at the exit ports.

In one embodiment, the surfaces of the mixture conduits may be smooth and do not have protuberances or dimples. In another embodiment, the surfaces may include protuberances and/or dimples. The inward facing surface of the body may include undulating surfaces, protuberances, and/or dimples to create turbulence in the flow of gases, fuel, and/or the mixture in the central volume. The sizes (e.g., diameters or surface areas) of the conduits and/or central volume, the shapes of the conduits and/or central volume, the lengths of the conduits the presence or absence of undulations in surfaces the number of the conduits and/or the angles at which the conduits may be oriented relative to the axis may be modified to change the ratio of fuel to gas in the mixture that may be output from the mixing structure, as described above.

Optionally, the inward facing surface of the body may include one or more undulating surfaces, protuberances, and/or dimples, as described above. The inward facing surface may have a conical or fluted shape to assist with mixing the fuel with the gases in the central volume, as described. In one embodiment, one or more of the structures forming the body may include cooling conduits extending through the interior portions of the structures as described.

Figure 15:
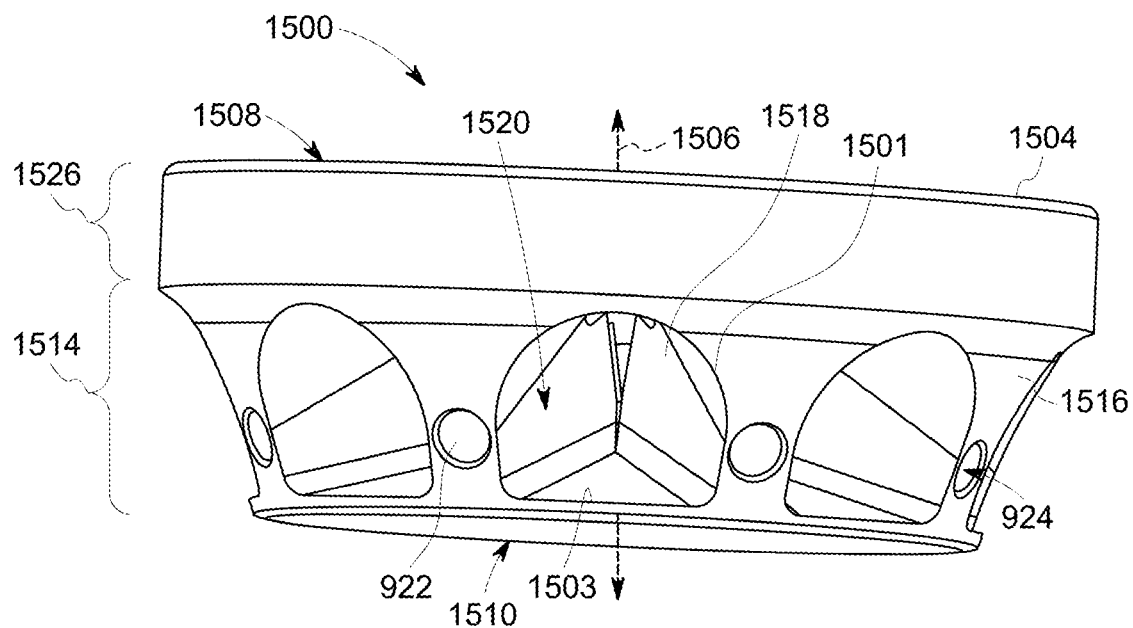
FIG. 15 illustrates a side view of another embodiment of a mixing structure.
Figure 16:
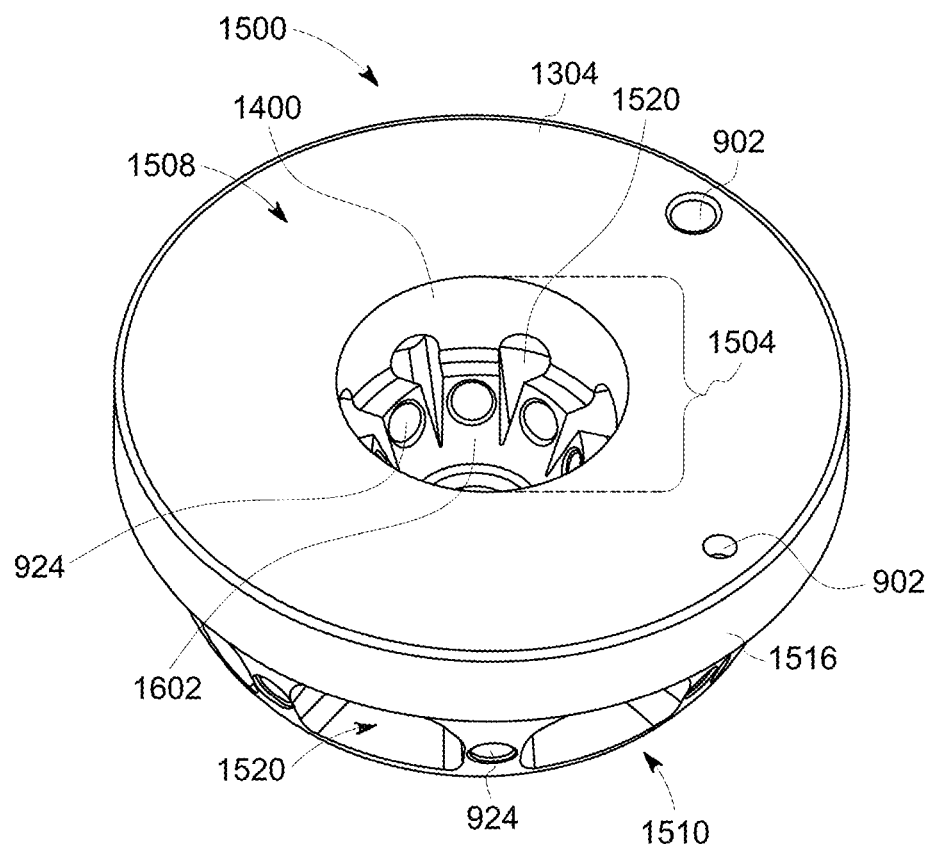
FIG. 16 illustrates a perspective view of an injector side of the mixing structure shown in FIG. 15.

FIG. 15 illustrates a side view of another embodiment of a mixing structure 1500. The center axis defined by a body 1504 is concentric with the body that symmetrically extends around or encircles the axis 1506. In another embodiment, the axis does not extend along the center of the body but rather is asymmetric relative to the axis. The injector side of the body faces a fuel injector of an engine cylinder while the piston side of the body faces a piston head of the engine cylinder. FIG. 16 illustrates a perspective view of an injector side 1508 of the mixing structure shown in FIG. 15.

The mixing structure may include the body that defines a central axis and that extends from an injector side toward an opposite piston side 1510 along the axis. The body may include a cylinder head interface structure or portion 1526. The cylinder head interface structure couples with a cylinder head, while the thermal management structure faces a crown of a piston. The interface structure of the body can be welded or otherwise attached to a cylinder head of an engine cylinder in various embodiments. The body has an outward facing surface 1516 that may be distal from the axis. The body has channel surfaces 1518 that define gas channels 1520 located between the injector side and the piston side of the body. The gas channels extend through the body from the outward facing surface through the inward facing surface. The body also has a thermal management structure 1514. In various other embodiments, the inward facing surface of the body may include undulating surfaces, protuberances, and/or dimples, as described above, or may be smooth.

The body has an inward facing surface 1400 proximate to the axis. This inward facing surface defines one or more central volumes 1602 inside the body into which an injector injects liquid fuel. In this embodiment, the body may include one or more internal walls or other structures that divide the single central volume into two or more smaller volumes. The injection volume optionally may be referred to as an injection chamber. The injection volume may have a shape that decreases in cross-sectional size in locations that may be farther from the injector side of the body. In other embodiments, the injection volume may be cylindrical such that the cross-sectional size remains the same at different locations along the axis or may be conical or fluted.

In the illustrated embodiment, the interfaces between the channel surfaces 1518 and the outward facing surface 1516 form arched edges 1501, with ends of each arch edge connected by a straight edge 1503. The channel surfaces forming gas channels decrease in size from the outward facing surface to the inward facing surface of the body. In various embodiments the entry ports of the gas channels may be significantly larger at the outward facing surface 1516 of the body than the exit ports of the gas channels at the inward facing surface of the body. The gas channels may be funnel shaped, as in the illustrated example, with the gas channels rapidly reducing in size from large entry ports to triangular exit ports. The channel surfaces may be selected based on application specific requirements, and as such may be undulating surfaces, flat surfaces, other curved surfaces, or the like.

In the illustrated embodiment, the mixture conduits may be interposed between the gas channels. For example, the gas channels may be interspersed within the mixture conduits such that there may be one gas channel between neighboring pairs of the mixture conduits. These conduit surfaces may be elongated in directions that form acute angles with the center axis. One or more of the surfaces may have a catalytic coating or carbon buildup resistant coating.

In various embodiments, the channels optionally may include one or more structures that change the flow of gases in the channels.

During engine operation, one or more streams of fuel may be injected into the central injection volume by fuel injector(s) via an upper aperture or opening 1604. The flow of the fuel into the central injection volume draws gases into the central injection volume via the air channels. The gases flow into the central injection volume and mixes with the fuel in the central injection volume to form the fuel-and-gas mixture-. In one embodiment, all or substantially all the gases that mix with the fuel to form the fuel-and-gas mixture flows into the central injection volume via the channels, and not through the upper aperture of the central injection volume. The fuel-and-gas mixture then flows out of the central injection volume through the mixture conduits and into the combustion chamber of the engine cylinder.

Various aspects of the conduits and/or the exit ports of the conduits may be modified from the embodiments shown herein. For example, the cross-sectional shape or size of the conduits may differ at different locations along the length of the conduits. Suitable conduits may have conical shapes (instead of the illustrated cylindrical shapes) that decrease in cross-sectional area in locations that may be farther from the inward facing surface of the mixing structure body. This may help control the distribution of the mixture flow into the combustion chamber of the engine cylinder.

The sizes (e.g., diameters or surface areas) of the conduits and/or central injection volume, the shapes of the conduits and/or central injection volume, the lengths of the conduits, the presence or absence of undulations in surfaces, the number of the conduits, and/or the angles at which the conduits may be oriented relative to the axis and may be selected based on a desired ratio of fuel to gases in the mixture that may be output from the mixing structure, as described above.

Figure 17:
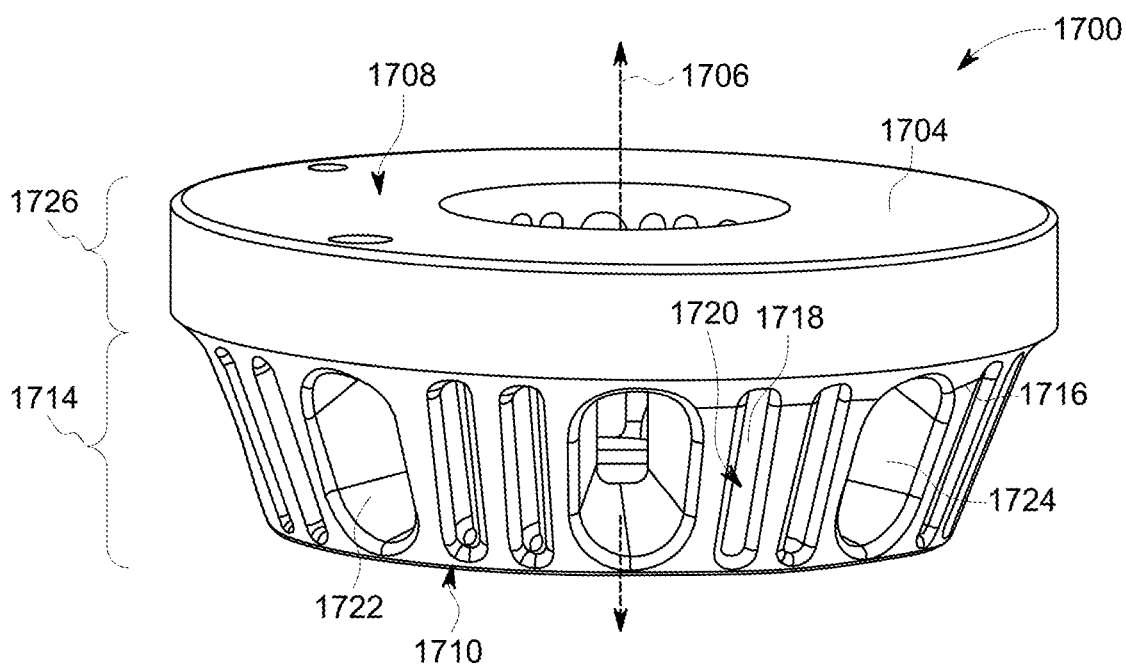
FIG. 17 illustrates a side view of another embodiment of a mixing structure.

FIG. 17 illustrates a side view of another embodiment of a mixing structure 1700. The mixing structure may include a body 1704 that defines an axis 1706 and that extends from an injector side 1708 toward an opposite piston side 1710 along the axis. The body may include a cylinder head interface structure or portion 1726 and a thermal management structure 1714. The cylinder head interface structure couples with a cylinder head, while the thermal management structure faces a crown of a piston.

In one embodiment, the axis may be a center axis that the body symmetrically extends around or encircles. In one embodiment, the axis may not extend along the center of the body and/or the body may not be symmetric around or about the axis. The injector side of the body faces a fuel injector of an engine cylinder while the piston side of the body faces a piston head of the engine cylinder. The body also may include an outward facing surface 1716 that may be distal from the axis. The body has channel surfaces 1718 that define gas channels 1720 located between the injector side and the piston side of the body.

Channel surfaces 1722 form mixture conduits 1724 that increase in size from the inward facing surface of the body to the outward facing surface of the body. In the illustrated embodiment, the mixture conduits may be disposed between the gas channels. A single mixture conduit may be disposed between one pair of the gas channels and another pair of the gas channels. In another embodiment, a single gas channel or more than two gas channels may be on each side of each mixture conduit. Each mixture conduit may be significantly larger than each gas channel and/or a combination of two gas channels.

Figure 18:
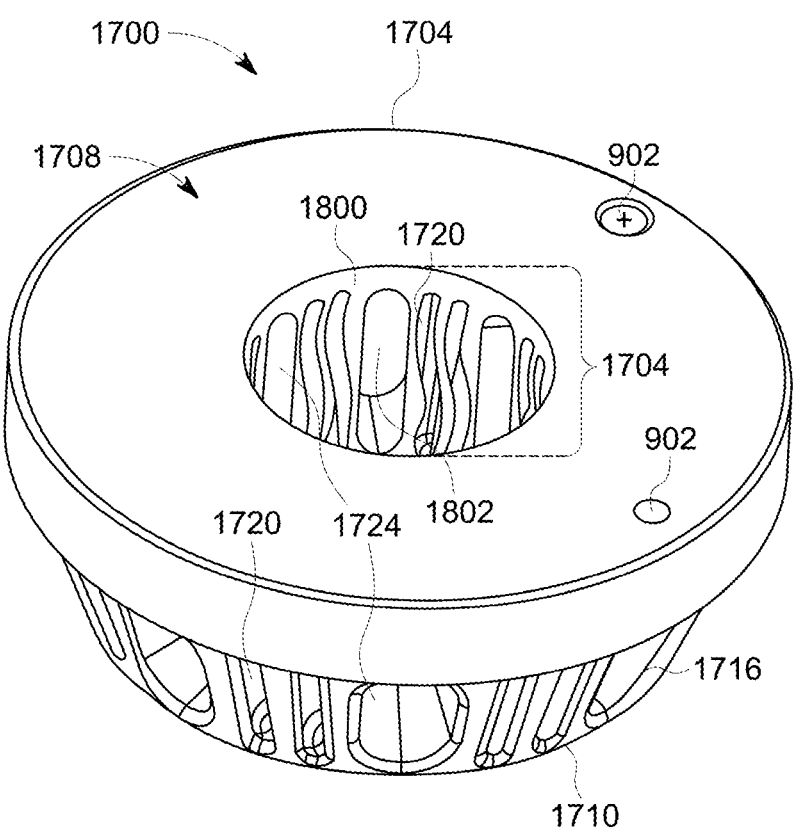
FIG. 18 illustrates a perspective view of an injector side of the mixing structure shown in FIG. 17.

FIG. 18 illustrates a perspective view of the injector side of the mixing structure shown in FIG. 17. While only a single central volume is shown in FIGS. 17 and 18 in other embodiments a body may include one or more internal walls or other structures that divide the single central volume into two or more smaller volumes. The body has an inward facing surface 1800 proximate to the axis. This inward facing surface defines one or more central volumes 1802 inside the body. The single central volume may be referred to as an injection chamber. The single central volume may have a shape that decreases in cross-sectional size in locations that may be farther from the injector side of the body. Also, in other embodiments, the single central volume may be cylindrical such that the cross-sectional size remains the same at different locations along the axis or may be conical or fluted.

The interfaces between the channel surfaces and the outward facing surface form elongated slots as the gas channels. The channel surfaces may be undulating surfaces that form undulating gas channels, similar to the gas channels shown in FIG. 9.

In operation, one or more streams of fuel may be injected into the central volume 1802 by fuel injector(s) via an upper aperture or opening 1704. The flow of the fuel into the central volume draws gas into the central volume via the gas channels. The gas flows into the central volume and mixes with the fuel in the central volume to form the fuel-and-gas mixture at a defined ratio. In one embodiment, all or substantially all the gases that mix with the fuel to form the fuel-and-gas mixture flows into the central volume via the channels, and not through the upper aperture of the central volume. The fuel-and-gas mixture then flows out of the central volume through the conduits and into the combustion chamber of the engine cylinder.

Figure 19:
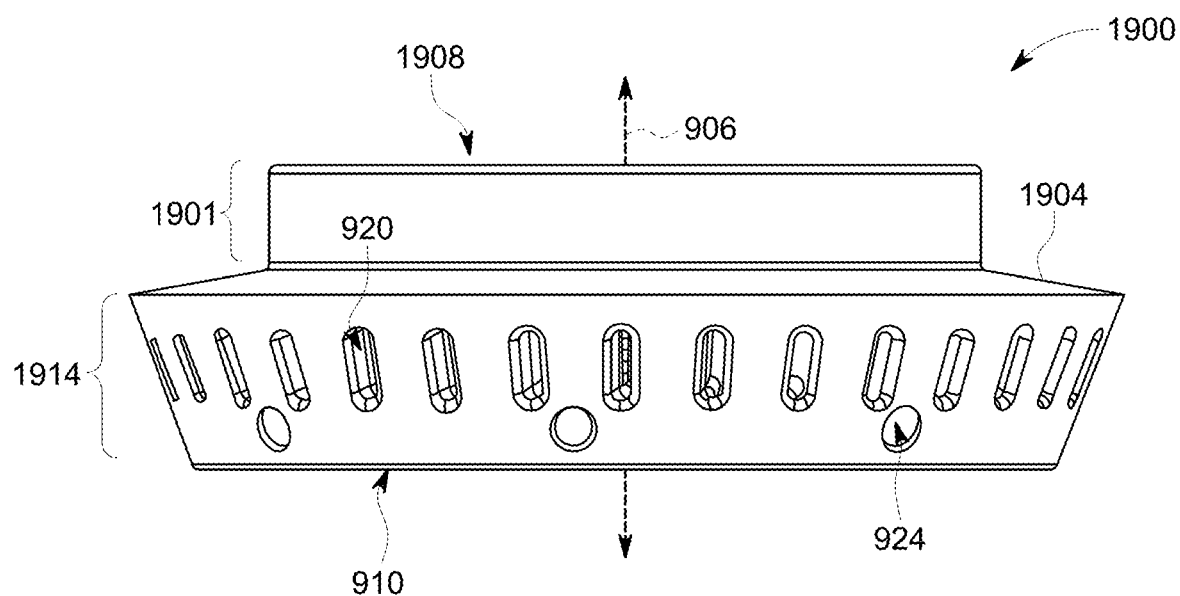
FIG. 19 illustrates a side view of another embodiment of a mixing structure.
Figure 20:
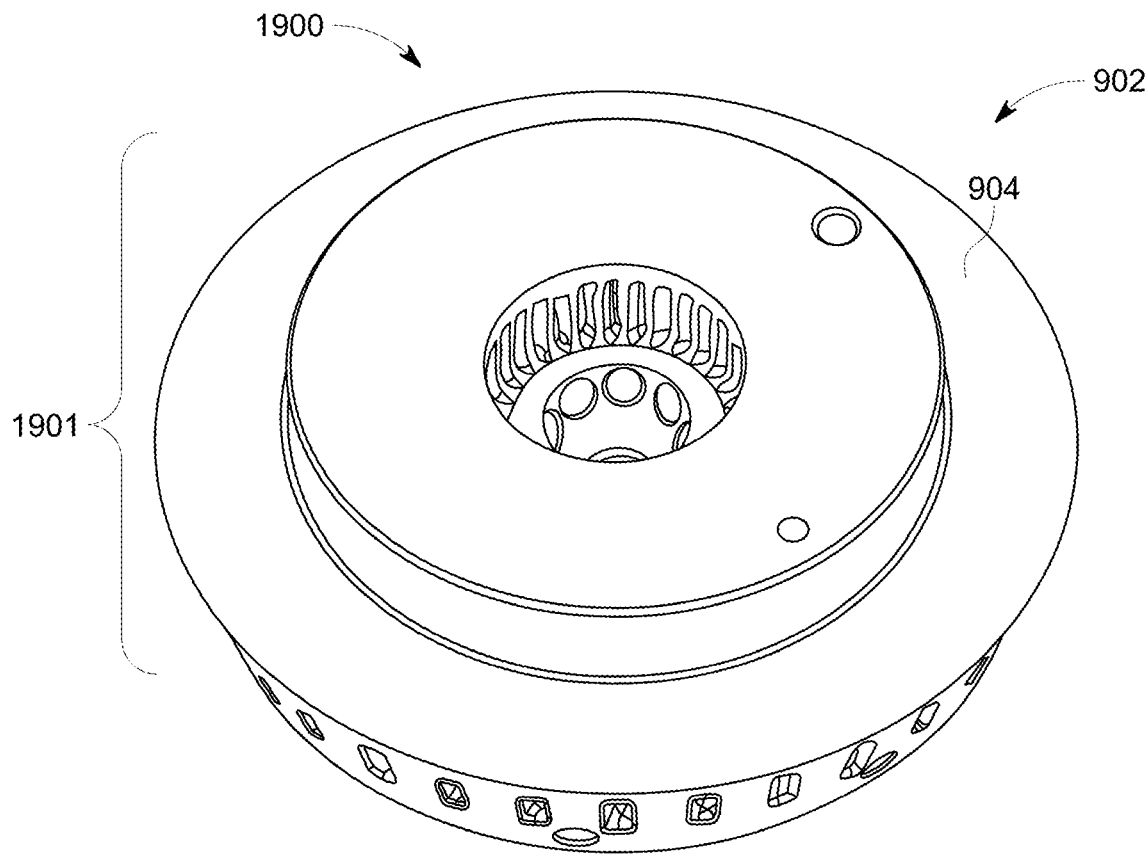
FIG. 20 illustrates a perspective view of an injector side of the mixing structure shown in FIG. 19.

FIG. 19 illustrates a side view of another embodiment of a mixing structure 1900. The mixing structure has a body 1904 that defines the gas channels and the mixture conduits. This mixing structure differs from other mixing structures in that it does not include the additional gas channels, such as shown in FIG. 9. FIG. 20 illustrates a perspective view of an injector side 1908 of the mixing structure shown in FIG. 19.

The mixing structure 1900 also differs from the mixing structure 900 in that the mixing structure 1900 may include a step portion feature 1901 projecting upward from the body 1904 (e.g., toward the fuel injector when the mixing structure 1900 may be installed). The step portion feature 1901 may include a portion of the body 1904 in a cylinder head interface structure 1914 of the body 1904 that extends toward the fuel injector. The step portion feature 1901 may engage the cylinder head to further separate the mixture conduits from the fuel injector without interfering with operation of valves of the cylinder head (e.g., without contacting the valves).

Figure 21:
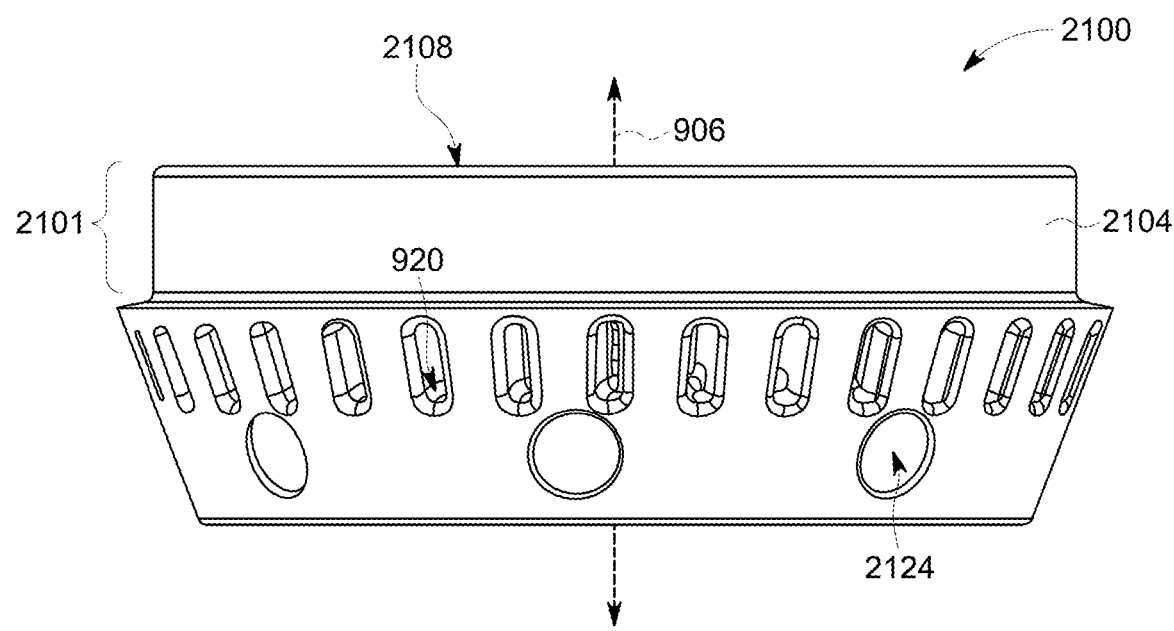
FIG. 21 illustrates a side view of another embodiment of a mixing structure.
Figure 22:
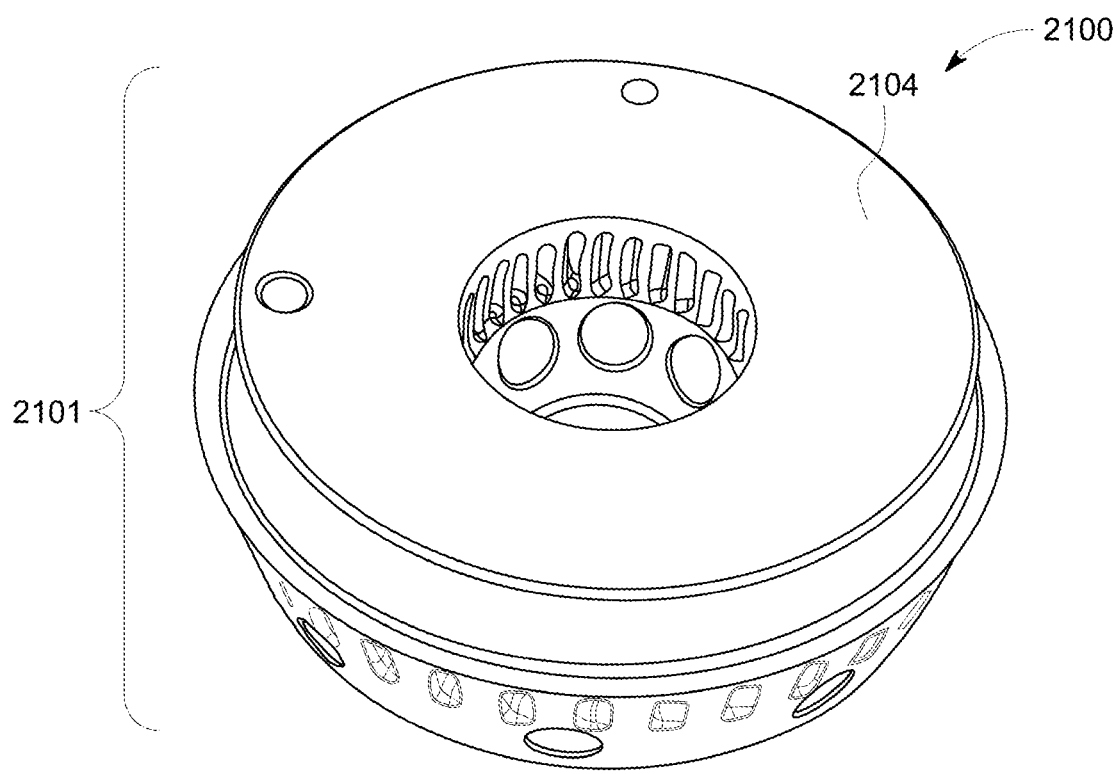
FIG. 22 illustrates a perspective view of an injector side of the mixing structure shown in FIG. 21.

FIG. 21 illustrates a side view of another embodiment of a mixing structure 2100. FIG. 22 illustrates a perspective view of an injector side 2108 of the mixing structure 2100 shown in FIG. 21. The mixing structure 2100 may be similar to the mixing structure 1900 in that the mixing structure 2100 may include a body 2104 having the gas channels and the mixture conduits.

The mixing structure 2100 differs from the mixing structure 1900 in that the mixing structure 2100 may include a step portion feature 2101 projecting upward from the body 2104. The step portion feature 2101 has larger circumference or cross-sectional area than the step portion feature 1901. The step portion feature 2101 may engage the cylinder head to further separate mixture conduits 2124 from the fuel injector without interfering with operation of valves of the cylinder head (e.g., without contacting the valves).

The mixing structure 2100 also differs from the mixing structure 900 in that the mixture conduits 2124 in the structure 2100 have a larger diameter or cross-sectional size, and/or may be shorter in length. The mixture conduits 2124 may direct the fuel-and-gas mixture into the combustion chamber of an engine cylinder but may be larger to control how the mixture may be delivered into the combustion chamber.

The mixing structures described above may have a sealed piston side that does not include any openings for fuel to exit the interior volume, the gases to enter the interior volume, or the mixture to exit the interior volume. The only openings in one or more embodiments of the mixing structures described above may be in the outward facing sides and the injector sides of the mixing structures.

Figure 23:
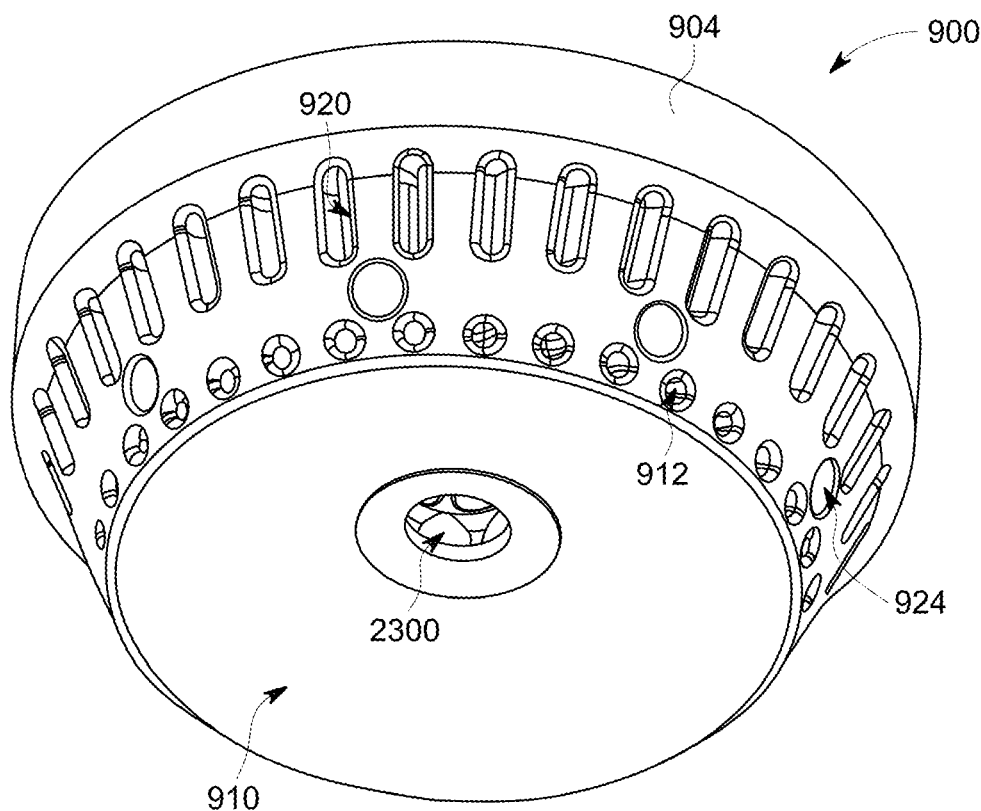
FIG. 23 illustrates a perspective view of an alternative embodiment of the piston side of the mixing structure shown in FIGS. 9 through 12.

In one embodiment, one or more of the mixing structures described above may have an opening or aperture in the piston side. FIG. 23 illustrates a perspective view of an alternative embodiment of the piston side of the mixing structure 900 shown in FIGS. 9 through 12. As shown, the piston side may have an aperture 2300 through the piston side. This aperture 2300 may allow gases to enter into the central volume of the mixing structure 1002 through the piston side of the mixing structure 900. Allowing gases to enter in this way may balance the gases entering the central volume through the gas channels with the inward flow of gases into the central volume through the aperture 2300. This balancing may help to center the streams of the fuel-and-gas mixtures in the centers of the mixture conduits. For example, with the gases only entering the central volume via the gas channels, turbulence may be created in the central volume, which may prevent or disrupt the flow of the mixture through the center paths of the mixture conduits. Providing the aperture 2300 may balance the flow of the gases and center the mixture flow in the mixture conduits.

Various aspects of the gas channels, mixture conduits, entry ports, and/or exit ports may be modified from the embodiments shown herein. For example, the cross-sectional shape or size of the channels, conduits, and/or ports may differ from the illustrated embodiments to produce a desired or predetermined fuel-to-gas ratio of the mixture. As one example, the mixture conduits may have conical shapes (instead of the illustrated cylindrical shapes) that decrease in cross-sectional area in locations that may be farther from the inward facing surface of the mixing structure body. This may help direct the mixture flow farther into the combustion chamber of the engine cylinder.

Various embodiments of the mixing structures may receive a post-injection of fuel and direct this post-injection fuel into the combustion chamber of the engine cylinder via the mixture conduits. The post-injection fuel may be provided by the fuel injector subsequent to a previous fuel injection that may be used for combustion in the engine cylinder. The post-injection fuel may mix with gases in the central volume of the mixing structure to form the mixture, which may then be directed into the combustion chamber of the engine cylinder via the mixture conduits of the mixing structure. This additional mixture may further oxidize soot inside the combustion chamber of the engine cylinder.

In one embodiment, a control system of an engine having one or more of the mixing structures installed between a fuel injector and a piston crown may automatically detect whether gas channels and/or mixture conduits of a mixing structure may be clogged and/or whether the mixing structure may be misaligned (e.g., the mixture conduits may be not aligned with the fuel streams from the fuel injector). The control system may include one or more processors (e.g., one or more microprocessors, field programmable gate arrays, integrated circuits, or the like) that monitor the power or emissions output by the engine and/or by each cylinder of the engine. Responsive to determining that an engine cylinder may be misfiring, knocking, or producing less horsepower than other cylinders in the same engine, the control system may determine that a gas channel and/or mixture conduit of a mixing structure associated with that cylinder may be clogged, or that the mixing structure may be misaligned. The control system may provide output to an operator of a powered system that includes the engine (such as a vehicle), such as a visual, audible, or other notification that the mixing structure may need repair, replacement, or further inspection.

The presence of one or more embodiments of the mixing structures may reduce the need for skip firing operation of engines. Skip firing may involve the fuel injector providing fuel to some, but not all, combustion cycles of an engine cylinder. For example, the fuel injector may only direct fuel into the central volume of a mixing structure during every other engine rotation (instead of for each engine rotation). Use of the mixing structures in engines may reduce the need for skip firing of some engines. For example, addition of the mixing structures to an engine may eliminate a previous need to use skip firing to operate the engine. The presence of one or more embodiments of the mixing structures may reduce the need for operating at higher fuel injection pressures, the need for using aftertreatment systems, and/or the need for using multiple fuel injections to control emissions.

The control system of a vehicle may base the timing of engine operation responsive to mixing structures being positioned between fuel injectors and piston crowns of engine cylinders and based on the load placed on the engine. For example, as the engine load increases (e.g., responsive to the throttle being opened more), increased amounts of fuel may be injected into the central volumes of the mixing structures. Consequently, increased amounts of gases may need to be drawn into the central volumes of the mixing structures to pre-mix with the fuel to maintain the fuel-to-gas ratio of the mixture. The control system may change the engine cylinder timing to allow for a longer time for more of the gases to enter into the central volumes responsive to increases in the engine load. For example, the control system may direct the fuel injectors to begin injecting fuel into the central volumes at an earlier time in the engine cycle. Conversely, the control system may change the engine cylinder timing to reduce the time for gases to enter the central volumes responsive to decreases in the engine load.

Figure 24:
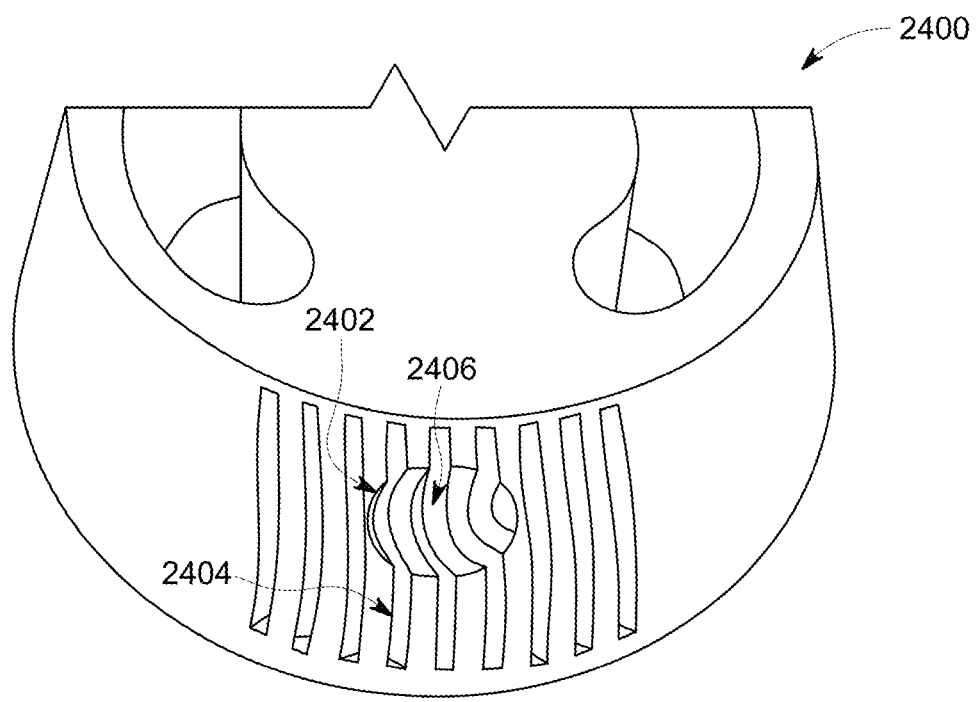
FIG. 24 illustrates a perspective view of another embodiment of a mixing structure.

FIG. 24 illustrates a perspective view of part of another embodiment of a mixing structure 2400. The mixing structure has a body that can be positioned between a fuel injector and a piston head, as described above. This body can include the center aperture or chamber where gas and fuel are mixed before being directed into the combustion chamber of an engine cylinder, also as described above. One difference between the mixing structure shown in FIG. 24 and the other mixing structures is that the mixing structure in FIG. 24 includes mixture conduits 2402 that overlap with gas channels 2404. Similar to the gas channels described above, the gas channels in FIG. 24 can be passages through which gas is drawn into the interior of the body of the mixing structure to mix with fuel injected into the interior of the body by one or more fuel injectors. This gas is entrained into the fuel spray from the fuel injector(s) to form a fuel-and-gas mixture. The mixture conduits shown in FIG. 24 direct sprays of the fuel-and-gas mixture out of the mixing structure and into the combustion chamber of the engine cylinder. The mixture conduit overlaps with the gas channels in that at least part 2406 of one or more of the gas channels extend through the mixture conduits, as shown in FIG. 24.

In an embodiment, a mixing structure (e.g., for mixing fuel and gas in an engine) includes a body that defines an axis and extends from an injector side toward an opposite piston side along the axis. The body has an inward facing surface proximate to the axis that defines a central volume and an outward facing surface distal from the axis. The injector side of the body is configured to face a fuel injector of a cylinder of an engine while the piston side of the body is configured to face a piston head of the engine cylinder. The body has one or more channel surfaces that define one or more gas channels extending through the body to and from the central volume. The body has one or more conduit surfaces that define one or more fuel-and-gas mixture conduits extending through the body to and from the central volume. There may be plural conduits and plural channels, both of which are radially symmetrically distributed around the axis. The central volume is configured to receive one or more streams of fuel from the fuel injector, and one or more streams of gas from the one or more gas channels. The central volume, channel(s), and/or conduit(s) are configured such that during operation of the engine, at least one of the streams of the fuel are mixed with the one or more streams of gas to form a fuel-and-gas mixture at a designated ratio of fuel to gas. The fuel-and-gas mixture conduits are configured to direct the fuel-and-gas mixture out of the body and into a combustion chamber of the engine cylinder.

In an embodiment, an engine includes an engine block defining a cylinder with a combustion chamber, a piston operably disposed in the cylinder, a fuel injector, and a mixing structure. The fuel injector is positioned on a cylinder head side of the cylinder. The piston has a piston head with a crown that faces the combustion chamber and fuel injector. The mixing structure is disposed between the piston and the fuel injector. The mixing structure includes a body that defines an axis and extends from an injector side toward an opposite piston side along the axis. The body has an inward facing surface proximate to the axis that defines a central volume and an outward facing surface distal from the axis. The injector side of the body faces the fuel injector while the piston side of the body faces the piston head. The body has one or more channel surfaces that define one or more gas channels extending through the body to and from the central volume. The body has one or more conduit surfaces that define one or more fuel-and-gas mixture conduits extending through the body to and from the central volume. There may be plural conduits and plural channels, both of which are radially symmetrically distributed around the axis. The central volume is configured to receive one or more streams of fuel from the fuel injector, and one or more streams of gas from the one or more gas channels (e.g., the gas received from the combustion chamber). The central volume, channel(s), and/or conduit(s) are configured such that during operation of the engine, at least one of the streams of the fuel are mixed with the one or more streams of gas to form a fuel-and-gas mixture at a designated ratio of fuel to gas. The fuel-and-gas mixture conduits are configured to direct the fuel-and-gas mixture out of the body and into the combustion chamber of the engine cylinder. Thus, in operation, gas is entrained by the injected fuel stream(s) from the combustion chamber through the gas channels into the central volume of the body; by interaction between the gas and the channel surfaces (that define the gas channels), thermal energy is transferred from the gas to the body (i.e., a temperature of the gas is reduced). The gas and fuel pass from the central volume through the fuel-and-gas mixture conduit(s) into the combustion chamber; the fuel-and-gas mixture conduit(s) serve to facilitate mixing of the gas and fuel prior to introduction into the combustion chamber. A technical effect is to improve the mixing of fuel and gas, and to reduce the temperature of mixed fuel and gas, prior to introduction into a combustion chamber (e.g., of a compression ignition engine), thereby reducing soot and other emissions. In embodiments, the fuel includes diesel, and the gas includes ambient air. The gas may also include ambient air mixed with EGR. In an embodiment, the engine operates in a first mode where the gas is ambient air only, and in a different, second mode where the gas is a mixture of ambient air an EGR. The amount of EGR may be static, or may be controlled to vary based on various engine and/or vehicle operating parameters.

In any of the embodiments herein, the body of the mixing structure may be generally disc-shaped. That is, a generally round or circular structure relative to the center axis. In embodiments, the injector side of the body has a first diameter (defined by an outer periphery of the injector side relative to a plane orthogonal to the axis), and the piston side of the body has a second diameter that is larger than the injector side (defined by an outer periphery of the piston side relative to a plane orthogonal to the axis), with the two being concentrically oriented such that a step is defined between the injector side and the piston side.

In any of the embodiments set forth herein, an engine with one or more mixing structures may be positioned on board a vehicle, e.g., the vehicle has a chassis, hull, or other support platform, and a propulsion system (including the engine) for moving the vehicle. For example, the engine may drive a mechanical transmission, or the engine may drive an alternator or generator for generating electrical power, which is used to power, for example, one or more traction motors to propel the vehicle. Alternatively, the engine may be deployed as part of a stationary or semi-stationary machine, such as a permanently installed or portable generator. In either case, the engine may be relatively large, e.g., it may have from 10-18 cylinders or more. In one embodiment, an engine with one or more mixing structures is on board a haul truck or other mining equipment, locomotive or other rail vehicle, or other off-highway vehicle; such a vehicle may be subject to particular government regulations relating to production of soot and other engine emissions, where it may be desirable for the engine to have one or more mixing structures as set forth herein to help meet the government regulations.

In an embodiment, a kit of parts includes a mixing structure as set forth in any of the embodiments herein, and one or more hardware parts (e.g., adhesives, fasteners, adapters, etc.) that are configured for use in deploying the mixing structure inside an engine cylinder. The kit of parts may also include a set of instructions (e.g., printed on paper or provided electronically, such as on a website) that include pictures, diagrams, and/or text or other written indicia for explaining to a technician how to outfit an engine cylinder with the mixing structure, such that the mixing structure operates as described herein. In another embodiment, a method of retrofitting an engine includes removing a cylinder head, fuel injector, and/or other parts of or associated with an engine cylinder to expose the cylinder interior, operably attaching a mixing structure as set forth in any of the embodiments herein to the fuel injector, cylinder, or piston, as applicable (for example, by welding), and reattaching any removed parts (e.g., the fuel injector or cylinder head) of the engine so that the engine is operable for combusting fuel. The method may further include updating operating software of the engine, directly (e.g., by an operator accessing an on-board computer) or by remote wireless download or otherwise, to modify operation of the engine to take into account the presence of the mixing structure. For example, the engine may be operated at a leaner or richer fuel-gas mixture, relative to previous operation of the engine without the mixing structure. Each cylinder of a multi-cylinder engine may be outfitted with its own, respective mixing structure. In one embodiment, however, only a subset of plural engine cylinders (that is, less than all of the cylinders of an engine) are outfitted with respective mixing structures. For example, it may be desirable to deploy mixing structures only in donor cylinders, or only in non-donor cylinders, depending on the operation of the engine in question and depending on where it is most needed or desired to reduce soot generation, for example. (Donor cylinder refers to a cylinder whose exhaust is recirculated to the engine intake.)

In another embodiment, a method includes, with an engine controller having one or more processors, controlling an engine to selectively individually activate and deactivate one or more first cylinders of the engine, where the one or more first cylinders are outfitted with respective mixing structures as set forth herein, and where at least one or more second cylinders of the engine (which are different than the first cylinders) are not outfitted with mixing structures. For example, if some cylinders have mixing structures and some do not, the former can be deactivated and the latter activated during times of operation where it is not necessary to meet designated engine emissions levels, whereas the former can be activated and the latter deactivated during times of operation where it is necessary to meet the designated engine emissions levels. Or selective operation may be based on, for example, ambient air temperatures (e.g., use of cylinders with the mixing structures may be not be needed or desired when air temp is below a designated threshold).

In one embodiment, a mixing structure is provided that includes a body defining an axis and extending from an injector side toward an opposite piston side along the axis. The body has an inward facing surface proximate to the axis that defines a central volume and an outward facing surface distal from the axis. The injector side of the body is configured to face a fuel injector of a cylinder of an engine while the piston side of the body is configured to face a piston head of the engine cylinder. The body has one or more channel surfaces that define one or more gas channels extending through the body to and from the central volume. The body also has one or more conduit surfaces that define one or more fuel-and-gas mixture conduits extending through the body to and from the central volume. The central volume is configured to receive one or more streams of fuel from the fuel injector, and one or more streams of gas from the one or more gas channels. During operation, at least one of the streams of the fuel mixes with the one or more streams of gas to form a fuel-and-gas mixture at a designated ratio of fuel to gas. The fuel-and-gas mixture conduits are configured to direct the fuel-and-gas mixture out of the body and into a combustion chamber of the engine cylinder.

Optionally, the body can be a single, monolithic, seamless structure. The one or more gas channels can extend through the body such that the gas is drawn from outside of the body into the central volume of the body. The designated ratio of the fuel-and-gas mixture can be controlled based on at least one of a number, shape, location and size of one or more of the gas channels or the mixture conduits. For example, to change the designated ratio between different mixing structures, the manufacturer or modifier of a mixing structure can change the number, shape, location, and/or size of one or more gas channels and/or mixing structures relative to another mixture conduit providing a fuel-and-gas mixture at another, different designated ratio of fuel to gas.

Optionally, the gas channels can have undulating shapes in the body between the outward facing surface and the inward facing surface of the body. Each of the mixture conduits can be configured to create spin, swirl, and/or turbulence in the fuel-and-gas mixture flowing therethrough. The mixture conduits can extend radially outward from the axis and are configured that each stream of the fuel-and-gas mixture is centered in its corresponding mixture conduit.

The injector side of the body can define a step portion to avoid contact between the body and one or more inlet or outlet valves of the engine cylinder during operation of the engine. At least a portion of the body can be surface treated or coated.

In one embodiment, another mixing structure is provided. This mixing structure includes a body configured to be positioned between a fuel injector and a cylinder of an engine. The body defines an interior volume that is configured to receive gas from outside the body and to receive one or more streams of fuel from the fuel injector in the interior volume. The body also defines one or more mixture conduits configured to conduct plumes of the fuel and gas, while mixing, from the interior volume to one or more exit ports and therethrough to the cylinder.

Optionally, the body can be configured to cool the gas prior to or during the mixture of the gas and the fuel in the interior volume and the one or more mixture conduits. The body can have an interface structure that defines at least one alignment hole or an alignment pin. This interface structure can assist with aligning mixture conduits with nozzles of the fuel injector. The interface structure can be shrunk fit, press fit, welded, bolted to, threaded to, or formed as part of a cylinder head of the engine cylinder.

The mixture conduits can define one or more apertures that connect to one or more gas channels and can be configured to direct flows of the gas from the one or more gas channels into the mixture conduit during operation of the cylinder. Each of the mixture conduits can include one or more dimples, textured surfaces, grooves or protuberances to facilitate mixing of the fuel and gas plumes flowing through the mixture conduits. The mixture conduits can be configured to mix the fuel and gas to a homogeneous state prior to combustion of the plumes in the cylinder. The mixture conduits can be configured to direct the plumes into the cylinder such that, relative to combustion in the cylinder without mixing the fuel and the gas to the homogeneous state, a relatively reduced amount or no amount of soot, nitrous oxides, or both soot and nitrous oxides are produced in the cylinder.

The body can have a step portion to extend a path length of the one or more mixture conduits while avoiding contact of the body with one or more valves of the engine cylinder.

In one embodiment, another mixing structure includes means for separately receiving fuel from a fuel injector and receiving gas, means for mixing the fuel and the gas into a fuel-and-gas mixture at a designated ratio, and means for directing the fuel-and-gas mixture into a combustion chamber of an engine cylinder.

Optionally, the means for receiving the gas and the fuel cools the gas prior to or while the gas is mixing with the fuel. The means for mixing the fuel and the gas into the fueland-gas mixture can include a mixture conduit having inner walls and means for inducing turbulence into fuel and gas streams to increase the homogeneity of the fuel-and-gas mixture, and means for centering and spacing a flow of the fuel-and-gas mixture from the inner walls of the mixture conduit.

Optionally, the means for directing the fuel-and-gas mixture into the combustion chamber directs the fuel-and-gas mixture to penetrate into the combustion chamber of the engine cylinder prior to combustion, delays the combustion of the fuel-and-gas mixture, or both directs the fuel-and-gas mixture into the combustion chamber of the engine cylinder prior to combustion and delays the combustion of the fuel-and-gas mixture.

Figure 25:
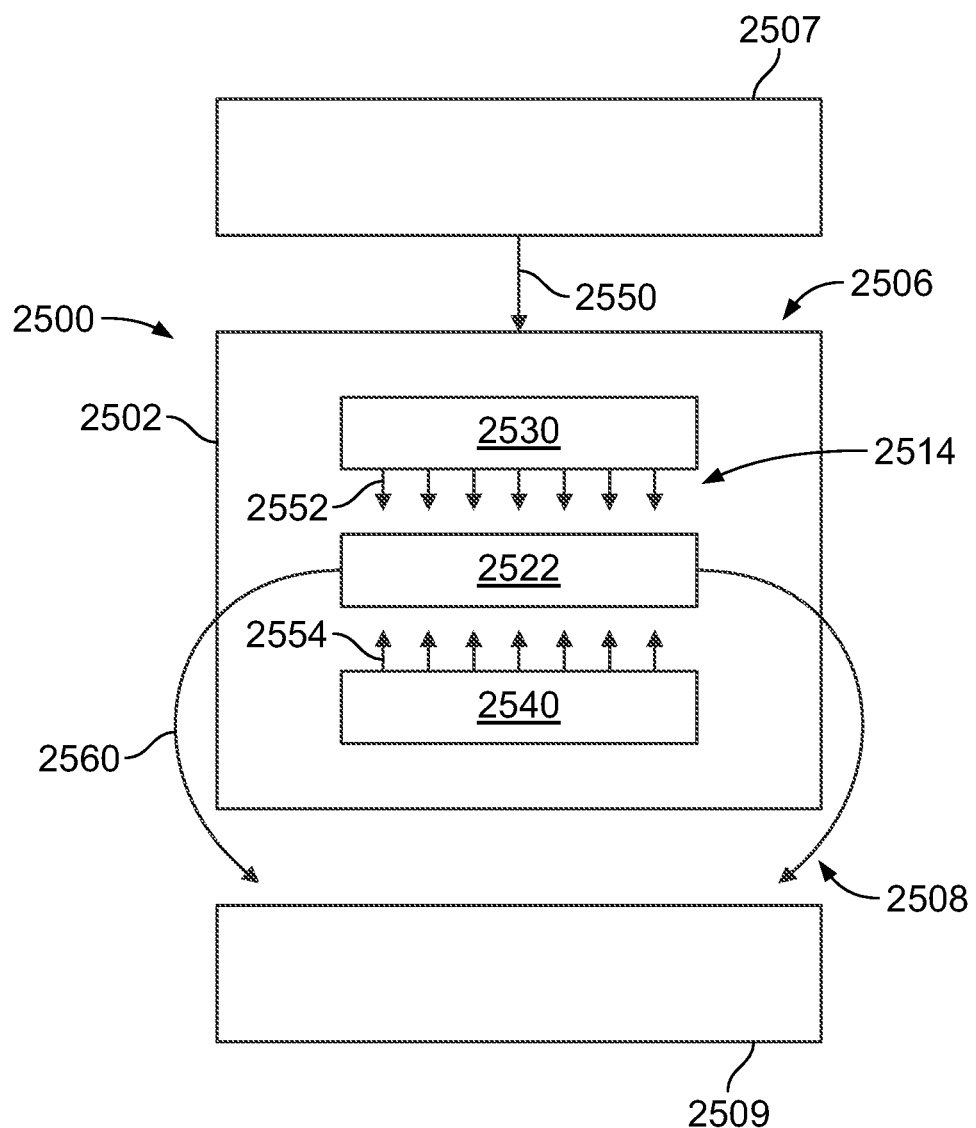
FIG. 25 provides a block schematic view of one embodiment of a mixing structure for a cylinder of an engine.

Various embodiments employ arrangements of upper and lower channels for providing a gas (e.g., air from an atmosphere surrounding an engine plus one or more additional gases such as hydrogen) to a fuel-and-gas mixture that provides reduced soot formation. FIG. 25 provides a schematic block diagram of a mixing structure 2500 that includes a body 2502. It may be noted that the mixing structure 2500 in various embodiments may be generally similar in respects to mixing structures discussed herein (e.g., mixing structure 100) or incorporate aspects of those mixing structures.

As seen in FIG. 25, the body 2502 extends from an injector side 2506 toward an opposite piston side 2508 along an axis. The injector side 2506 of the body 2502 is configured to face a fuel injector 2507 of a cylinder of an engine, while the piston side 2508 is configured to face a piston head 2509 of the engine cylinder. For example, the fuel injector side can face a fuel injector when in an installed and operational condition so that it injects fuel into the cylinder. The piston side can face the crown or piston head of this same cylinder. In one embodiment, the body may be attached to the crown of the piston (e.g., the end of the piston that may be closest to the fuel injector) and may move toward and away from the fuel injector and cylinder head during operation of the piston.

The body 2502 includes one or more fuel-and-gas mixture conduits 2522 that extend through body 2502 from a central volume 2514 of the body. The body 2502 also includes one or more upper channels 2530 that extend through the body 2502 from the central volume. As schematically depicted in FIG. 25, the upper channels 2530 are disposed more closely to the injector side 2506 than the fuel-and-gas mixture conduits 2522 proximate the central volume of the body 2502.

Further, the body 2502 includes one or more lower channels 2540. Similar to the upper channels 2530, the one or more lower channels 2540 extend through the body 2502 from the central volume; however, the lower channels 2540 are disposed more closely to the piston side 2508 than the fuel-and-gas mixture conduits 2522 proximate the central volume (and, accordingly more closely to the piston side 2508 than the upper channels 2530 proximate the central volume as well).

Accordingly, traveling from the injector side 2506 toward the piston side 2508 along the central volume, the upper channels 2530 would be first encountered. Traveling toward the piston side 2508 from the upper channels 2530, the fuel-and-gas mixture conduits 2522 would next be encountered. Finally, traveling toward the piston side 2508 from the fuel-and-gas mixture conduits 2522 along the central volume, the lower channels 2540 are encountered.

The gas (e.g., air) from the upper channels 2530 and lower channels 2540 are mixed with fuel from the fuel injector 2507 in the central volume. In the depicted example, the central volume 2514 receives one or more streams of fuel 2550 from fuel injector 2507. Also, the central volume 2514 receives one or more streams of gas 2552 from the upper channels 2530, as well as one or more streams of gas 2554 from the lower channels 2540. The upper channels 2530 and the lower channels 2540 are configured to provide a substantially similar amount of flow relative to each other to the central volume (e.g., within 10% of each other). For example, if the streams of gas 2552 from the upper channels 2530 provide an amount of gas X to the central volume, the streams of gas 2554 from the lower channels 2540 may provide an amount of gas X±(0.1*X). Providing a similar amount of flow from the upper channels 2530 and lower channels 2540 in various embodiments provides improved mixing with reduced soot formation.

During operation of the engine, at least one of the streams of fuel 2550 mixes with the streams of gas 2552 from the upper channels 2530 and also with the streams of gas 2554 from the lower channels 2540 to form a fuel-and-gas mixture 2560 at a designated ratio of fuel to gas. The fuel-and-gas mixture conduits 2522 direct the fuel-and-gas mixture 2560 out of body 2502 and into a combustion chamber of the engine cylinder.

It may be noted that different arrangements of upper and lower channels may be utilized in various embodiments. For example, in some embodiments, plural upper channels are used in connection with plural lower channels. In other embodiments, plural upper channels are used with a single lower channel. It may also be noted that different sizes, shapes, and orientations of channels may be used in various embodiments. For example, in some embodiments, upper and lower channels both extend laterally across sides of the body, while in other embodiments one or more lower channels may extend through a bottom (e.g., piston side) of the body.

Figure 26:
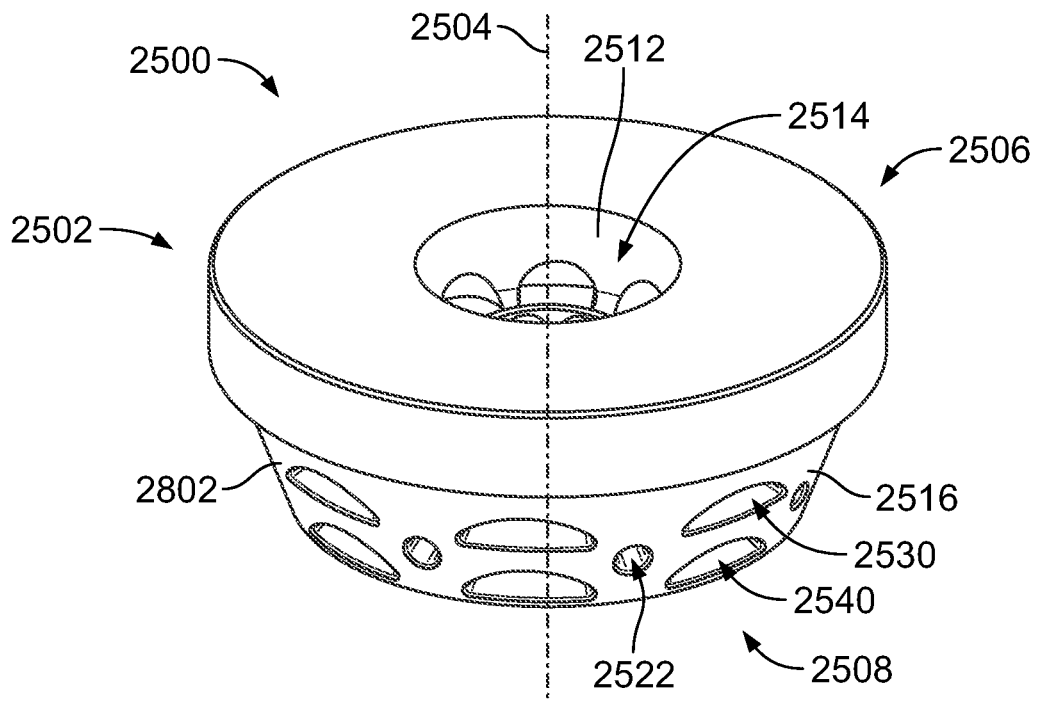
FIG. 26 illustrates a top perspective view of an embodiment of a mixing structure.
Figure 27:
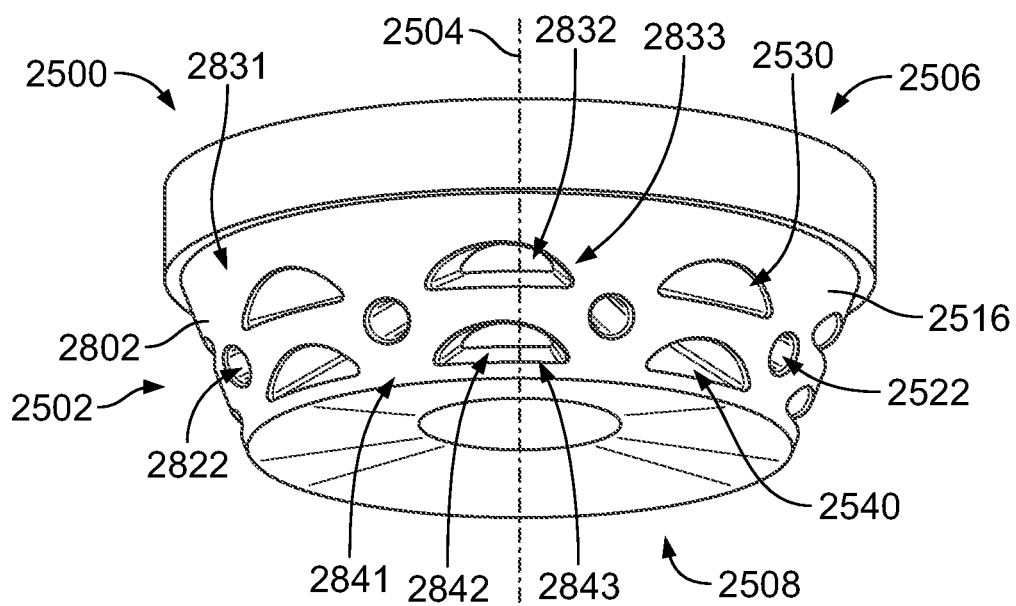
FIG. 27 provides a bottom perspective view of the mixing structure of FIG. 26.

For example, FIG. 26 provides a top perspective view (or view from the injector side 2506) of an example in which the body 2502 includes multiple upper and lower channels extending laterally across the body 2502 relative to an axis 2504 extending from the injector side 2506 toward the piston side 2508. FIG. 27 provides a bottom perspective view (or view from the piston side 2508) of the body 2502 of FIG. 26, and FIG. 28 provides a sectional view of the body 2502 of FIG. 26.

Figure 28:
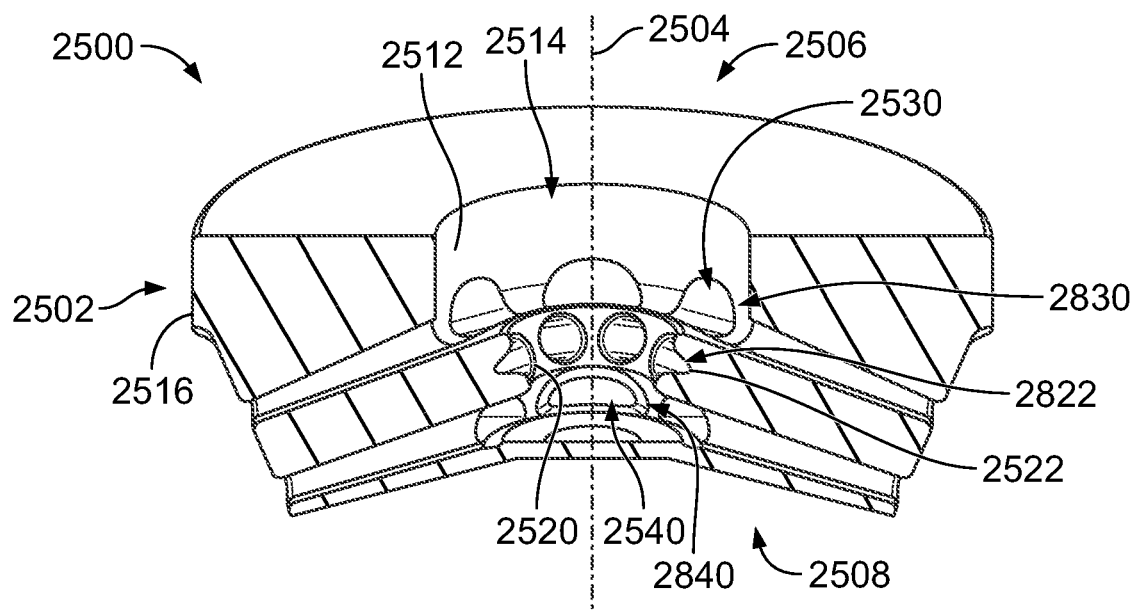
FIG. 28 provides a sectional view of the mixing structure of FIG. 26.

As seen in FIGS. 26-28, the depicted example body 2502 defines an axis 2504 that extends from the injector side 2506 toward the piston side 2508, with the piston side 2508 opposite the injector side 2506. The body 2502 includes an inward facing surface 2512 that is proximate the axis 2504, and an outward facing surface 2516 that is distal from the axis 2504. The body 2502 also includes one or more conduit surfaces 2520 that define the fuel-and-gas mixture conduits 2522. The fuel-and-gas mixture conduits 2522 extend through the body 2502 from the central volume 2514. In the depicted example, the fuel-and-gas mixture conduits 2522 extend laterally across the body 2502 between the inward facing surface 2512 and the outward facing surface 2516.

The body 2502 also includes upper channels 2530 that extend through the body 2502 from the central volume 2514 (e.g., laterally across the body 2502 between the inward facing surface 2512 and the outward facing surface 2516). The upper channels 2530 are disposed more closely to the injector side 2506 than the fuel-and-gas mixture conduits 2522 proximate the central volume 2514. As best seen in FIG. 28, the upper channels 2530 meet the central volume 2514 at location 2830 and the fuel-and-gas mixture conduits 2522 meet the central volume 2514 at location 2822, with location 2830 closer to the injector side 2506 than is location 2822. Put another way, location 2822 is closer to the piston side 2508 than is location 2830.

The body 2502 of the example of FIGS. 26-28 also includes lower channels 2540 that extend through the body 2502 from the central volume 2514 (e.g., laterally across the body 2502 between the inward facing surface 2512 and the outward facing surface 2516). The lower channels 2540 are disposed more closely to the piston side 2508 than the fuel-and-gas mixture conduits 2522 proximate the central volume 2514. As best seen in FIG. 28, the lower channels 2540 meet the central volume 2514 at location 2840 and the fuel-and-gas mixture conduits 2522 meet the central volume 2514 at location 2822, with location 2840 closer to the piston side 2508 than is location 2822. Put another way, location 2822 is closer to the injector side 2506 than is location 2840.

In the example of FIGS. 26-28, the fuel-and-gas mixture conduits 2522 include a series 2820 of conduits 2522 that are disposed about a circumference 2802 of the body 2502. Each conduit of the series 2820 extends from the outward facing surface 2516 to the central volume 2514. Also, the upper channels 2530 include a series 2831 of upper channels 2530 that extend from the outward facing surface 2516 to the central volume 2514. Each upper channel of the series 2831 has a corresponding upper opening 2832. As best seen in FIGS. 26 and 27, the upper openings 2832 are arranged in an alternating fashion with the conduits 2522 along the circumference 2802 of the body 2502.

Also in the example of FIGS. 26-28, the lower channels 2540 include a series 2841 of lower channels 2540 that extend from the outward facing surface 2516 to the central volume 2514. Each lower channel of the series 2841 has a corresponding lower opening 2842. As best seen in FIGS. 26 and 27, the lower openings 2842 are arranged in an alternating fashion with the conduits 2522 along the circumference 2802 of the body 2502. In the illustrated example, the upper openings 2832 and the lower openings 2842 are aligned with each other along a direction defined by the axis 2504 (e.g., the center of each upper opening 2832 is directly above the center of a corresponding lower opening 2842 along the direction defined by the axis 2504).

In various examples, the body 2502 includes a common number of upper channels 2530 and lower channels 2540. For example, the body 2502 may include eight upper channels 2530 and eight lower channels 2540. Further, the upper openings 2832 and lower openings 2842 may each define a corresponding upper cross-sectional area and lower cross-sectional area that are substantially similar (e.g., within 10% of each other.) For example, in the illustrated example, the upper openings 2832 define an upper opening shape 2833 and the lower openings 2842 may define a lower opening shape 2843, with the upper opening shape 2833 and lower opening shape 2843 being substantially similar. In the example of FIGS. 26-28, the upper opening shape 2833 and the lower opening shape 2843 each define a similarly sized crescent shape. Utilizing a similar number of upper and lower channels each having a similar cross section and shape each helps to provide a similar amount of flow from the upper channels 2530 and lower channels 2540 relative to each other in various embodiments.

Figure 29:
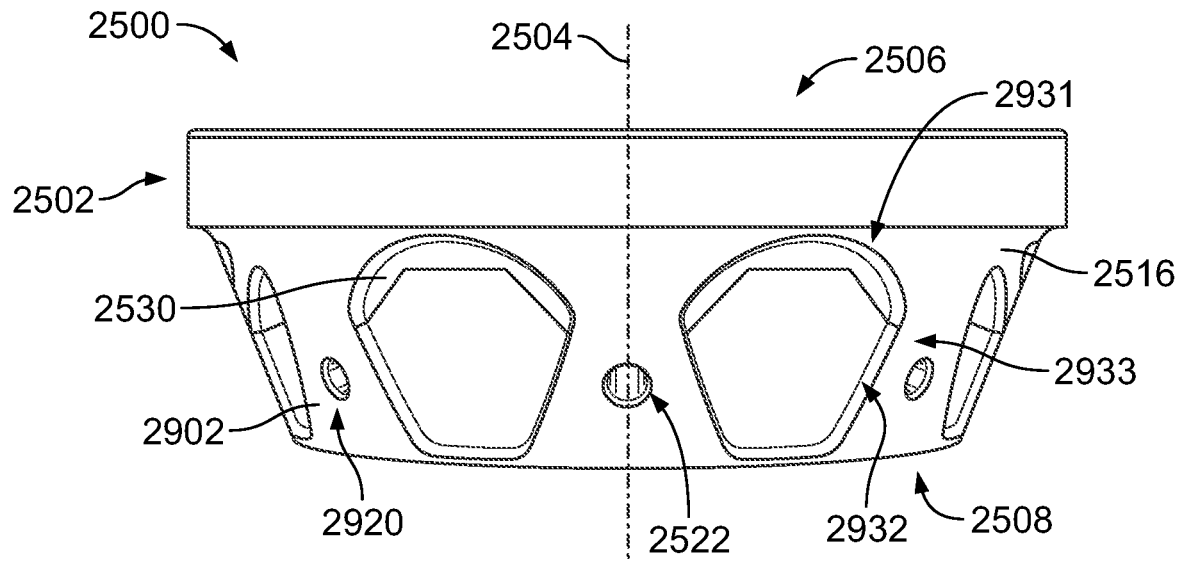
FIG. 29 provides a side view of an embodiment of a mixing structure.
Figure 30:
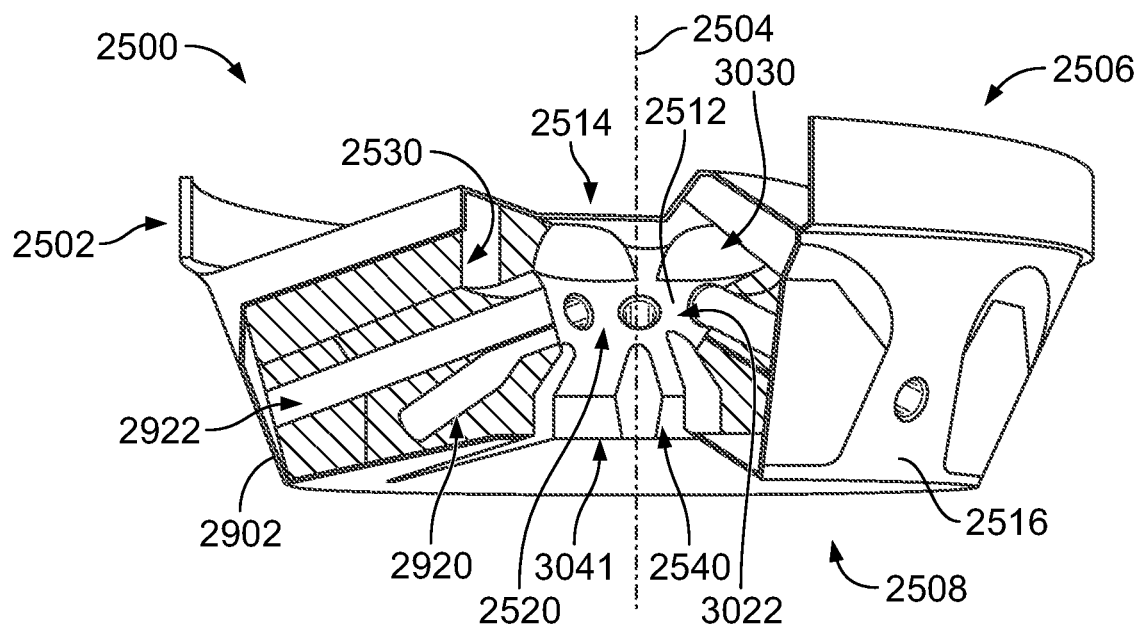
FIG. 30 provides a sectional view of the mixing structure of FIG. 29.

Other arrangements of upper and lower channels may be utilized in various alternate embodiments. For example, FIG. 29 provides a side of an example in which the body 2502 includes multiple upper channels extending laterally across the body 2502 relative to an axis 2504 extending from the injector side 2506 toward the piston side 2508, and a single lower channel extend upwards into the body 2502 from the piston side 2508. FIG. 30 provides a sectional view of the body 2502 of FIG. 29.

As seen in FIGS. 29-30, the depicted example body 2502 defines an axis 2504 that extends from the injector side 2506 toward the piston side 2508, with the piston side 2508 opposite the injector side 2506. The body 2502 includes an inward facing surface 2512 that is proximate the axis 2504, and an outward facing surface 2516 that is distal from the axis 2504. Similar to the example of FIGS. 26-28, the body 2502 also includes one or more conduit surfaces 2520 that define the fuel-and-gas mixture conduits 2522. The fuel-and-gas mixture conduits 2522 extend through the body 2502 from the central volume 2514. In the depicted example, the fuel-and-gas mixture conduits 2522 extend laterally across the body 2502 between the inward facing surface 2512 and the outward facing surface 2516.

Also generally similar to the example of FIGS. 26-28, the body 2502 of the example of FIGS. 29-30 includes upper channels 2530 that extend through the body 2502 from the central volume (e.g., laterally across the body 2502 between the inward facing surface 2512 and the outward facing surface 2516). The upper channels 2530 are disposed more closely to the injector side 2506 than the fuel-and-gas mixture conduits 2522 proximate the central volume 2514. As best seen in FIG. 30, the upper channels 2530 meet the central volume 2514 at location 3030 and the fuel-and-gas mixture conduits 2522 meet the central volume 2514 at location 3022, with location 3030 closer to the injector side 2506 than is location 3022. Put another way, location 3022 is closer to the piston side 2508 than is location 3030. It may be noted that in the example of FIGS. 29-30, exterior openings for one or more upper channels 2530 may be on both sides of the fuel-and-gas mixture conduits 2522 (e.g., extending more proximate to the piston side 2508 and the injector side 2506 than the fuel-and-gas mixture conduits 2522) on the outward facing surface 2516, but the upper channels 2530 are more proximate the injector side 2506 proximate the central volume 2514 at location 3030 than are the fuel-and-gas mixture conduits 2522. Further, in the example of FIGS. 29-30, the fuel-and-gas mixture conduits 2522 include a series 2920 of conduits 2522 that are disposed about a circumference 2902 of the body 2502. Each conduit of the series 2920 extends from the outward facing surface 2516 to the central volume 2514. Also, the upper channels 2530 include a series 2931 of upper channels 2530 that extend from the outward facing surface 2516 to the central volume 2514. Each channel of the series 2931 has a corresponding upper opening 2932. As best seen in FIG. 29, the upper openings 2932 are arranged in an alternating fashion with the conduits 2522 along the circumference 2902 of the body 2502.

However, unlike the example of FIGS. 26-28, the body 2502 of the example of FIGS. 29-30 includes a single lower channel 2540 having a single lower opening 3041 that extends through the piston side 2508 of the body 2502 to the central volume 2514. In the illustrated example the body 2502 has only a single lower channel and is devoid of any additional lower channels. It may be noted that, in other embodiments, a lower channel having a lower opening 3041 through the piston side 2508 may be used in conjunction with additional lower channels that extend laterally across the body 2502 from the outward facing surface 2516. In the illustrated example, the single lower opening 3041 is generally circular in cross-section and is centered about the axis 2504. Also, the depicted upper openings 2932 define a crescent shape 2933 (e.g., a horseshoe shape on the outward facing surface 2516 having a crescent shape at the top). It may be noted that while circular and crescent shapes are provided as examples in the illustrated embodiments, other shapes may be utilized additionally or alternatively in additional embodiments.

Figure 31:
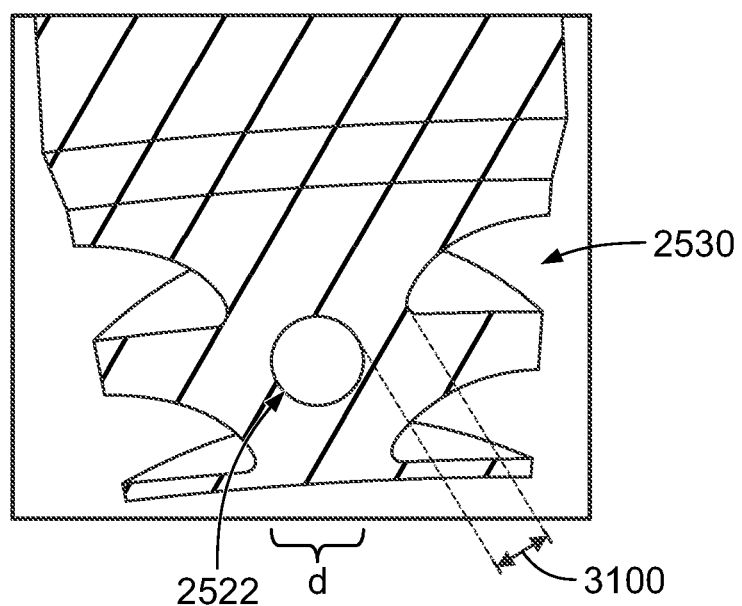
FIG. 31 provides a sectional view through a body of a mixing structure in an embodiment.

With continued reference to the various examples discussed above, it may be noted that the arrangements, sizes, and shapes of the various openings, channels, and/or conduits may be selected for particular applications to reduce soot formation. In various embodiments, bore sizes between about 140 millimeters and about 400 millimeters may be utilized. For instance, in various embodiments, the fuel-and-gas mixture conduits 2522 may have a generally circular cross-section that extends from the outward facing surface 2516 to the central volume 2514, with the cross-section having a diameter greater than 2 millimeters. In some examples, the diameter d (see FIG. 31) is 2.8 millimeters or less (e.g., between 2 millimeters and 2.8 millimeters). Further, the conduits 2522 in some examples have a length (e.g., distance from the point a conduit contacts the inner facing surface to the point the conduit contacts the outward facing surface) of about 15 millimeters. Further still, in some examples, as seen in FIG. 31, a minimum distance 3100 between an upper channel 2530 and a fuel-and-gas mixture conduit 2522 is between about 1.75 millimeters and 2.25 millimeters.

Accordingly, various embodiments provide for reduced soot formation in engines. Aspects of an insert assembly (e.g., including a body such as body 2502) including the number, size, and location of fuel and gas passages may be selected as discussed herein to improve mixture formation, enabling the reduction of soot without negatively impacting power or generation of other pollutants. The configuration of upper and lower channels, for example, may be selected to provide gas flow symmetry to a central volume (e.g., a substantially similar flow of gas from the upper channels relative to the lower channels).

In one embodiment, a mixing structure includes a body that defines an axis and extends from an injector side toward an opposite piston side along the axis. The body has an inward facing surface proximate to the axis that defines a central volume and an outward facing surface distal from the axis. The injector side of the body is configured to face a fuel injector of a cylinder of an engine while the piston side of the body is configured to face a piston head of the engine cylinder. The body includes one or more conduit surfaces that define one or more fuel-and-gas mixture conduits extending through the body from the central volume. The body also includes one or more upper channels extending through the body from the central volume. The one or more upper channels are disposed more closely to the injector side than the one or more fuel-and-gas mixture conduits proximate the central volume. The body also includes one or more lower channels extending through the body from the central volume. The one or more lower channels are disposed more closely to the piston side than the one or more fuel-and-gas mixture conduits proximate the central volume. The central volume is configured to receive one or more streams of fuel from the fuel injector, and to receive one or more streams of gas from the one or more upper channels and one or more streams of gas from the one or more lower channels. The one or more upper channels and the one or more lower channels are configured to provide a substantially similar amount of flow relative to each other to the central volume. During operation, at least one of the streams of the fuel mixes with the one or more streams of gas from the one or more upper channels and the one or more streams of gas from the one or more lower channels to form a fuel-and-gas mixture at a designated ratio of fuel to gas. The fuel-and-gas mixture conduits are configured to direct the fuel-and-gas mixture out of the body and into a combustion chamber of the engine cylinder.

Optionally, the one or more fuel-and-gas mixture conduits that extend through the body from the central volume includes a series of conduits disposed about a circumference of the body, with each conduit extending from the outward facing surface to the central volume. Also, the one or more upper channels include a series of upper channels extending from the outward facing surface to the central volume, with each upper channel having a corresponding upper opening, and with the upper openings arranged in an alternating fashion with the conduits along the circumference of the body. Further, the one or more lower channels include a series of lower channels extending from the outward facing surface to the central volume, with each lower channel having a corresponding lower opening, and with the lower openings arranged in an alternating fashion with the conduits along the circumference of the body.

Optionally, the upper openings and lower openings are aligned with each other along a direction defined by the axis. Alternatively or additionally, the body includes a common number of upper channels and lower channels, with the upper openings and lower openings defining a corresponding upper cross-sectional area and lower cross-sectional area that are substantially similar. In an example, the upper openings define an upper opening shape and the lower openings define a lower opening shape, with the upper opening shape and lower opening shape being substantially similar. For instance, in an example, the upper opening shape and lower opening shape each define a crescent shape.

Optionally, the one or more fuel-and-gas mixture conduits extending through the body from the central volume includes a series of conduits disposed about a circumference of the body, with each conduit extending from the outward facing surface to the central volume. Also, the one or more upper channels include a series of upper channels extending from the outward facing surface to the central volume, each upper channel having a corresponding upper opening, with the upper openings arranged in an alternating fashion with the conduits along the circumference of the body. Further, the one or more lower channels include a single lower opening extending through the piston side to the central volume. In an example, the single lower opening is generally circular in cross-section and centered about the axis. In another example, additionally or alternatively, the upper openings define an upper opening shape, the upper opening shape defining a crescent shape.

Optionally, the one or more fuel-and-gas mixture conduits each have a generally circular cross-section extending from the outward facing surface to the central volume having a diameter of greater than 2 millimeters. In an example, the diameter is 2.8 millimeters or less. In another example, additionally or alternatively, each fuel-and-gas mixture conduit has a length of about 15 millimeters.

Optionally, a minimum distance between one of the one or more upper channels and one of the one or more fuel-and-gas mixture conduits is between about 1.75 millimeters and 2.25 millimeters.

In one embodiment, a mixing structure includes a body defining an axis and extending from an injector side toward an opposite piston side along the axis. The body has an inward facing surface proximate to the axis that defines a central volume and an outward facing surface distal from the axis. The injector side of the body is configured to face a fuel injector of a cylinder of an engine while the piston side of the body is configured to face a piston head of the engine cylinder. The body includes conduit surfaces that define a series of fuel-and-gas mixture conduits disposed about a circumference of the body and extending through the body from the central volume. Each conduit extends from the outward facing surface to the central volume. The body includes a series of upper channels extending from the outward facing surface to the central volume, with each upper channel having a corresponding upper opening, and with the upper openings arranged in an alternating fashion with the conduits along the circumference of the body. The upper channels are disposed more closely to the injector side than the fuel-and-gas mixture conduits proximate the central volume. Also, the body includes a series of lower channels extending from the outward facing surface to the central volume, with each lower channel having a corresponding lower opening, and with the lower openings arranged in an alternating fashion with the conduits along the circumference of the body. The lower channels are disposed more closely to the piston side than the fuel-and-gas mixture conduits proximate the central volume. The central volume is configured to receive one or more streams of fuel from the fuel injector, and to receive one or more streams of gas from the upper channels and one or more streams of gas from the lower channels. During operation, at least one of the streams of the fuel mixes with the one or more streams of gas from the upper channels and the one or more streams of gas from the lower channels to form a fuel-and-gas mixture at a designated ratio of fuel to gas. The fuel-and-gas mixture conduits are configured to direct the fuel-and-gas mixture out of the body and into a combustion chamber of the engine cylinder.

Optionally, the upper openings and lower openings are aligned with each other along a direction defined by the axis.

Optionally, the body comprises a common number of upper channels and lower channels, with the upper openings and lower openings defining a corresponding upper cross-sectional area and lower cross-sectional area that are substantially similar.

Optionally, the upper openings define an upper opening shape and the lower openings define a lower opening shape, the upper opening shape and lower opening shape being substantially similar. In an example, the upper opening shape and lower opening shape each define a crescent shape.

Optionally, the fuel-and-gas mixture conduits each have a generally circular cross-section having a diameter of greater than 2 millimeters. In an example, the diameter is 2.8 millimeters or less.

Optionally, each fuel-and-gas mixture conduit has a length of about 15 millimeters.

In one embodiment, a mixing structure includes a body defining an axis and extending from an injector side toward an opposite piston side along the axis. The body has an inward facing surface proximate to the axis that defines a central volume and an outward facing surface distal from the axis. The injector side of the body is configured to face a fuel injector of a cylinder of an engine while the piston side of the body is configured to face a piston head of the engine cylinder. The body includes one or more conduit surfaces that define a series of fuel-and-gas mixture conduits disposed about a circumference of the body and extending from the outward facing surface to the central volume. Also, the body includes a series of upper channels extending from the outward facing surface to the central volume, with each upper channel having a corresponding upper opening, and with the upper openings arranged in an alternating fashion with the conduits along the circumference of the body. The one or more upper channels are disposed more closely to the injector side than the one or more fuel-and-gas mixture conduits proximate the central volume. Also, the body includes a single lower channel comprising an opening extending through the piston side to the central volume. The central volume is configured to receive one or more streams of fuel from the fuel injector, and also to receive one or more streams of gas from the upper channels and one or more streams of gas from the lower channel, with the upper channels combined and the lower channel configured to provide a substantially similar amount of flow relative to each other to the central volume. During operation, at least one of the streams of the fuel mixes with the one or more streams of gas from the upper channels and the one or more streams of gas from the lower channel to form a fuel-and-gas mixture at a designated ratio of fuel to gas. The fuel-and-gas mixture conduits are configured to direct the fuel-and-gas mixture out of the body and into a combustion chamber of the engine cylinder.

Optionally, the single lower opening is generally circular in cross-section and centered about the axis.

Optionally, the upper openings define an upper opening shape, the upper opening shape defining a crescent shape.

Optionally, a minimum distance between one of the upper channels and one of the fuel-and-gas mixture conduits is between about 1.75 millimeters and 2.25 millimeters.

As used herein, an element or step portion recited in the singular and proceeded with the word "a" or "an" should be understood as not excluding plural of said elements or steps, unless such exclusion may be explicitly stated. Furthermore, references to "one embodiment" of the presently described subject matter may be not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It may be to be understood that the above description may be intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein may be intended to define the parameters of the disclosed subject matter, they may be by no means limiting and may be exemplary embodiments. The scope of the subject matter described herein should, therefore, be determined with reference to the appended claims, along with the full scope of equivalents to which such claims may be entitled. In the appended claims, the terms "including" and "in which" may be used as the plain-English equivalents of the respective terms "comprising" and "wherein." Moreover, in the following claims, the terms "first," "second," and "third," etc. may be used merely as labels, and may be not intended to impose numerical requirements on their objects. Further, any limitations of the following claims not explicitly written in means-plus-function format are not to be interpreted based on 35 U.S.C. § 112(f), claim limitations expressly using the phrase "means for" followed by a statement of function invoke the 35 U.S.C. § 112.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein may be defined by the claims, and may include other examples that occur to those of ordinary skill in the art. Such other examples may be intended to be within the scope of the claims if they have structural elements that do not differ from the literal language of the claims, or if they include equivalent structural elements with insubstantial differences from the literal language of the claims.

What is claimed is:

1. A mixing structure, comprising:
a body extending along an axis from an injector side to an opposite piston side and having an inward-facing surface and an opposing outward-facing surface, the injector side of the body is configured to face a fuel injector of an engine cylinder while the piston side of the body is configured to face a piston head of the engine cylinder,
the body having one or more fuel-and-gas mixture conduits extending through the body to a central volume that is at least partially bounded by the inward-facing surface, the one or more fuel-and-gas mixture conduits configured to direct a mixture of fuel and gas from the central volume to a combustion chamber of the engine cylinder,
the body including one or more upper channels extending through the body from the central volume and disposed closer to the injector side than the one or more fuel-and-gas mixture conduits, the one or more upper channels configured to provide gas to the central volume,
the body including one or more lower channels extending through the body from the central volume, the one or more lower channels disposed more closely to the piston side than the one or more fuel-and-gas mixture conduits, the one or more lower channels configured to provide gas to the central volume, and
the central volume is configured to receive one or more streams of fuel from the fuel injector, and to receive one or more streams of gas from the one or more upper channels and the one or more lower channels, the one or more upper channels and the one or more lower channels are configured to provide a substantially similar amount of gas flow to the central volume.

2. The mixing structure of claim 1, wherein:
the one or more fuel-and-gas mixture conduits extending through the body from the central volume includes a series of the fuel-and-gas mixture conduits disposed about a circumference of the body, each of the fuel-and-gas mixture conduits extending from the outward-facing surface to the central volume,
the one or more upper channels include a series of the upper channels extending from the outward-facing surface to the central volume, each of the upper channels having a corresponding upper opening, with the upper openings arranged in an alternating fashion with the fuel-and-gas mixture conduits along the circumference of the body, and
the one or more lower channels include a series of the lower channels extending from the outward-facing surface to the central volume, each of the lower channels having a corresponding lower opening, with the lower openings arranged in an alternating fashion with the fuel-and-gas mixture conduits along the circumference of the body.

3. The mixing structure of claim 2, wherein the upper openings and the lower openings are aligned with each other along a direction defined by the axis.

4. The mixing structure of claim 2, wherein the body comprises a common number of the upper channels and the lower channels, the upper openings and the lower openings defining a corresponding upper cross-sectional area and lower cross-sectional area that are substantially similar.

5. The mixing structure of claim 4, wherein each of the upper openings defines an upper opening shape and each of the lower openings defines a lower opening shape, the upper opening shape and the lower opening shape being substantially similar.

6. The mixing structure of claim 5, wherein the upper opening shape and the lower opening shape each define a crescent shape.

7. The mixing structure of claim 1, wherein:
the one or more fuel-and-gas mixture conduits extending through the body from the central volume includes a series of the fuel-and-gas mixture conduits disposed about a circumference of the body, each of the fuel-and-gas mixture conduits extending from the outward-facing surface to the central volume,
the one or more upper channels include a series of the upper channels extending from the outward-facing surface to the central volume, each of the upper channels has a corresponding upper opening, with the upper openings arranged in an alternating fashion with the fuel-and-gas mixture conduits along the circumference of the body, and
the one or more lower channels include a single lower opening extending through the piston side to the central volume.

8. The mixing structure of claim 7, wherein the single lower opening is generally circular in cross-section and centered about the axis.

9. The mixing structure of claim 7, wherein each of the upper openings defines an upper opening shape, the upper opening shape defining a crescent shape.

10. The mixing structure of claim 1, wherein the one or more fuel-and-gas mixture conduits each has a generally circular cross-section extending from the outward-facing surface to the central volume having a diameter of greater than 2 millimeters.

11. The mixing structure of claim 10, wherein the diameter is 2.8 millimeters or less.

12. The mixing structure of claim 10, wherein each of the one or more fuel-and-gas mixture conduits has a length of about 15 millimeters.

13. The mixing structure of claim 1, wherein a minimum distance between one of the one or more upper channels and one of the one or more fuel-and-gas mixture conduits is between about 1.75 millimeters and 2.25 millimeters.

14. A mixing structure, comprising:
a body extending along an axis from an injector side to an opposite piston side and having an inward facing surface and an opposing outward facing surface, the injector side of the body is configured to face a fuel injector of an engine cylinder while the piston side of the body is configured to face a piston head of the engine cylinder,
the body having a series of fuel-and-gas mixture conduits disposed about a circumference of the body and extending through the body from a central volume, each of the fuel-and-gas mixture conduits extending from the outward facing surface to the central volume, the fuel-and-gas mixture conduits configured to direct a mixture of fuel and gas from the central volume to a combustion chamber of the engine cylinder, the body including a series of upper channels extending from the outward facing surface to the central volume, each of the upper channels having a corresponding upper opening, with the upper openings arranged in an alternating fashion with the fuel-and-gas mixture conduits along the circumference of the body, the upper channels are disposed closer to the injector side than the fuel-and-gas mixture conduits, the upper channels configured to provide gas to the central volume, the body including a series of lower channels extending from the outward facing surface to the central volume, each of the lower channels has a corresponding lower opening, with the lower openings arranged in an alternating fashion with the fuel-and-gas mixture conduits along the circumference of the body, the lower channels disposed closer to the piston side than the fuel-and-gas mixture conduits, the lower channels configured to provide gas to the central volume, and the central volume is configured to receive one or more streams of fuel from the fuel injector, and to receive one or more streams of gas from the upper channels and the lower channels.

15. The mixing structure of claim 14, wherein the upper openings and the lower openings are aligned with each other along a direction defined by the axis.

16. The mixing structure of claim 14, wherein the body comprises a common number of the upper channels and the lower channels, the upper openings and the lower openings defining a corresponding upper cross-sectional area and lower cross-sectional area that are substantially similar.

17. The mixing structure of claim 14, wherein each of the upper openings defines an upper opening shape and each of the lower openings defines a lower opening shape, the upper opening shape and lower opening shape being substantially similar.

18. The mixing structure of claim 17, wherein the upper opening shape and the lower opening shape each defines a crescent shape.

19. The mixing structure of claim 14, wherein the fuel-and-gas mixture conduits each has a generally circular cross-section having a diameter of greater than 2 millimeters.

20. The mixing structure of claim 19, wherein the diameter is 2.8 millimeters or less.

21. The mixing structure of claim 14, wherein each of the fuel-and-gas mixture conduits has a length of about 15 millimeters.

22. A mixing structure, comprising:

a body extending along an axis from an injector side to an opposite piston side and having an inward facing surface and an opposing outward facing surface, the injector side of the body is configured to face a fuel injector of an engine cylinder while the piston side of the body is configured to face a piston head of the engine cylinder, the body having a series of fuel-and-gas mixture conduits disposed about a circumference of the body and extending from the outward facing surface to a central volume, the fuel-and-gas mixture conduits configured to direct a mixture of fuel and gas from the central volume to a combustion chamber of the engine cylinder, the body including a series of upper channels extending from the outward facing surface to the central volume, each of the upper channels having a corresponding upper opening, with the upper openings arranged in an alternating fashion with the fuel-and-gas mixture conduits along the circumference of the body, the upper channels disposed closer to the injector side than the fuel-and-gas mixture conduits proximate the central volume, the upper channels configured to provide gas to the central volume, the body including a single lower channel comprising an opening extending through the piston side to the central volume, the lower channel configured to provide gas to the central volume, and the central volume is configured to receive one or more streams of fuel from the fuel injector, and one or more streams of gas from the upper channels and the lower channel, wherein the upper channels combined and the lower channel are configured to provide a substantially similar amount of flow relative to each other to the central volume.

23. The mixing structure of claim 22, wherein the opening of the single lower channel is generally circular in cross-section and centered about the axis.

24. The mixing structure of claim 22, wherein each of the upper openings defines an upper opening shape, the upper opening shape defining a crescent shape.

25. The mixing structure of claim 22, wherein a minimum distance between one of the upper channels and one of the fuel-and-gas mixture conduits is between about 1.75 millimeters and 2.25 millimeters.

* * * * *